(12) United States Patent
Yamamoto

(10) Patent No.: US 11,215,813 B2
(45) Date of Patent: Jan. 4, 2022

(54) DISPLAY ELEMENT

(71) Applicant: Kazuhiro Yamamoto, Tokyo (JP)

(72) Inventor: Kazuhiro Yamamoto, Tokyo (JP)

(*) Notice: Subject to any disclaimer, the term of this patent is extended or adjusted under 35 U.S.C. 154(b) by 155 days.

(21) Appl. No.: 16/336,188

(22) PCT Filed: Sep. 25, 2017

(86) PCT No.: PCT/JP2017/034603
§ 371 (c)(1),
(2) Date: Mar. 25, 2019

(87) PCT Pub. No.: WO2018/056451
PCT Pub. Date: Mar. 29, 2018

(65) Prior Publication Data
US 2019/0235227 A1 Aug. 1, 2019

(30) Foreign Application Priority Data
Sep. 26, 2016 (JP) .............................. JP2016-187615

(51) Int. Cl.
*G02B 5/26* (2006.01)
*G02B 5/28* (2006.01)
(Continued)

(52) U.S. Cl.
CPC ............ *G02B 26/023* (2013.01); *G02B 5/26* (2013.01); *G02B 5/28* (2013.01); *G02B 26/00* (2013.01); *G02B 26/02* (2013.01); *G09F 9/37* (2013.01)

(58) Field of Classification Search
CPC ...... G02B 26/023; G02B 26/00; G02B 26/02; G02B 5/28; G02B 5/26; G09F 9/37;
(Continued)

(56) References Cited

U.S. PATENT DOCUMENTS 4,632,517 A 12/1986 Asher
4,747,673 A 5/1988 Marrs et al.
(Continued)

FOREIGN PATENT DOCUMENTS

JP S61-083502 A 4/1986
JP H03-20712 A 1/1991
(Continued)

OTHER PUBLICATIONS

English Translation of International Preliminary Report on Patentability in corresponding Japanese Patent Application No. PCT/JP2017/034603, dated Apr. 4, 2019, 14 pgs.
(Continued)

*Primary Examiner* — Tuyen Tra
(74) *Attorney, Agent, or Firm* — Young Basile Hanlon & MacFarlane, P.C.

(57) ABSTRACT

An image display device element, a filter element, and a reflective element allow a brightened display screen displaying red, green, blue, and composite colors through use of a single light-emitting portion. The image display device has a first element where a boundary wavelength between light absorption and light transmission or between reflection in an oblique direction and light transmission is variable or fixed and a second element where a wavelength region to be reflected is variable or fixed. The boundary wavelength of the first element and/or the wavelength region of the second element is variable. A positional relationship exists where light transmitted by the first element is incident on the second element. Controlling overlap between light transmission bands of the elements through varying the boundary wavelength of the first element and/or the wavelength region of the second element varies a band and amount of light reflected by the second element.

22 Claims, 48 Drawing Sheets

(51) Int. Cl.
*G02B 26/02* (2006.01)
*G09F 9/37* (2006.01)
*G02B 26/00* (2006.01)

(58) Field of Classification Search
CPC ............. G02F 2202/42; G02F 2203/01; G02F 2203/02; G02F 1/17; G02F 1/19
USPC .......................... 359/584, 586, 588, 590, 296
See application file for complete search history.

(56) References Cited

U.S. PATENT DOCUMENTS

| | | | |
|---|---|---|---|
| 5,242,869 | A | 9/1993 | Tarumi et al. |
| 2005/0179977 | A1 | 8/2005 | Chui et al. |
| 2005/0195461 | A1 | 9/2005 | Mochizuki |
| 2005/0237416 | A1 | 10/2005 | Hasegawa |
| 2010/0182671 | A1 | 7/2010 | Park |
| 2014/0036343 | A1 | 2/2014 | Ma et al. |
| 2014/0125981 | A1 | 5/2014 | Iga et al. |
| 2014/0151575 | A1 | 6/2014 | Hillmer et al. |
| 2015/0253470 | A1 | 9/2015 | Liu et al. |

FOREIGN PATENT DOCUMENTS

| | | |
|---|---|---|
| JP | H05-132335 A | 5/1993 |
| JP | 2003-084364 A | 3/2003 |
| JP | 2004-109775 A | 4/2004 |
| JP | 2005-208491 A | 8/2005 |
| JP | 2005-308688 A | 11/2005 |
| JP | 2006-099070 A | 4/2006 |
| JP | 2014-095594 A | 5/2014 |
| JP | 2015-172615 A | 10/2015 |
| JP | 2015-533223 A | 11/2015 |
| KR | 2014 0110301 A | 9/2014 |

OTHER PUBLICATIONS

Extended European Search Report in corresponding European Patent Application No. 17853218.0, dated Apr. 2, 2020, 11 pgs.

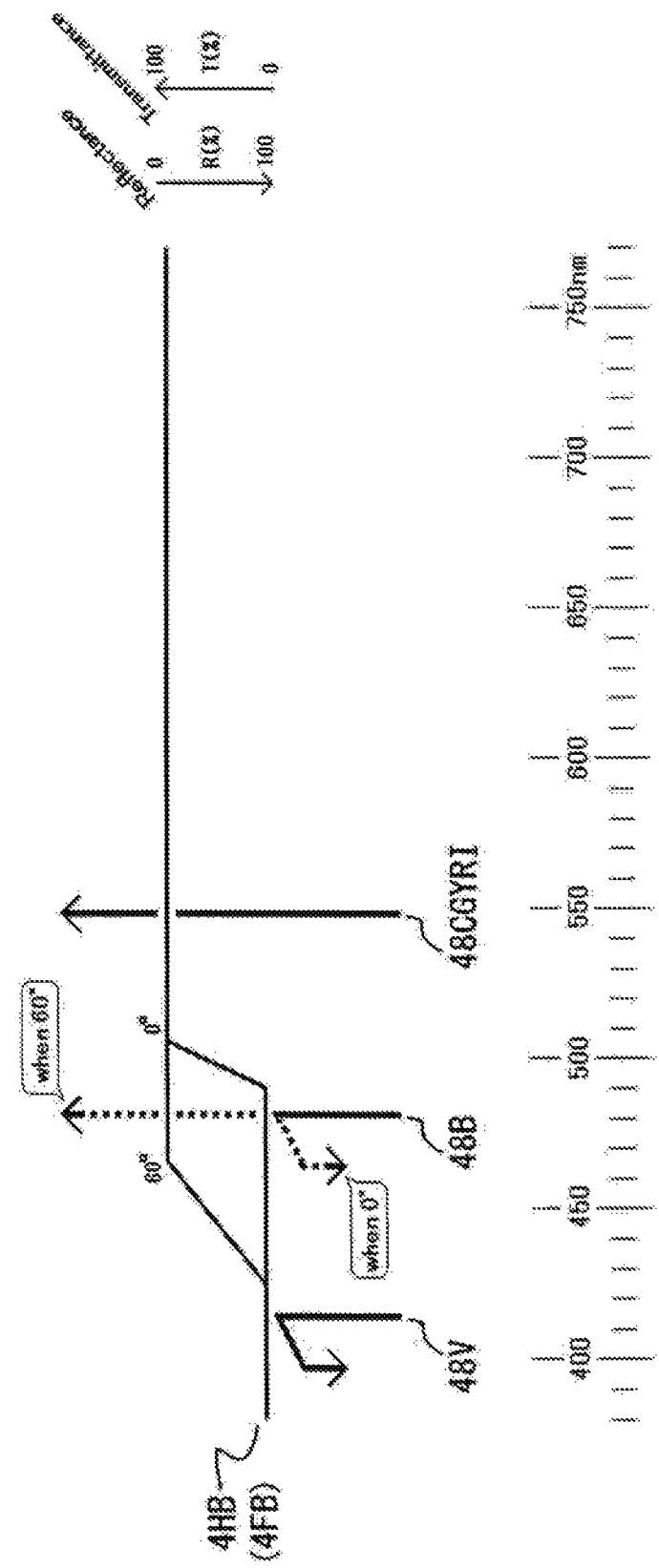

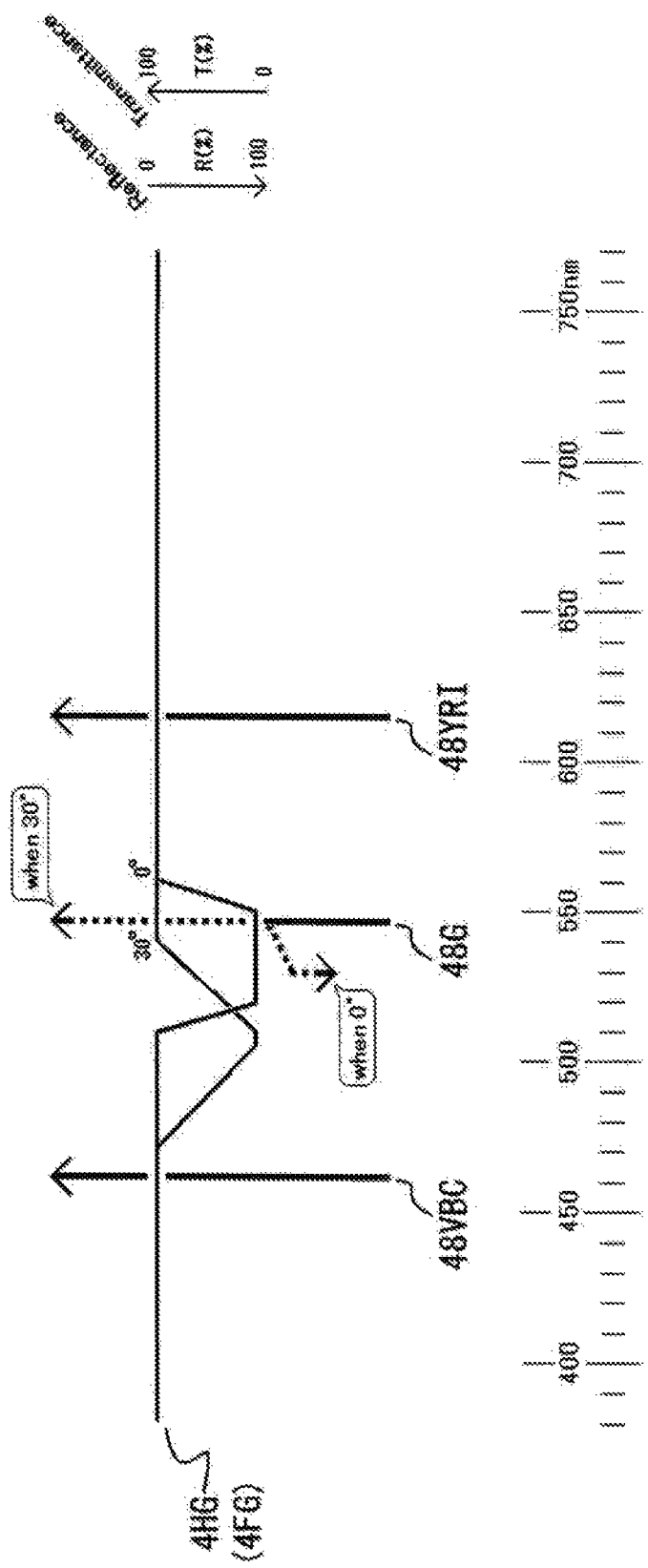

DISPLAY ELEMENT

CROSS-REFERENCE TO RELATED APPLICATION

This application claims priority to JP Patent Application No. 2016-187615, filed Sep. 26, 2016, the entire content of which is incorporated herein in its entirety by reference.

TECHNICAL FIELD

The present invention relates to a display element, and in particular relates to an image display device element, a reflective element, and a filter element.

BACKGROUND

In the technical field of image display devices, image display devices that display images using structural colors have been already known. Image display devices of this type include, for example, an image display device described in JP Patent Publication No. 2006-099070 A. Electromagnetic waves are classified into various classifications according to wavelengths and are referred to as radio waves, light, X rays, and gamma rays in descending order of wavelength.

BRIEF SUMMARY

JP Patent Publication No. 2006-099070 A describes an image display device in which a plurality of image display device elements, by which structural colors are developed, are arranged in a planar manner.

When, in an image display device in which a plurality of image display device elements are arranged in a planar manner, elements each of which can emit only light having any one of red, green, and blue colors are used, the amount of the light emission is reduced to one third in principle. For this reason, there is a problem in the above-described image display device in that the display screen cannot be brightened sufficiently.

The present invention is made in consideration of the above-described problem, and an object of the present invention is to provide a display element, particularly an image display device element, a reflective element, and a filter element, by which a display screen can be brightened by displaying red, green, blue, and composite colors thereof using a single light-emitting portion. Note that a reflective element and a filter element are the same elements except being different only in names depending on use purposes. The same applies to a notch filter and a band-pass filter.

BRIEF DESCRIPTION OF THE DRAWINGS

FIG. 33B is another diagram illustrative of the characteristics of the element 4FB itself used in the example 3 of the present invention.

FIG. 34B is another diagram illustrative of the characteristics of the element 4FG itself used in the example 3 of the present invention.

DETAILED DESCRIPTION

Figure 1:
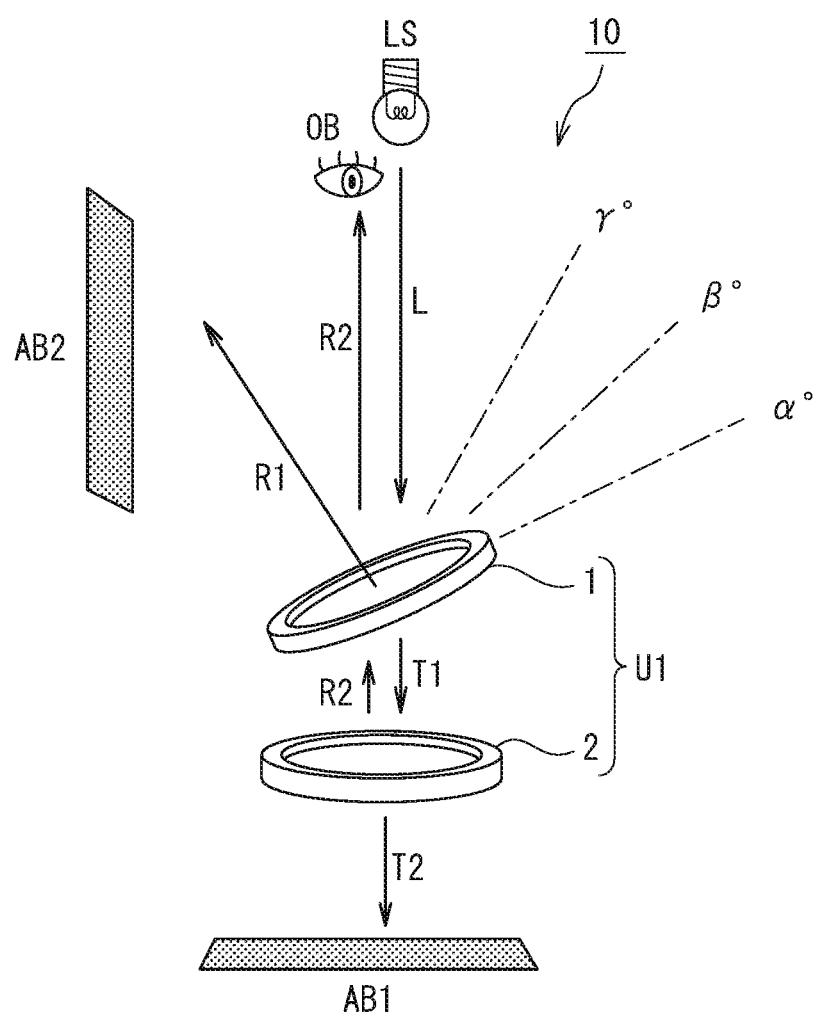
FIG. 1 is a conceptual diagram illustrative of a configuration of an image display device element according a first embodiment of the present invention.

Hereinafter, respective embodiments according to the present invention will be described with reference to the drawings. In the following description, the drawings are schematic, where a relation between thickness and planar dimensions, ratios of thickness among respective layers, and the like are different from actual ones. In addition, in order to simplify the drawings, well-known structures are illustrated by schematic representations. In the respective drawings, the same reference numerals are assigned to constituent elements exhibiting the same or similar functions, and an overlapping description thereof will be omitted. The respective embodiments, which will be described below, exemplify configurations for embodying the technical idea of the present invention, and the technical idea of the present invention does not limit materials, shapes, structures, arrangements, and the like of the constituent components to those described in the embodiments below. Various modifications can be made to the technical idea of the present invention within the scope of the technical idea defined by the claims.

Conventionally, there have not existed a multi-notch filter and a multi-band pass filter in which a plurality of bands are variable. The claimed invention is applicable to a multi-notch filter and a multi-band pass filter in which a plurality of bands are variable.

In structural coloration using interference of light, successively varying colors from red to green to blue requires physical size of a color development portion to be varied approximately twofold. For example, when the color development portion is made of a rubber-like material, stretching the color development portion approximately twofold enables colors to be successively varied from blue to green to red. When the color development portion is made of a dielectric multilayer film, inclining the color development portion enables a color to be varied approximately several tens of nm from a central wavelength. According to the present invention, only several percent variation in physical size enables the same variation in colors to be achieved, or wavelength shift from several nm to 100 nm can be achieved.

The claimed invention may be embodied as a dielectric multilayer film, to be described later, or a rubber-like substance in which fine particles are evenly dispersed in rubber in such a way as to cause interference of light. For example, a material causing Bragg reflection is applicable. In addition, a material the reflection (transmission) band of which is variable is applicable.

First Embodiment

Hereinafter, a configuration of an image display device element 10 according to a first embodiment will be described. FIG. 1 is a conceptual diagram illustrative of the configuration of the image display device element 10 according to the first embodiment of the present invention. As illustrated in FIG. 1, the image display device element 10 is an element for an image display device that develops a structural color and is an element that includes an element 1 that, among light L emitted by a light source LS, reflects in an oblique direction or absorbs light in a specific wavelength region and transmits light in the other wavelength region, an element 2 that, among light (hereinafter, also referred to as "first transmitted light") T1 that is transmitted by the element 1, reflects light in a specific wavelength region and transmits light in the other wavelength region, a transmitted-light absorbing member AB1 that absorbs light (hereinafter, also referred to as "second transmitted light") T2 that is transmitted by the element 2, and a reflected-light absorbing member AB2 that absorbs light (hereinafter, also referred to as "first reflected light") R1 that is reflected in an oblique direction by the element 1. Hereinafter, the above-described respective components will be described.

Element 1

The element 1 is an element that, among light (hereinafter, simply referred to as "incident light") L that is emitted from the light source LS and is incident on the image display device element 10, absorbs or reflects toward the reflected-light absorbing member AB2 light in a specific wavelength region and transmits light in the other wavelength region and is, for example, an optical filter including a dielectric multilayer film.

The element 1 is arranged on the light source LS side (hereinafter, also referred to as the "display side") in the image display device element 10. The surface on the display side of the element 1 is inclined with respect to the optical axis of the incident light L. For this reason, the first reflected light R1, which is light reflected by the element 1, advances in a direction different from the direction toward an observer OB. Therefore, the observer OB never visually recognizes the first reflected light R1.

For the element 1, an optical filter including a dielectric multilayer film is selected so that desired reflection attenuation characteristics (reflection/transmission characteristics) on the wavelength axis can be obtained when an inclination angle of the element 1 is varied.

Note that, when the element 1 absorbs light in a specific wavelength region among the incident light L, the surface on the display side of the element 1 does not have to be inclined with respect to the optical axis of the incident light L.

Element 2

The element 2 is an element that, among the first transmitted light T1, reflects light in a specific wavelength region in the direction toward the element 1 and transmits light in the other wavelength region and is, for example, an optical filter including a dielectric multilayer film or a polymer film developing a structural color. In FIG. 1, light reflected by the element 2 is denoted as "second reflected light R2".

The element 2 is arranged on the opposite side to the display side of the element 1. The element 2 is also arranged in such a way that the surface on the element 1 side thereof substantially crosses the optical axis of the incident light L at right angles. That is, the elements 1 and 2 are arranged on the optical axis of the incident light L. In other words, the element 2 is overlapped by the element 1 when viewed from the observer OB side.

Hereinafter, an optical unit including the elements 1 and 2 is also referred to as a first optical unit U1. In other words, the first optical unit U1 (image display device element) includes a configuration in which the element 1 in which a boundary wavelength between light absorption and light transmission or a boundary wavelength between light reflection in an oblique direction and light transmission is variable or the boundary wavelength is fixed and the element 2 in which a wavelength region to be reflected is variable or the wavelength region is fixed are arranged in a combination in which at least either the boundary wavelength of the element 1 or the wavelength region of the element 2 is variable and in a positional relationship in which light transmitted by the element 1 is incident on the element 2, in which, by controlling overlap between a light transmission band of the element 1 and a light reflection band of the element 2 through varying at least one of the boundary wavelength of the element 1 and the wavelength region of the element 2, a band of light reflected by the element 2 and the amount of the light are varied.

Transmitted-Light Absorbing Member AB1

The transmitted-light absorbing member AB1 is a member that absorbs the second transmitted light T2 and is, for example, black paper or a device bottom face the surface of which is processed into a black color.

The transmitted-light absorbing member AB1 is arranged on the opposite side to the element 1 side of the element 2 and on the optical axis of the incident light L. That is, the transmitted-light absorbing member AB1 is overlapped by the elements 1 and 2 when viewed from the observer OB side.

Because the transmitted-light absorbing member AB1 absorbs the second transmitted light T2, the observer OB never visually recognizes reflected light of the second transmitted light T2.

Reflected-Light Absorbing Member AB2

The reflected-light absorbing member AB2 is a member that absorbs the first reflected light R1 and is, for example, black paper or a device side face the surface of which is processed into a black color.

The reflected-light absorbing member AB2 is arranged at a place deviated from the optical axis of the incident light L.

Because the reflected-light absorbing member AB2 absorbs the first reflected light R1, the observer OB never visually recognizes the first reflected light R1.

Second Embodiment

Figure 2:
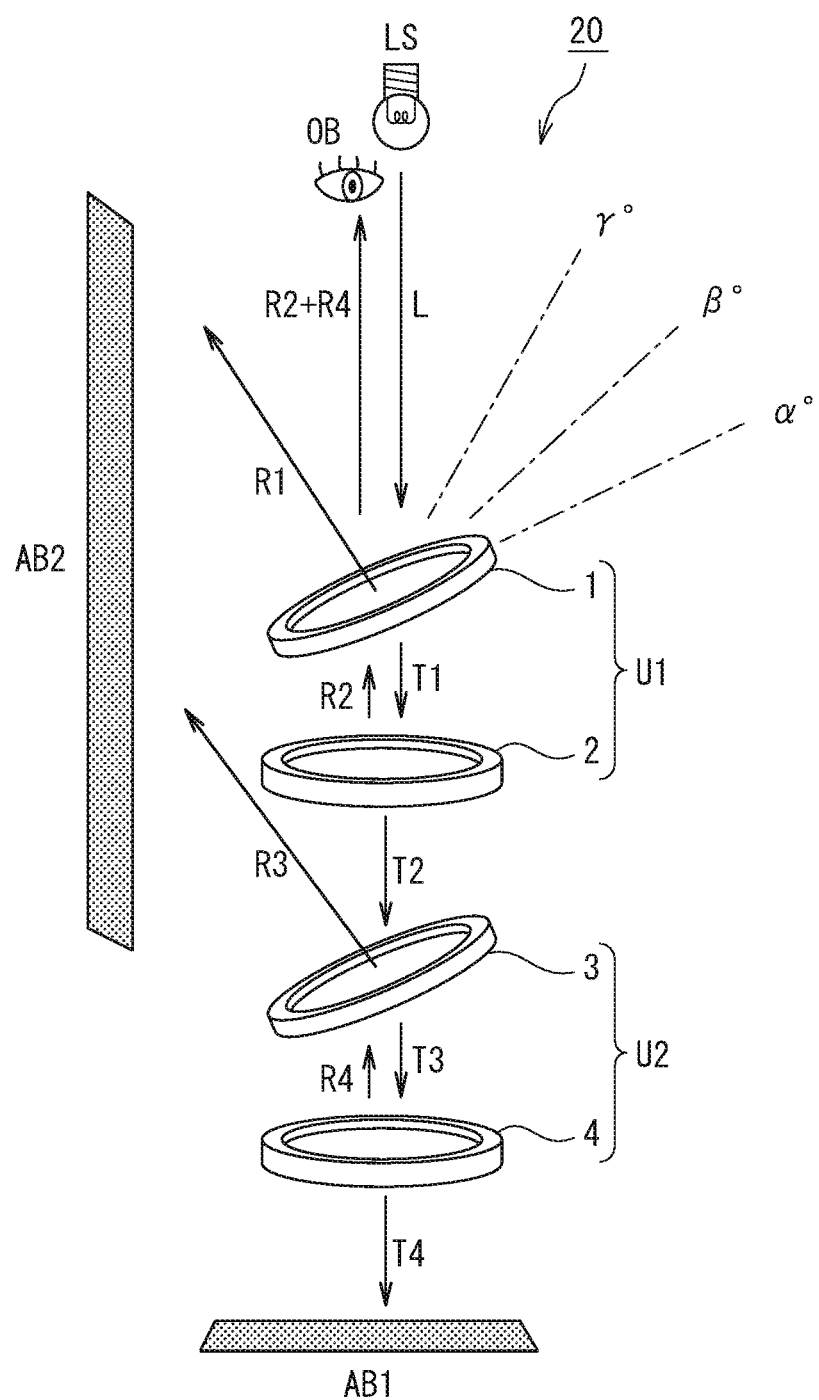
FIG. 2 is a conceptual diagram illustrative of a configuration of an image display device element according a second embodiment of the present invention.

Hereinafter, a configuration of an image display device element 20 according to a second embodiment will be described. FIG. 2 is a conceptual diagram illustrative of the configuration of the image display device element 20 according to the second embodiment of the present invention. As illustrated in FIG. 2, the image display device element 20 is an element for an image display device that develops structural colors and is an element that includes an element 1 that, among light L emitted by a light source LS, reflects or absorbs light in a specific wavelength region and transmits light in the other wavelength region, an element 2 that, among first transmitted light T1 that is light transmitted by the element 1, reflects light in a specific wavelength region and transmits light in the other wavelength region, an element 3 that, among second transmitted light T2 that is light transmitted by the element 2, reflects or absorbs light in a specific wavelength region and transmits light in the other wavelength region, an element 4 that, among light (hereinafter, also referred to as "third transmitted light") T3 that is transmitted by the element 3, reflects or absorbs light in a specific wavelength region and transmits light in the other wavelength region, a transmitted-light absorbing member AB1 that absorbs light (hereinafter, also referred to as "fourth transmitted light") T4 that is transmitted by the element 4, and a reflected-light absorbing member AB2 that absorbs first reflected light R1 that is light reflected by the element 1 and light (hereinafter, also referred to as "third reflected light") R3 that is reflected by the element 3. That is, the image display device element 20 according to the present embodiment is an image display device element that has a configuration in which the elements 3 and 4 are added to the configuration of the image display device element 10 according to the above-described first embodiment. Therefore, the elements 3 and 4, which are portions different from the first embodiment, will be described below.

Element 3

The element 3 is an element that, among the second transmitted light T2, absorbs or reflects toward the reflected-light absorbing member AB2 light in a specific wavelength region and transmits light in the other wavelength region and is, for example, an optical filter including a dielectric multilayer film.

The element 3 is arranged on the opposite side to the light source LS side of a first optical unit U1 and on the optical axis of the incident light L. That is, the element 3 is overlapped by the first optical unit U1 when viewed from the observer OB side. The surface on the first optical unit U1 side of the element 3 is inclined with respect to the optical axis of the incident light L. For this reason, the third reflected light R3, which is light reflected by the element 3, advances in a direction different from the direction toward the observer OB. Therefore, the observer OB never visually recognizes the third reflected light R3.

For the element 3, an optical filter including a dielectric multilayer film is selected so that desired reflection attenuation characteristics (reflection/transmission characteristics) on the wavelength axis can be obtained when an inclination angle of the element 3 is varied.

Note that, when the element 3 absorbs light in a specific wavelength region among the second transmitted light T2, the surface on the first optical unit U1 side of the element 3 does not have to be inclined with respect to the optical axis of the incident light L.

Element 4

The element 4 is an element that, among the third transmitted light T3, reflects light in a specific wavelength region in the direction toward the element 3 and transmits light in the other wavelength region and is, for example, an optical filter including a dielectric multilayer film or a polymer film developing a structural color. In FIG. 2, light reflected by the element 4 is denoted as "fourth reflected light R4".

The element 4 is arranged on the opposite side to the first optical unit U1 side of the element 3. The element 4 is also arranged in such a way that the surface on the element 3 side thereof substantially crosses the optical axis of the incident light L at right angles. That is, the elements 3 and 4 are arranged on the optical axis of the incident light L, and the element 4 is overlapped by the first optical unit U1 and the element 3 when viewed from the observer OB side.

Hereinafter, an optical unit including the elements 3 and 4 is also referred to as a second optical unit U2. In other words, the second optical unit U2 (image display device element) further includes a configuration in which the element 3 in which a boundary wavelength between light absorption and light transmission or a boundary wavelength between light reflection in an oblique direction and light transmission is variable or fixed and the element 4 in which a wavelength region to be reflected is variable or fixed are arranged in a combination in which at least either the boundary wavelength of the element 3 or the wavelength region of the element 4 is variable and in a positional relationship in which light transmitted by the element 3 is incident on the element 4, in which the boundary wavelength of the element 3 is different from the boundary wavelength of the element 1, the wavelength region of the element 4 is different from the wavelength region of the element 2, and, by controlling overlap between a light transmission band of the element 3 and a light reflection band of the element 4 through varying at least one of the boundary wavelength of the element 3 and the wavelength region of the element 4, a band of light reflected by the element 4 and the amount of the light are varied.

Third Embodiment

Figure 3:
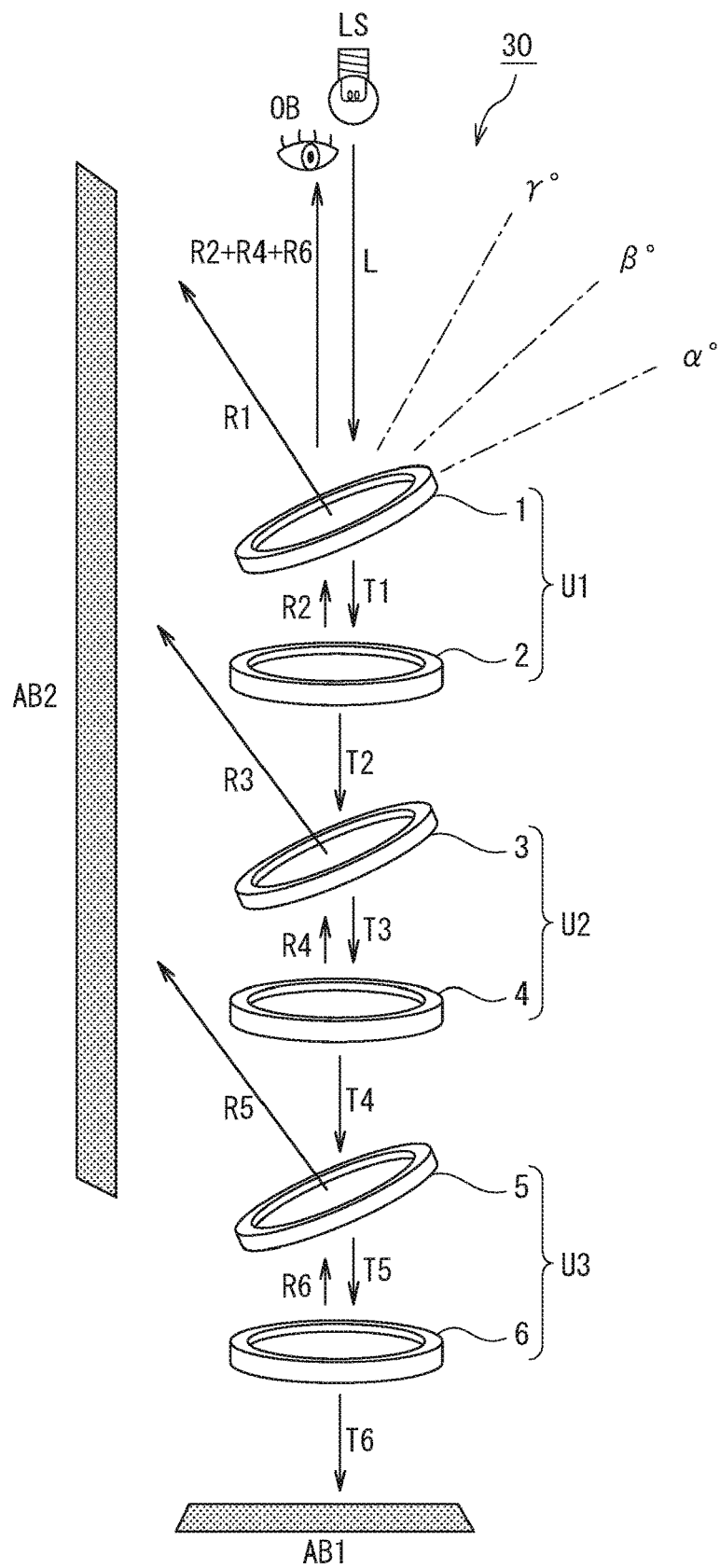
FIG. 3 is a conceptual diagram illustrative of a configuration of an image display device element according a third embodiment of the present invention.

Hereinafter, a configuration of an image display device element 30 according to a third embodiment will be described. FIG. 3 is a conceptual diagram illustrative of the configuration of the image display device element 30 according to the third embodiment of the present invention. As illustrated in FIG. 3, the image display device element 30 is an element for an image display device that develops structural colors and is an element that includes an element 1 that, among light L emitted by a light source LS, reflects or absorbs light in a specific wavelength region and transmits light in the other wavelength region, an element 2 that, among first transmitted light T1 that is light transmitted by the element 1, reflects light in a specific wavelength region and transmits light in the other wavelength region, an element 3 that, among second transmitted light T2 that is light transmitted by the element 2, reflects or absorbs light in a specific wavelength region and transmits light in the other wavelength region, an element 4 that, among third transmitted light T3 that is light transmitted by the element 3, reflects or absorbs light in a specific wavelength region and transmits light in the other wavelength region, an element 5 that, among fourth transmitted light T4 that is light transmitted by the element 4, reflects or absorbs light in a specific wavelength region and transmits light in the other wavelength region, an element 6 that, among light (hereinafter, also referred to as "fifth transmitted light") T5 that is transmitted by the element 5, reflects or absorbs light in a specific wavelength region and transmits light in the other wavelength region, a transmitted-light absorbing member AB1 that absorbs light (hereinafter, also referred to as "sixth transmitted light") T6 that is transmitted by the element 6, and a reflected-light absorbing member AB2 that absorbs first reflected light R1 that is light reflected by the element 1, third reflected light R3 that is light reflected by the element 3, and light (hereinafter, also referred to as "fifth reflected light") R5 that is reflected by the element 5. That is, the image display device element 30 according to the present embodiment is an image display device element that has a configuration in which the elements 5 and 6 are added to the configuration of the image display device element 20 according to the above-described second embodiment. Therefore, the elements 5 and 6, which are portions different from the second embodiment, will be described below.

Element 5

The element 5 is an element that, among the fourth transmitted light T4, absorbs or reflects toward the reflected-light absorbing member AB2 light in a specific wavelength region and transmits light in the other wavelength region and is, for example, an optical filter including a dielectric multilayer film.

The element 5 is arranged on the opposite side to the light source LS side of a second optical unit U2 and on the optical axis of the incident light L. That is, the element 5 is overlapped by the second optical unit U2 when viewed from the observer OB side. The surface on the second optical unit U2 side of the element 5 is inclined with respect to the optical axis of the incident light L. For this reason, the fifth reflected light R5, which is light reflected by the element 5, advances in a direction different from the direction toward the observer OB. Therefore, the observer OB never visually recognizes the fifth reflected light R5.

For the element 5, an optical filter including a dielectric multilayer film is selected so that desired reflection attenuation characteristics (reflection/transmission characteristics) on the wavelength axis can be obtained when an inclination angle of the element 5 is varied.

Note that, when the element 5 absorbs light in a specific wavelength region among the fourth transmitted light T4, the surface on the display side of the element 5 does not have to be inclined with respect to the optical axis of the incident light L.

Element 6

The element 6 is an element that, among the fifth transmitted light T5, reflects light in a specific wavelength region in the direction toward the element 5 and transmits light in the other wavelength region and is, for example, an optical filter including a dielectric multilayer film or a polymer film developing a structural color. In FIG. 3, light reflected by the element 6 is denoted as "sixth reflected light R6".

The element 6 is arranged on the opposite side to the second optical unit U2 side of the element 5. The element 6 is also arranged in such a way that the surface on the element 5 side thereof substantially crosses the optical axis of the incident light L at right angles. That is, the elements 5 and 6 are arranged on the optical axis of the incident light L, and the element 6 is overlapped by the second optical unit U2 and the element 5 when viewed from the observer OB side.

Hereinafter, an optical unit including the elements 5 and 6 is also referred to as a third optical unit U3. In other words, the third optical unit U3 (image display device element) further includes a configuration in which the optical element 5 in which a boundary wavelength between light absorption and light transmission or a boundary wavelength between light reflection in an oblique direction and light transmission is variable or fixed and the element 6 in which a wavelength region to be reflected is variable or fixed are arranged in a combination in which at least either the boundary wavelength of the element 5 or the wavelength region of the element 6 is variable and in a positional relationship in which light transmitted by the element 5 is incident on the element 6, in which the boundary wavelength of the element 5 is different from the boundary wavelength of each of the elements 1 and 3, the wavelength region of the element 6 is different from the wavelength region of each of the elements 2 and 4, and, by controlling overlap between a light transmission band of the element 5 and a light reflection band of the element 6 through varying at least one of the boundary wavelength of the element 5 and the wavelength region of the element 6, a band of light reflected by the element 6 and the amount of the light are varied.

Note that, although, in the embodiment, a case where the element 6 transmits light (sixth transmitted light T6) in a specific wavelength region was described, the present invention is not limited to the case. For example, the element 6 may be an element that reflects light in the whole wavelength region of visible light. That is, the element 6 may be a mirror. In other words, in the present embodiment, the sixth transmitted light T6 may be present or does not have to be present.

Other Embodiments

The present invention is not limited to the above-described respective embodiments. For example, the present invention may be embodied in an embodiment in which optical units according to each of the above-described embodiments are housed in a housing container the inner wall of which is colored in black. In this case, the bottom surface and a side wall of the housing container act as the transmitted-light absorbing member AB1 and the reflected-light absorbing member AB2, respectively.

Hereinafter, first to sixth color development mechanisms that use the image display device element 30 will be described with reference to FIGS. 4 to 9.

First Color Development Mechanism

Figure 4:
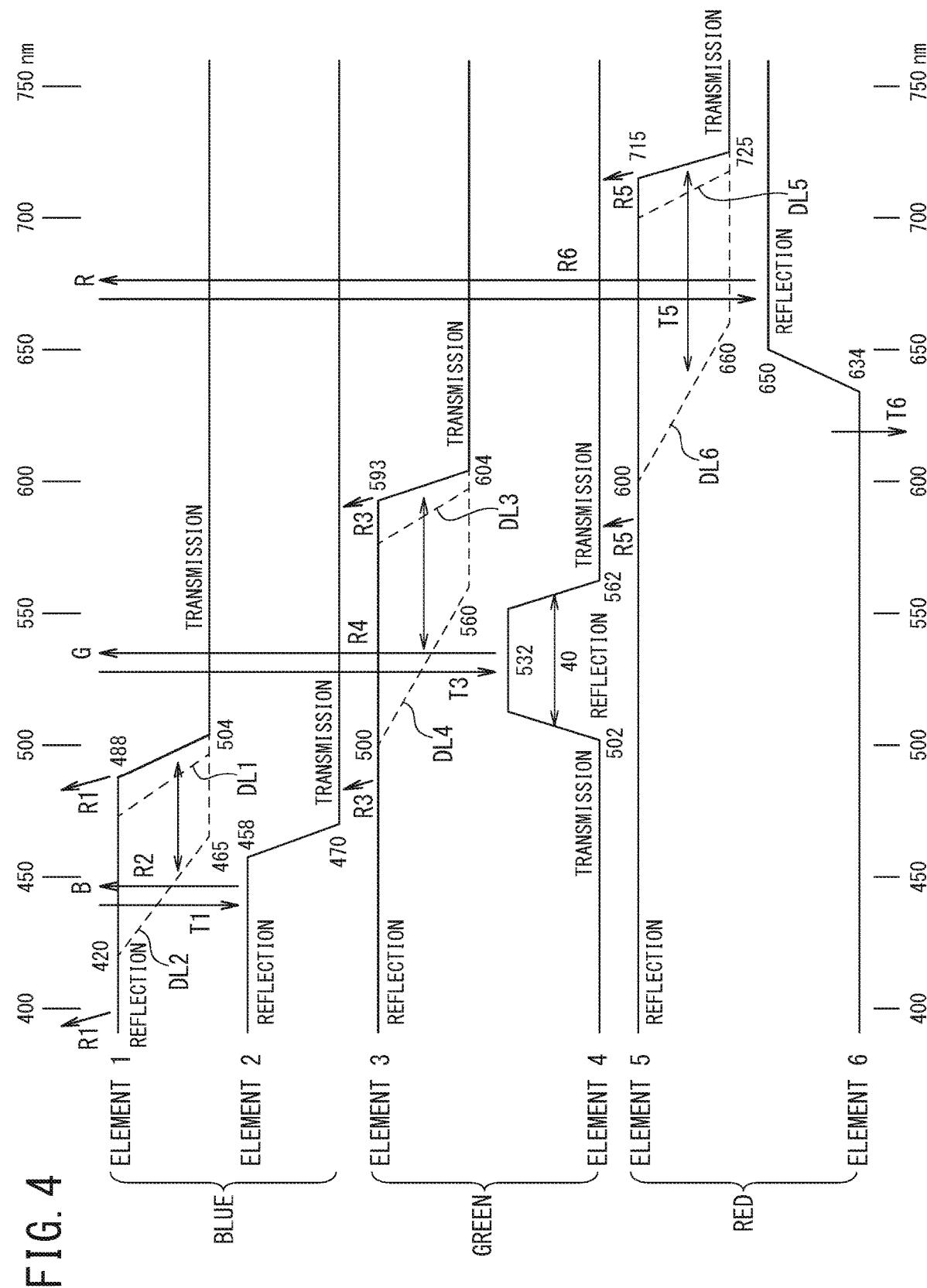
FIG. 4 is a diagram illustrative of reflection/transmission characteristics of respective elements used in the first to third embodiments.

FIG. 4 is a diagram illustrative of respective reflection/transmission characteristics of the elements 1 to 6 included in the image display device element 30. Hereinafter, the respective reflection/transmission characteristics of the elements 1 to 6 and color development characteristics of the first to third optical units U1 to U3 will be described.

Reflection/Transmission Characteristics of Element 1

Among the reflection/transmission characteristics on the wavelength axis illustrated in FIG. 4, the reflection/transmission characteristics at the top illustrate reflection/transmission characteristics of the element 1. The solid line in the top row in FIG. 4 illustrates reflectance of the element 1 when arranged with the incident surface of the element 1 crossing the optical axis of the incident light L at right angles. When the element 1 is arranged with the incident surface thereof crossing the optical axis of the incident light L at right angles, the reflectance of the element 1 is approximately 100% for light having a wavelength of 488 nm or shorter and approximately 0% for light having a wavelength of 504 nm or longer. In a wavelength region where the wavelength is longer than 488 nm and shorter than 504 nm, that is, a boundary wavelength region, the reflectance of the element 1 gradually decreases as the wavelength increases.

The dashed line DL1 in the top row in FIG. 4 illustrates reflectance of the element 1 when arranged with the incident surface of the element 1 inclined approximately 20° with respect to the optical axis of the incident light L.

The dashed line DL2 in the top row in FIG. 4 illustrates reflectance of the element 1 when arranged with the incident surface of the element 1 inclined approximately 60° with respect to the optical axis of the incident light L. When the element 1 is arranged with the incident surface thereof inclined approximately 60° with respect to the optical axis of the incident light L, the reflectance of the element 1 is approximately 100% for light having a wavelength of 420 nm or shorter and approximately 0% for light having a wavelength of 465 nm or longer. In a wavelength region where the wavelength is longer than 420 nm and shorter than 465 nm, that is, a boundary wavelength region, the reflectance of the element 1 gradually decreases as the wavelength increases.

That is, inclining the incident surface of the element 1 with respect to the optical axis of the incident light L enables a transmission wavelength region for the incident light L to be shifted to the short wavelength side.

(Reflection/Transmission Characteristics of Element 2)

Among the reflection/transmission characteristics on the wavelength axis illustrated in FIG. 4, the reflection/transmission characteristics in the second row from the top illustrate reflection/transmission characteristics of the element 2. The solid line in the second row in FIG. 4 illustrates reflectance of the element 2 when arranged with the incident surface of the element 2 crossing the optical axis of the incident light L at right angles. When the element 2 is arranged with the incident surface thereof crossing the optical axis of the incident light L at right angles, the reflectance of the element 2 is approximately 100% for light having a wavelength of 458 nm or shorter and approximately 0% for light having a wavelength of 470 nm or longer. In a wavelength region where the wavelength is longer than 458 nm and shorter than 470 nm, that is, a boundary wavelength region, the reflectance of the element 2 gradually decreases as the wavelength increases.

Color Development Characteristics of First Optical Unit U1

Color development characteristics of the first optical unit U1 when including the above-described elements 1 and 2 will be described.

When the light L from the light source LS is incident on the first optical unit U1 that is in a state in which the incident surface of the element 1 is inclined approximately 60° with respect to the optical axis of the incident light L, light (blue (B)) having a wavelength of around 430 nm among the incident light L is transmitted by the element 1 and reflected (Bragg reflection) by the element 2 to the observer OB side. On this occasion, the light (blue (B)) having a wavelength of around 430 nm reflected by the element 2 is transmitted by the element 1. For this reason, the observer OB can visually recognize the light (blue (B)) having a wavelength of around 430 nm, which is the second reflected light R2.

Light (first reflected light R1) having a wavelength of shorter than 420 nm among the incident light L is reflected (Bragg reflection) by the element 1 in the direction toward the reflected-light absorbing member AB2 and absorbed thereby. For this reason, the observer OB cannot visually recognize the light having a wavelength of shorter than 420 nm, which is the first reflected light R1. While, in FIG. 4, oblique arrows pertaining to the first reflected light R1 are illustrated, the oblique arrows mean that the first reflected light R1 is reflected obliquely in the direction toward the reflected-light absorbing member AB2.

In addition, light having a wavelength of longer than 470 nm among the incident light L is transmitted by each of the elements 1 and 2 and incident on the element 3, which is included in the second optical unit U2.

In the case of the image display device element 10, which includes only the first optical unit U1, the second transmitted light T2 that is transmitted by the first optical unit U1 is absorbed by the transmitted-light absorbing member AB1. For this reason, the observer OB cannot visually recognize the second transmitted light T2. Therefore, the observer OB can visually recognize only the light (blue (B)) having a wavelength of around 430 nm, which is the second reflected light R2.

Varying the amount of overlap between a light transmission band of the element 1 and a light reflection band of the element 2 through varying the boundary wavelength of the element 1 enables a band of reflected light and the amount of the light to be varied, and eliminating the overlap between the light transmission band of the element 1 and the light reflection band of the element 2 enables light advancing in the direction toward the observer OB to be reduced and cut off.

That is, an image display device element based on the color development mechanism includes the element 1 that has light absorption characteristics or light reflection characteristics in an oblique direction on the short wavelength side and light transmission characteristics on the long wavelength side and in which a boundary wavelength between the characteristics is variable and the element 2 that has light reflection characteristics on the short wavelength side and light transmission characteristics on the long wavelength side and in which a boundary wavelength between the characteristics is fixed and is configured in such a way that light emitted from a light source proceeds toward the element 1, the element 1 absorbs or reflects in an oblique direction light on the short wavelength side, light transmitted by the element 1 reaches the element 2, the element 2 reflects light in a specific wavelength region among the light having reached the element 2, and the reflected light proceeds toward the element 1, is transmitted by the element 1, and advances toward an observer.

Reflection/Transmission Characteristics of Element 3

Among the reflection/transmission characteristics on the wavelength axis illustrated in FIG. 4, the reflection/transmission characteristics in the third row from the top illustrate reflection/transmission characteristics of the element 3. The solid line in the third row in FIG. 4 illustrates reflectance of the element 3 when arranged with the incident surface of the element 3 crossing the optical axis of the incident light L at right angles. When the element 3 is arranged with the incident surface thereof crossing the optical axis of the incident light L at right angles, the reflectance of the element 3 is approximately 100% for light having a wavelength of 593 nm or shorter and approximately 0% for light having a wavelength of 604 nm or longer. In a wavelength region where the wavelength is longer than 593 nm and shorter than 604 nm, that is, a boundary wavelength region, the reflectance of the element 3 gradually decreases as the wavelength increases.

The dashed line DL3 in the third row in FIG. 4 illustrates reflectance of the element 3 when arranged with the incident surface of the element 3 inclined approximately 20° with respect to the optical axis of the incident light L.

The dashed line DL4 in the third row in FIG. 4 illustrates reflectance of the element 3 when arranged with the incident surface of the element 3 inclined approximately 60° with respect to the optical axis of the incident light L. When the element 3 is arranged with the incident surface thereof inclined approximately 60° with respect to the optical axis of the incident light L, the reflectance of the element 3 is approximately 100% for light having a wavelength of 500 nm or shorter and approximately 0% for light having a wavelength of 560 nm or longer. In a wavelength region where the wavelength is longer than 500 nm and shorter than 560 nm, that is, a boundary wavelength region, the reflectance of the element 3 gradually decreases as the wavelength increases.

That is, inclining the incident surface of the element 3 with respect to the optical axis of the incident light L enables a transmission wavelength region for the incident light L to be shifted to the short wavelength side.

Reflection/Transmission Characteristics of Element 4

Among the reflection/transmission characteristics on the wavelength axis illustrated in FIG. 4, the reflection/transmission characteristics in the fourth row from the top illustrate reflection/transmission characteristics of the element 4. The solid line in the fourth row in FIG. 4 illustrates reflectance of the element 4 when arranged with the incident surface of the element 4 crossing the optical axis of the incident light L at right angles. When the element 4 is arranged with the incident surface thereof crossing the optical axis of the incident light L at right angles, the reflectance of the element 4 is approximately 100% for light having a wavelength of around 532 nm and approximately 0% for light having a wavelength of 502 nm or shorter or 562 nm or longer. The half-width of the reflection band is 40 nm.

Color Development Characteristics of Second Optical Unit U2

Color development characteristics of the second optical unit U2 when including the above-described elements 3 and 4 will be described.

When the second transmitted light T2 transmitted by the above-described first optical unit U1 is incident on the second optical unit U2 that is in a state in which the incident surface of the element 3 is inclined approximately 60° with respect to the optical axis of the incident light L, light (green (G)) having a wavelength of around 532 nm among the second transmitted light T2 is transmitted by the element 3 and reflected by the element 4 to the observer OB side. On this occasion, the light (green (G)) having a wavelength of around 532 nm reflected by the element 4 is transmitted by the element 3 and the first optical unit U1. For this reason, the observer OB can visually recognize the light (green (G)) having a wavelength of around 532 nm, which is the fourth reflected light R4.

Light (third reflected light R3) having a wavelength of shorter than 500 nm among the second transmitted light T2 is reflected by the element 3 in the direction toward the reflected-light absorbing member AB2 and absorbed thereby. For this reason, the observer OB cannot visually recognize the light having a wavelength of shorter than 500 nm, which is the third reflected light R3. While, in FIG. 4, oblique arrows pertaining to the third reflected light R3 are illustrated, the oblique arrows mean that the third reflected light R3 is reflected obliquely in the direction toward the reflected-light absorbing member AB2.

In addition, light having a wavelength of longer than 562 nm among the second transmitted light T2 is transmitted by each of the elements 3 and 4 and incident on the element 5, which is included in the third optical unit U3.

In the case of the image display device element 20, which includes the first and second optical units U1 and U2, the fourth transmitted light T4 that is transmitted by the second optical unit U2 is absorbed by the transmitted-light absorbing member AB1. For this reason, the observer OB cannot visually recognize the fourth transmitted light T4. Therefore, the observer OB can visually recognize a light blue color that is a composite color of the light (blue (B)) having a wavelength of around 430 nm, which is the second reflected light R2, and the light (green (G)) having a wavelength of around 532 nm, which is the fourth reflected light R4.

That is, the image display device element based on the color development mechanism further includes the element 3 that has light absorption characteristics or light reflection characteristics in an oblique direction on the short wavelength side and light transmission characteristics on the long wavelength side and in which a boundary wavelength between the characteristics is variable and the element 4 that has light reflection characteristics on the short wavelength side and light transmission characteristics on the long wavelength side and in which a boundary wavelength between the characteristics is fixed and is configured in such a way that light emitted from the light source and transmitted by the elements 1 and 2 proceeds toward the element 3, the element 3 absorbs or reflects in an oblique direction light on the short wavelength side, light transmitted by the element 3 reaches the element 4, the element 4 reflects light in a specific wavelength region among the light having reached the element 4, and the reflected light proceeds toward the element 3, is transmitted by the elements 3, 2, and 1, and advances toward the observer.

Reflection/Transmission Characteristics of Element 5

Among the reflection/transmission characteristics on the wavelength axis illustrated in FIG. 4, the reflection/transmission characteristics in the fifth row from the top illustrate reflection/transmission characteristics of the element 5. The solid line in the fifth row in FIG. 4 illustrates reflectance of the element 5 when arranged with the incident surface of the element 5 crossing the optical axis of the incident light L at right angles. When the element 5 is arranged with the incident surface thereof crossing the optical axis of the incident light L at right angles, the reflectance of the element 5 is approximately 100% for light having a wavelength of 715 nm or shorter and approximately 0% for light having a wavelength of 725 nm or longer. In a wavelength region where the wavelength is longer than 715 nm and shorter than 725 nm, that is, a boundary wavelength region, the reflectance of the element 3 gradually decreases as the wavelength increases.

The dashed line DL5 in the fifth row in FIG. 4 illustrates reflectance of the element 5 when arranged with the incident surface of the element 5 inclined approximately 20° with respect to the optical axis of the incident light L.

The dashed line DL6 in the fifth row in FIG. 4 illustrates reflectance of the element 5 when arranged with the incident surface of the element 5 inclined approximately 60° with respect to the optical axis of the incident light L. When the element 5 is arranged with the incident surface thereof inclined approximately 60° with respect to the optical axis of the incident light L, the reflectance of the element 5 is approximately 100% for light having a wavelength of 600 nm or shorter and approximately 0% for light having a wavelength of 660 nm or longer. In a wavelength region where the wavelength is longer than 600 nm and shorter than 660 nm, that is, a boundary wavelength region, the reflectance of the element 1 gradually decreases as the wavelength increases.

That is, inclining the incident surface of the element 5 with respect to the optical axis of the incident light L enables a transmission wavelength region for the incident light L to be shifted to the short wavelength side.

Reflection/Transmission Characteristics of Element 6

Among the reflection/transmission characteristics on the wavelength axis illustrated in FIG. 4, the reflection/transmission characteristics in the sixth row from the top (the bottom row) illustrate reflection/transmission characteristics of the element 6. The solid line in the sixth row in FIG. 4 illustrates reflectance of the element 6 when arranged with the incident surface of the element 6 crossing the optical axis of the incident light L at right angles. When the element 6 is arranged with the incident surface thereof crossing the optical axis of the incident light L at right angles, the reflectance of the element 6 is approximately 100% for light having a wavelength of 650 nm or longer and approximately 0% for light having a wavelength of 634 nm or shorter. In a wavelength region where the wavelength is longer than 634 nm and shorter than 650 nm, that is, a boundary wavelength region, the reflectance of the element 6 gradually increases as the wavelength increases. Note that the element 6 may have both a reflection band and a transmission band as described above or may have only a reflection band. That is, the element 6 may be a mirror.

Color Development Characteristics of Third Optical Unit U3

Color development characteristics of the third optical unit U3 when including the above-described elements 5 and 6 will be described.

When the fourth transmitted light T4 transmitted by the above-described second optical unit U2 is incident on the third optical unit U3 that is in a state in which the incident surface of the element 5 is inclined approximately 60° with respect to the optical axis of the incident light L, light (red (R)) having a wavelength of around 700 nm among the fourth transmitted light T4 is transmitted by the element 5 and reflected by the element 6 to the observer OB side. On this occasion, the light (red (R)) having a wavelength of around 700 nm reflected by the element 6 is transmitted by the element 5, the second optical unit U2, and the first optical unit U1. For this reason, the observer OB can visually recognize the light (red (R)) having a wavelength of around 700 nm, which is the sixth reflected light R6.

Light (fifth reflected light R5) having a wavelength of shorter than 600 nm among the fourth transmitted light T4 is reflected by the element 5 in the direction toward the reflected-light absorbing member AB2 and absorbed thereby. For this reason, the observer OB cannot visually recognize the light having a wavelength of shorter than 600 nm, which is the fifth reflected light R5. While, in FIG. 4, oblique arrows pertaining to the fifth reflected light R5 are illustrated, the oblique arrows mean that the fifth reflected light R5 is reflected obliquely in the direction toward the reflected-light absorbing member AB2.

In the case of the image display device element 30, which includes the first to third optical units U1 to U3, the sixth transmitted light T6 that is transmitted by the third optical unit U3 is absorbed by the transmitted-light absorbing member AB1. For this reason, the observer OB cannot visually recognize the sixth transmitted light T6. Therefore, the observer OB can visually recognize a white color that is a composite color of the light (blue (B)) having a wavelength of around 430 nm, which is the second reflected light R2, the light (green (G)) having a wavelength of around 532 nm, which is the fourth reflected light R4, and the light (red (R)) having a wavelength of around 700 nm, which is the sixth reflected light R6.

That is, the image display device element based on the color development mechanism further includes the element 5 that has light absorption characteristics or light reflection characteristics in an oblique direction on the short wavelength side and light transmission characteristics on the long wavelength side and in which a boundary wavelength between the characteristics is variable and the element 6 that has light reflection characteristics on the short wavelength side and light transmission characteristics on the long wavelength side and in which a boundary wavelength between the characteristics is fixed and is configured in such a way that light emitted from the light source and transmitted by the elements 1, 2, 3, and 4 proceeds toward the element 5, the element 5 absorbs or reflects in an oblique direction light on the short wavelength side, light transmitted by the element 5 reaches the element 6, the element 6 reflects light in a specific wavelength region among the light having reached the element 6, and the reflected light proceeds toward the element 5, is transmitted by the elements 5, 4, 3, 2, and 1, and advances toward the observer.

The image display device element illustrated in FIG. 4 expresses full colors by reflecting blue (B), green (G), and red (R) light in this order, that is, reflecting light in ascending order of wavelength. That is, the first optical unit U1, which develops a blue (B) color, switches, with respect to light in a wavelength region of blue (B), reflection in the direction in which the observer OB can visually recognize the light and reflection in a direction in which the observer OB cannot visually recognize the light. The first optical unit U1 transmits light having a wavelength longer than that of the blue (B) light to the second optical unit U2 at the succeeding stage.

The second optical unit U2, which develops a green (G) color, switches, with respect to light in a wavelength region of green (G), reflection in the direction in which the observer OB can visually recognize the light and reflection in a direction in which the observer OB cannot visually recognize the light. The second optical unit U2 transmits light having a wavelength longer than that of the green (G) light to the third optical unit U3 at the succeeding stage.

The third optical unit U3, which develops a red (R) color, switches, with respect to light in a wavelength region of red (R), reflection in the direction in which the observer OB can visually recognize the light and reflection in a direction in which the observer OB cannot visually recognize the light. Because the third optical unit U3 does not have to transmit light to a succeeding stage, the element 6 may be a mirror. Note that the element 6 is required to be an element that functions as a mirror in the same wavelength range as a variable range of the boundary wavelength of the element 5 between light reflection in an oblique direction and light transmission.

Variations

Although, in the above-described first color development mechanism, a case where, in the image display device element 10 including only the first optical unit U1, the elements 1 and 2 are combined as elements constituting the first optical unit U1 and a blue color is developed by the first optical unit U1 was described, the present invention is not limited to the case. The elements 3 and 4 may be combined as elements constituting the first optical unit U1, and a green color may be developed by the first optical unit U1. In addition, the elements 5 and 6 may be combined as elements constituting the first optical unit U1, and a red color may be developed by the first optical unit U1.

Although a case where, in the image display device element 20 including the first and second optical units U1 and U2, the elements 1 and 2 are combined as elements constituting the first optical unit U1 and a blue color is developed by the first optical unit U1 and the elements 3 and 4 are combined as elements constituting the second optical unit U2 and a green color is developed by the second optical unit U2 was described, the present invention is not limited to the case. A green color and a red color may be developed by the first and second optical units U1 and U2, respectively. A blue color and a red color may be developed by the first and second optical units U1 and U2, respectively.

The above-described specific numerical values indicating reflection bands and transmission bands of the elements 1 to 6 were used for descriptive purposes, and the claimed invention is not limited to the numerical values. It is essential that the element 1 is required to be an element that transmits light having a longer wavelength than that of blue light and the element 2 is required to be an element that reflects blue light. The element 3 is required to be an element that transmits light having a longer wavelength than that of green light and the element 4 is required to be an element that reflects green light. The element 5 is required to be an element that transmits light having a longer wavelength than that of red light and the element 6 is required to be an element that reflects red light.

Second Color Development Mechanism

Figure 5:
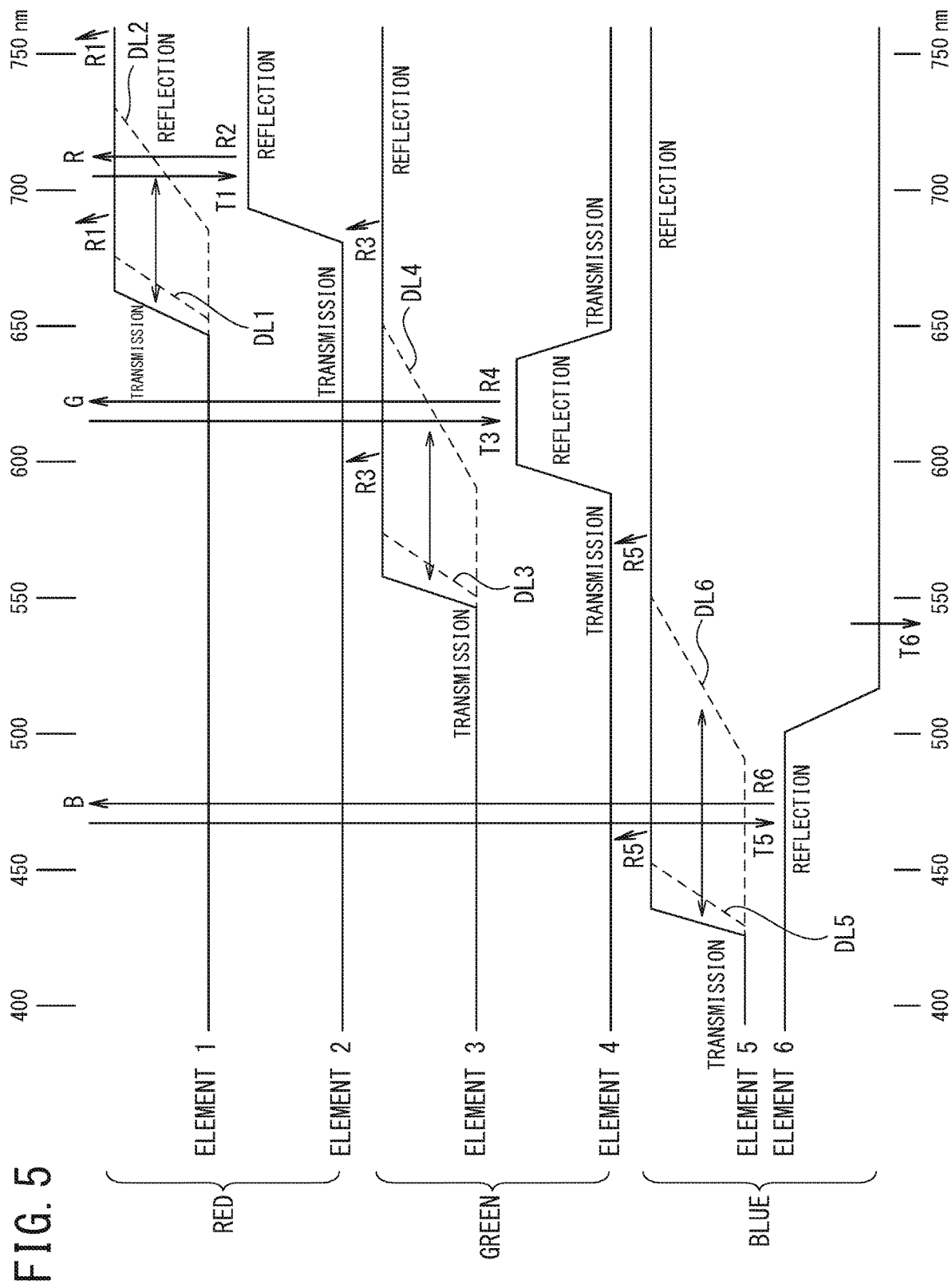
FIG. 5 is a diagram illustrative of reflection/transmission characteristics of other respective elements used in the first to third embodiments.

Although, in the above-described first color development mechanism, a case where blue, green, and red light are reflected by the elements 2, 4, and 6 included in the first, second, and third optical units U1, U2, and U3, respectively, was described, the present invention is not limited to the case. For example, as illustrated in FIG. 5, red, green, and blue light may be reflected by the first, second, and third optical units U1, U2, and U3, respectively, to the observer OB side and the respective colors may be visually recognized by the observer OB. It is essential that the element 1 is required to be an element that transmits light having a shorter wavelength than that of red light and the element 2 is required to be an element that reflects red light. The element 3 is required to be an element that transmits light having a shorter wavelength than that of green light and the element 4 is required to be an element that reflects green light. The element 5 is required to be an element that transmits light having a shorter wavelength than that of blue light and the element 6 is required to be an element that reflects blue light.

The basic principle of the color development mechanism is the same as that of the first color development mechanism. Therefore, a description of the basic principle of the color development mechanism will now be omitted.

That is, an image display device element based on the color development mechanism includes the element 1 that has light absorption characteristics or light reflection characteristics in an oblique direction on the long wavelength side and light transmission characteristics on the short wavelength side and in which a boundary wavelength between the characteristics is variable and the element 2 that has light reflection characteristics on the long wavelength side and light transmission characteristics on the short wavelength side and in which a boundary wavelength between the characteristics is fixed and is configured in such a way that light emitted from a light source proceeds toward the element 1, the element 1 absorbs or reflects in an oblique direction light on the long wavelength side, light transmitted by the element 1 reaches the element 2, the element 2 reflects light in a specific wavelength region among the light having reached the element 2, and the reflected light proceeds toward the element 1, is transmitted by the element 1, and advances toward an observer.

In addition, the image display device element based on the color development mechanism further includes the element 3 that has light absorption characteristics or light reflection characteristics in an oblique direction on the long wavelength side and light transmission characteristics on the short wavelength side and in which a boundary wavelength between the characteristics is variable and the element 4 that has light reflection characteristics on the long wavelength side and light transmission characteristics on the short wavelength side and in which a boundary wavelength between the characteristics is fixed and is configured in such a way that light emitted from the light source and transmitted by the elements 1 and 2 proceeds toward the element 3, the element 3 absorbs or reflects in an oblique direction light on the long wavelength side, light transmitted by the element 3 reaches the element 4, the element 4 reflects light in a specific wavelength region among the light having reached the element 4, and the reflected light proceeds toward the element 3, is transmitted by the elements 3, 2, and 1, and advances toward the observer.

Further, the image display device element based on the color development mechanism further includes the element 5 that has light absorption characteristics or light reflection characteristics in an oblique direction on the long wavelength side and light transmission characteristics on the short wavelength side and in which a boundary wavelength between the characteristics is variable and the element 6 that has light transmission characteristics on the long wavelength side and light reflection characteristics on the short wavelength side and in which a boundary wavelength between the characteristics is fixed and is configured in such a way that light emitted from the light source and transmitted by the elements 1, 2, 3, and 4 proceeds toward the element 5, the element 5 absorbs or reflects in an oblique direction light on the long wavelength side, light transmitted by the element 5 reaches the element 6, the element 6 reflects light in a specific wavelength region among the light having reached the element 6, and the reflected light proceeds toward the element 5, is transmitted by the elements 5, 4, 3, 2, and 1, and advances toward the observer.

Third Color Development Mechanism

Figure 6:
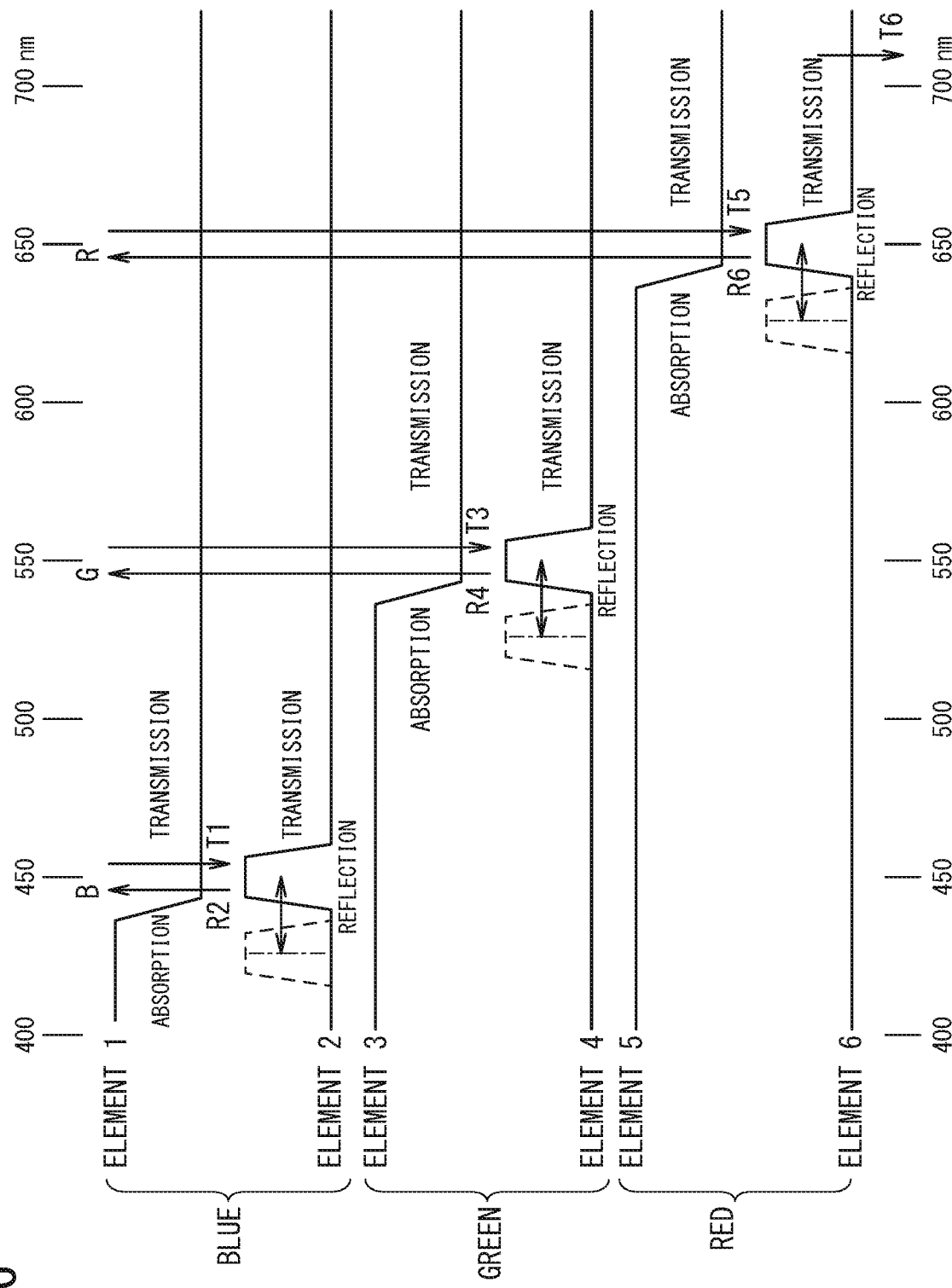
FIG. 6 is a diagram illustrative of reflection/absorption/transmission characteristics of still other respective elements used in the first to third embodiments.

In the above-described first color development mechanism, a case where blue, green, and red light are reflected by varying the reflection/transmission characteristics of the elements 1, 3, and 5 included in the first, second, and third optical units U1, U2, and U3, respectively, was described. In the above-described second color development mechanism, a case where red, green, and blue light are reflected by varying the reflection/transmission characteristics of the elements 1, 3, and 5 included in the first, second, and third optical units U1, U2, and U3, respectively, was described. However, the present invention is not limited to the cases. For example, as illustrated in FIG. 6, by fixing the absorption/transmission characteristics of the elements 1, 3, and 5 and reflecting blue, green, and red light through varying the reflection/transmission characteristics of the elements 2, 4, and 6 included in the first, second, and third optical units U1, U2, and U3, respectively, the respective colors may be visually recognized by the observer OB. In addition, in the present invention, the elements 1, 3, and 5 may respectively absorb light in specific wavelength regions.

The basic principle of the color development mechanism is the same as that of the above-described respective color development mechanisms. Therefore, a description of the basic principle of the color development mechanism will now be omitted.

When a reflection band of each of the elements 2, 4, and 6 is varied, thickness of the element may, for example, be varied by applying voltage to the element. The thickness of each element may also be varied by pressing or stretching the element in the thickness direction. The thickness of each element may also be varied by pressing or stretching the element in a direction crossing with the thickness direction.

Width of a reflection band of each of the elements 2, 4, and 6 is required to be set at a width that enables the amount of the light required for an image display device element to be obtained.

When the color development mechanism is used, varying the amount of overlap between a light transmission band of the element 1 and a light reflection band of the element 2 through varying boundary wavelengths of the element 2 enables a band of reflected light and the amount of the light to be varied, and eliminating the overlap between the light transmission band of the element 1 and the light reflection band of the element 2 enables light advancing in the direction toward the observer OB to be reduced and cut off.

That is, an image display device element based on the color development mechanism includes the element 1 that has light absorption characteristics or light reflection characteristics in an oblique direction on the short wavelength side and light transmission characteristics on the long wavelength side and in which a boundary wavelength between the characteristics is fixed and the element 2 that has light reflection characteristics on the short wavelength side and light transmission characteristics on the long wavelength side and in which a boundary wavelength between the characteristics is variable and is configured in such a way that light emitted from a light source proceeds toward the element 1, the element 1 absorbs or reflects in an oblique direction light on the short wavelength side, light transmitted by the element 1 reaches the element 2, the element 2 reflects light in a specific wavelength region among the light having reached the element 2, and the reflected light proceeds toward the element 1, is transmitted by the element 1, and advances toward an observer.

In addition, the image display device element based on the color development mechanism further includes the element 3 that has light absorption characteristics or light reflection characteristics in an oblique direction on the short wavelength side and light transmission characteristics on the long wavelength side and in which a boundary wavelength between the characteristics is fixed and the element 4 that has light reflection characteristics on the short wavelength side and light transmission characteristics on the long wavelength side and in which a boundary wavelength between the characteristics is variable and is configured in such a way that light emitted from the light source and transmitted by the elements 1 and 2 proceeds toward the element 3, the element 3 absorbs or reflects in an oblique direction light on the short wavelength side, light transmitted by the element 3 reaches the element 4, the element 4 reflects light in a specific wavelength region among the light having reached the element 4, and the reflected light proceeds toward the element 3, is transmitted by the elements 3, 2, and 1, and advances toward the observer.

Further, the image display device element based on the color development mechanism further includes the element 5 that has light absorption characteristics or light reflection characteristics in an oblique direction on the short wavelength side and light transmission characteristics on the long wavelength side and in which a boundary wavelength between the characteristics is fixed and the element 6 that has light reflection characteristics on the short wavelength side and light transmission characteristics on the long wavelength side and in which a boundary wavelength between the characteristics is variable and is configured in such a way that light emitted from the light source and transmitted by the elements 1, 2, 3, and 4 proceeds toward the element 5, the element 5 absorbs or reflects in an oblique direction light on the short wavelength side, light transmitted by the element 5 reaches the element 6, the element 6 reflects light in a specific wavelength region among the light having reached the element 6, and the reflected light proceeds toward the element 5, is transmitted by the elements 5, 4, 3, 2, and 1, and advances toward the observer.

Fourth Color Development Mechanism

Figure 7:
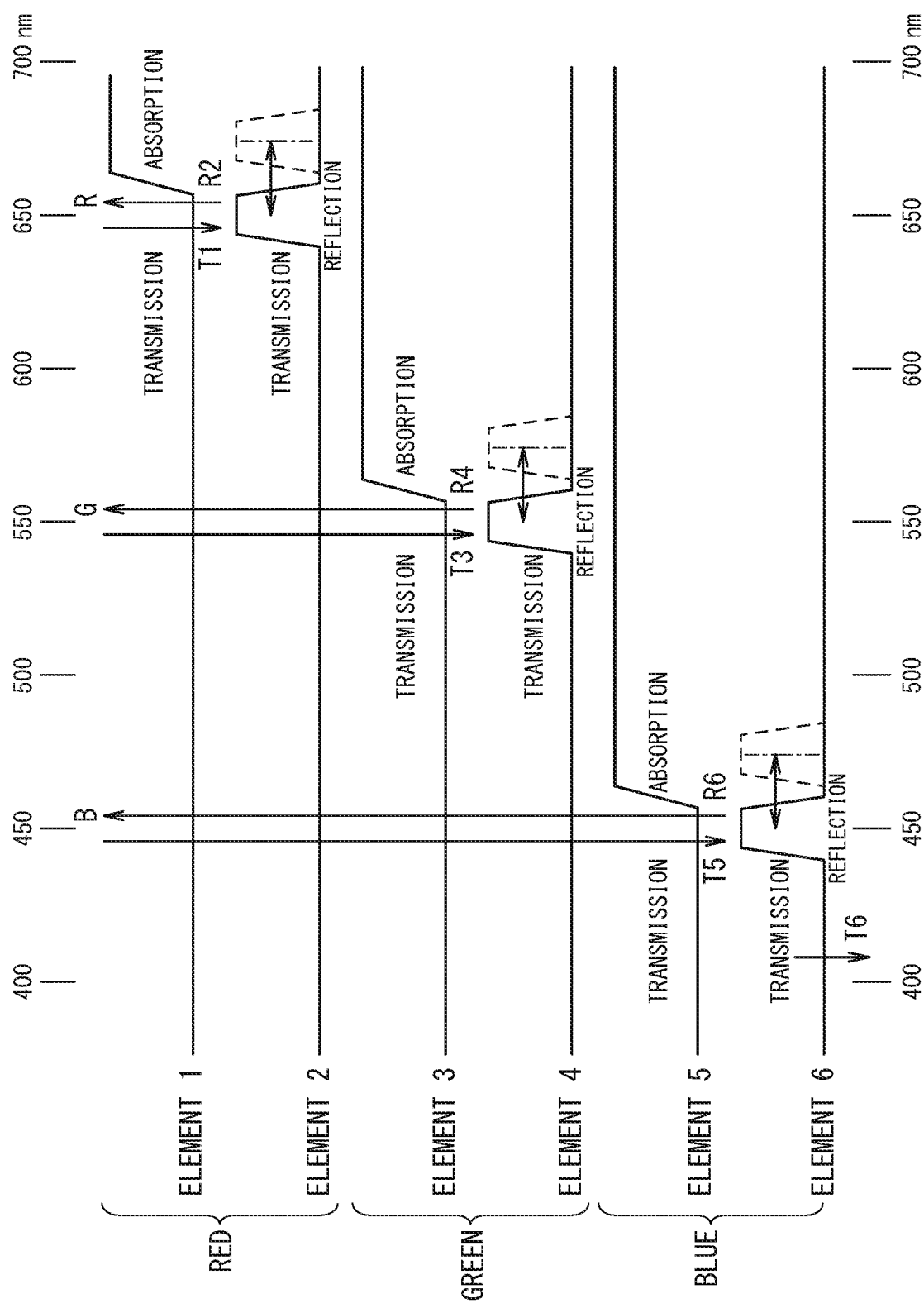
FIG. 7 is a diagram illustrative of reflection/absorption/transmission characteristics of still other respective elements used in the first to third embodiments.

Although, in the above-described third color development mechanism, a case where blue, green, and red light are reflected by the elements 2, 4, and 6 included in the first, second, and third optical units U1, U2, and U3, respectively, was described, the present invention is not limited to the case. For example, as illustrated in FIG. 7, by varying the reflection/transmission characteristics of the elements 2, 4, and 6, red, green, and blue light may be reflected by the first, second, and third optical units U1, U2, and U3, respectively, to the observer OB side and the respective colors may be visually recognized by the observer OB.

The basic principle of the color development mechanism is the same as that of the above-described respective color development mechanisms. Therefore, a description of the basic principle of the color development mechanism will now be omitted.

That is, an image display device element based on the color development mechanism includes the element 1 that has light absorption characteristics or light reflection characteristics in an oblique direction on the long wavelength side and light transmission characteristics on the short wavelength side and in which a boundary wavelength between the characteristics is fixed and the element 2 that has light reflection characteristics on the long wavelength side and light transmission characteristics on the short wavelength side and in which a boundary wavelength between the characteristics is variable and is configured in such a way that light emitted from a light source proceeds toward the element 1, the element 1 absorbs or reflects in an oblique direction light on the long wavelength side, light transmitted by the element 1 reaches the element 2, the element 2 reflects light in a specific wavelength region among the light having reached the element 2, and the reflected light proceeds toward the element 1, is transmitted by the element 1, and advances toward an observer.

In addition, the image display device element based on the color development mechanism further includes the element 3 that has light absorption characteristics or light reflection characteristics in an oblique direction on the long wavelength side and light transmission characteristics on the short wavelength side and in which a boundary wavelength between the characteristics is fixed and the element 4 that has light reflection characteristics on the long wavelength side and light transmission characteristics on the short wavelength side and in which a boundary wavelength between the characteristics is variable and is configured in such a way that light emitted from the light source and transmitted by the elements 1 and 2 proceeds toward the element 3, the element 3 absorbs or reflects in an oblique direction light on the long wavelength side, light transmitted by the element 3 reaches the element 4, the element 4 reflects light in a specific wavelength region among the light having reached the element 4, and the reflected light proceeds toward the element 3, is transmitted by the elements 3, 2, and 1, and advances toward the observer.

Further, the image display device element based on the color development mechanism further includes the element 5 that has light absorption characteristics or light reflection characteristics in an oblique direction on the long wavelength side and light transmission characteristics on the short wavelength side and in which a boundary wavelength between the characteristics is fixed and the element 6 that has light reflection characteristics on the long wavelength side and light transmission characteristics on the short wavelength side and in which a boundary wavelength between the characteristics is variable and is configured in such a way that light emitted from the light source and transmitted by the elements 1, 2, 3, and 4 proceeds toward the element 5, the element 5 absorbs or reflects in an oblique direction light on the long wavelength side, light transmitted by the element 5 reaches the element 6, the element 6 reflects light in a specific wavelength region among the light having reached the element 6, and the reflected light proceeds toward the element 5, is transmitted by the elements 5, 4, 3, 2, and 1, and advances toward the observer.

Fifth Color Development Mechanism

Figure 8:
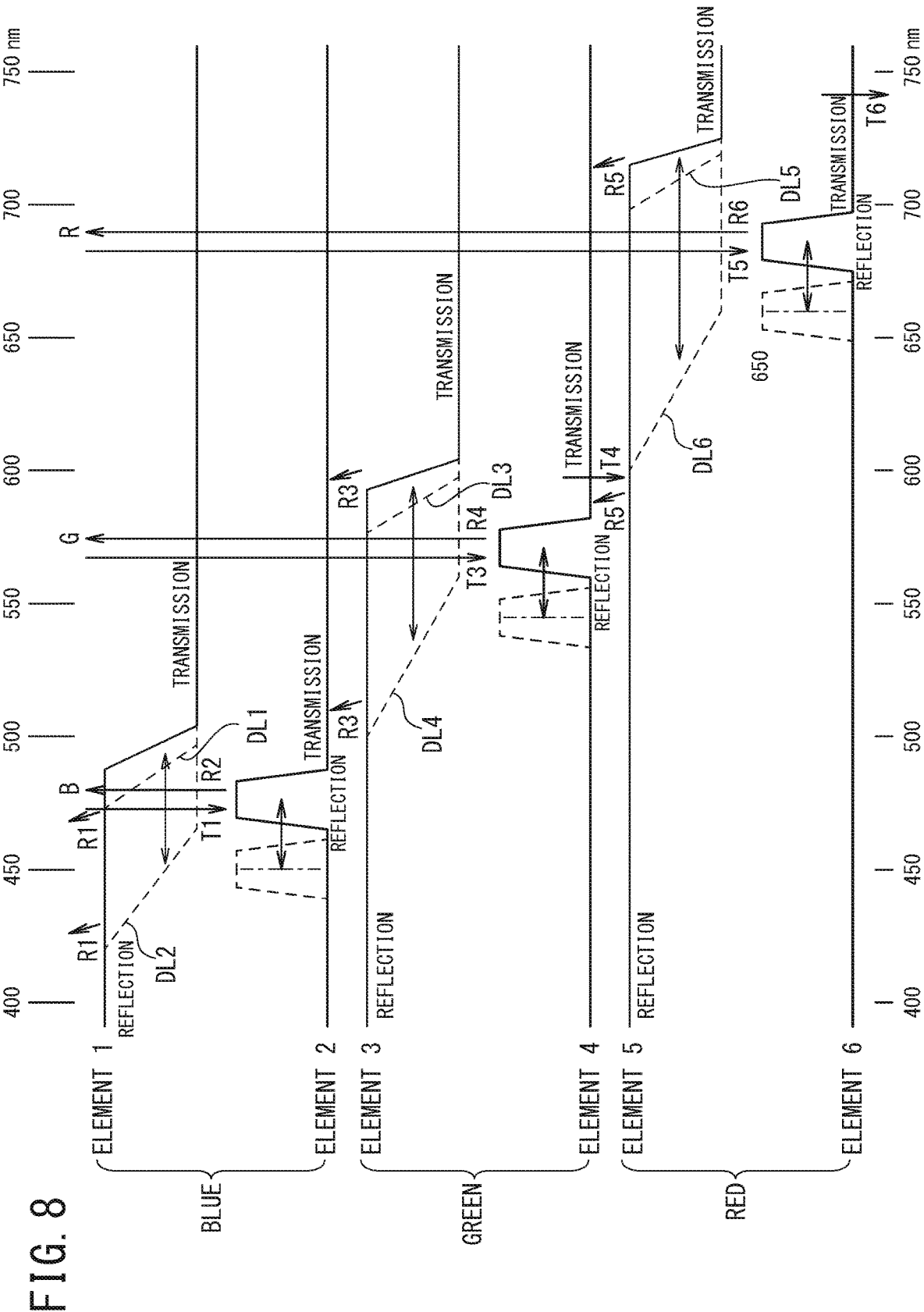
FIG. 8 is a diagram illustrative of reflection/transmission characteristics of still other respective elements used in the first to third embodiments.

In the above-described first and third color development mechanisms, a case where blue, green, and red light are reflected by varying the reflection/transmission characteristics of either the element 1 or 2, either the element 3 or 4, and either the element 5 or 6 included in the first, second, and third optical units U1, U2, and U3, respectively, was described. In the above-described second and fourth color development mechanisms, a case where red, green, and blue light are reflected by varying the reflection/transmission characteristics of either the element 1 or 2, either the element 3 or 4, and either the element 5 or 6 included in the first, second, and third optical units U1, U2, and U3, respectively, was described. However, the present invention is not limited to the cases. For example, as illustrated in FIG. 8, by reflecting blue, green, and red light through varying the absorption/transmission characteristics of both the elements 1 and 2, both the elements 3 and 4, and both the elements 5 and 6 included in the first, second, and third optical units U1, U2, and U3, respectively, the respective colors may be visually recognized by the observer OB.

That is, an image display device element based on the color development mechanism includes the element 1 that has light absorption characteristics or light reflection characteristics in an oblique direction on the short wavelength side and light transmission characteristics on the long wavelength side and in which a boundary wavelength between the characteristics is variable and the element 2 that has light reflection characteristics on the short wavelength side and light transmission characteristics on the long wavelength side and in which a boundary wavelength between the characteristics is variable and is configured in such a way that light emitted from a light source proceeds toward the element 1, the element 1 absorbs or reflects in an oblique direction light on the short wavelength side, light transmitted by the element 1 reaches the element 2, the element 2 reflects light in a specific wavelength region among the light having reached the element 2, and the reflected light proceeds toward the element 1, is transmitted by the element 1, and advances toward an observer.

In addition, the image display device element based on the color development mechanism further includes the element 3 that has light absorption characteristics or light reflection characteristics in an oblique direction on the short wavelength side and light transmission characteristics on the long wavelength side and in which a boundary wavelength between the characteristics is variable and the element 4 that has light reflection characteristics on the short wavelength side and light transmission characteristics on the long wavelength side and in which a boundary wavelength between the characteristics is variable and is configured in such a way that light emitted from the light source and transmitted by the elements 1 and 2 proceeds toward the element 3, the element 3 absorbs or reflects in an oblique direction light on the short wavelength side, light transmitted by the element 3 reaches the element 4, the element 4 reflects light in a specific wavelength region among the light having reached the element 4, and the reflected light proceeds toward the element 3, is transmitted by the elements 3, 2, and 1, and advances toward the observer.

Further, the image display device element based on the color development mechanism further includes the element 5 that has light absorption characteristics or light reflection characteristics in an oblique direction on the short wavelength side and light transmission characteristics on the long wavelength side and in which a boundary wavelength between the characteristics is variable and the element 6 that has light reflection characteristics on the short wavelength side and light transmission characteristics on the long wavelength side and in which a boundary wavelength between the characteristics is variable and is configured in such a way that light emitted from the light source and transmitted by the elements 1, 2, 3, and 4 proceeds toward the element 5, the element 5 absorbs or reflects in an oblique direction light on the short wavelength side, light transmitted by the element 5 reaches the element 6, the element 6 reflects light in a specific wavelength region among the light having reached the element 6, and the reflected light proceeds toward the element 5, is transmitted by the elements 5, 4, 3, 2, and 1, and advances toward the observer.

Sixth Color Development Mechanism

Figure 9:
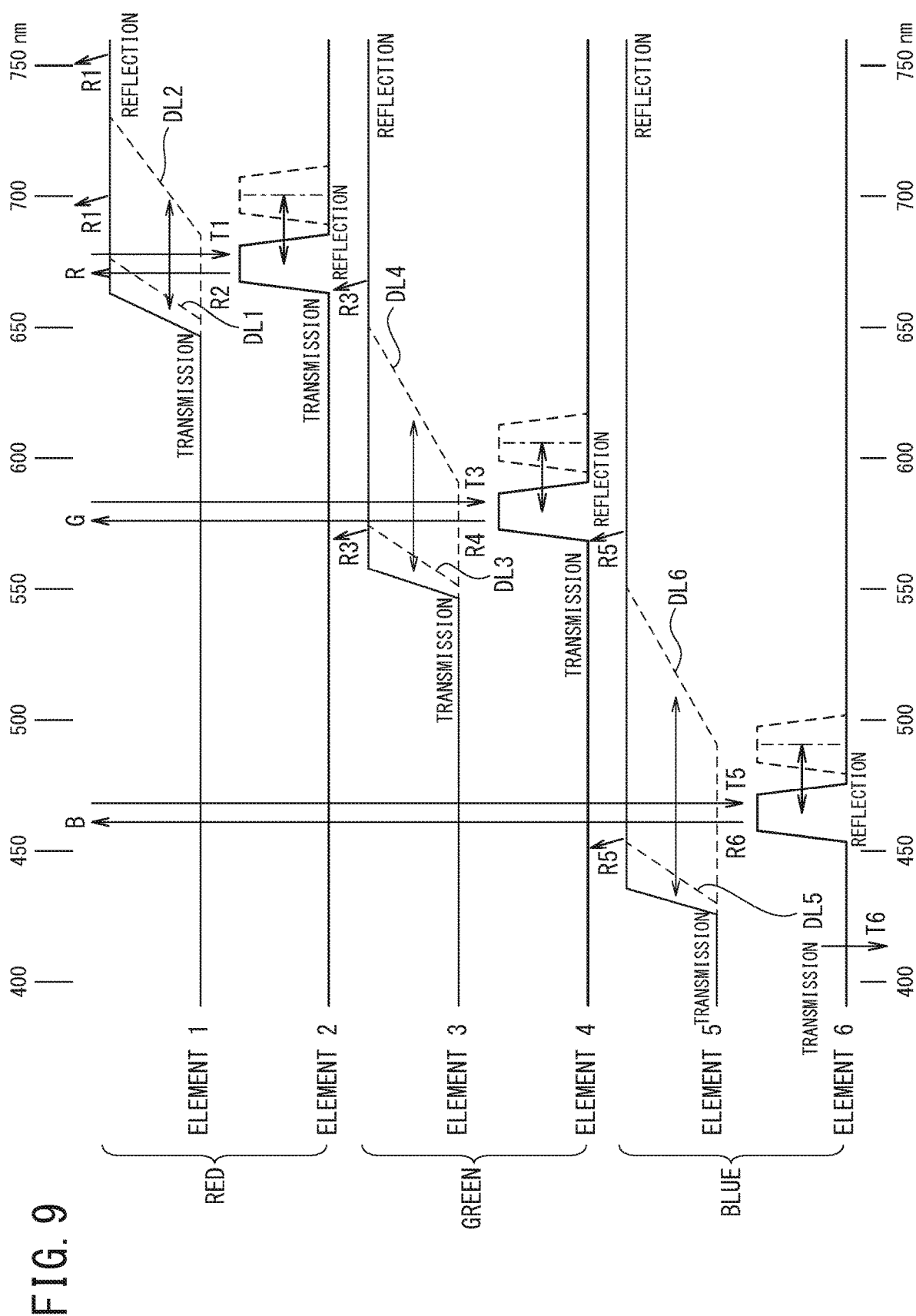
FIG. 9 is a diagram illustrative of reflection/transmission characteristics of still other respective elements used in the first to third embodiments.

Although, in the above-described fifth color development mechanism, a case where blue, green, and red light are reflected by the elements 2, 4, and 6 included in the first, second, and third optical units U1, U2, and U3, respectively, was described, the present invention is not limited to the case. For example, as illustrated in FIG. 9, light in wavelength regions of red, green, and blue may be reflected by the first, second, and third optical unit U1, U2, and U3 including the elements 1 and 2, the elements 3 and 4, and the elements 5 and 6, respectively, to the observer OB side and the respective colors may be visually recognized by the observer OB.

That is, an image display device element based on the color development mechanism includes the element 1 that has light absorption characteristics or light reflection characteristics in an oblique direction on the long wavelength side and light transmission characteristics on the short wavelength side and in which a boundary wavelength between the characteristics is variable and the element 2 that has light reflection characteristics on the long wavelength side and light transmission characteristics on the short wavelength side and in which a boundary wavelength between the characteristics is variable and is configured in such a way that light emitted from a light source proceeds toward the element 1, the element 1 absorbs or reflects in an oblique direction light on the long wavelength side, light transmitted by the element 1 reaches the element 2, the element 2 reflects light in a specific wavelength region among the light having reached the element 2, and the reflected light proceeds toward the element 1, is transmitted by the element 1, and advances toward an observer.

In addition, the image display device element based on the color development mechanism further includes the element 3 that has light absorption characteristics or light reflection characteristics in an oblique direction on the long wavelength side and light transmission characteristics on the short wavelength side and in which a boundary wavelength between the characteristics is variable and the element 4 that has light reflection characteristics on the long wavelength side and light transmission characteristics on the short wavelength side and in which a boundary wavelength between the characteristics is variable and is configured in such a way that light emitted from the light source and transmitted by the elements 1 and 2 proceeds toward the element 3, the element 3 absorbs or reflects in an oblique direction light on the long wavelength side, light transmitted by the element 3 reaches the element 4, the element 4 reflects light in a specific wavelength region among the light having reached the element 4, and the reflected light proceeds toward the element 3, is transmitted by the elements 3, 2, and 1, and advances toward the observer.

Further, the image display device element based on the color development mechanism further includes the element 5 that has light absorption characteristics or light reflection characteristics in an oblique direction on the long wavelength side and light transmission characteristics on the short wavelength side and in which a boundary wavelength between the characteristics is variable and the element 6 that has light reflection characteristics on the long wavelength side and light transmission characteristics on the short wavelength side and in which a boundary wavelength between the characteristics is variable and is configured in such a way that light emitted from the light source and transmitted by the elements 1, 2, 3, and 4 proceeds toward the element 5, the element 5 absorbs or reflects in an oblique direction light on the long wavelength side, light transmitted by the element 5 reaches the element 6, the element 6 reflects light in a specific wavelength region among the light having reached the element 6, and the reflected light proceeds toward the element 5, is transmitted by the elements 5, 4, 3, 2, and 1, and advances toward the observer.

Other Color Development Mechanisms

Although, in the embodiment, as described above, the first to sixth light-emission mechanisms were described, the present invention is not limited to the mechanisms. For example, among the optical units U1 to U3 included in the image display device element 30, the first, second, and third optical units U1, U2, and U3 may be configured including the elements 1 and 2, the elements 3 and 4, and the elements 5 and 6 that were described in the first, third, and fifth light-emission mechanisms, respectively. Alternatively, the first, second, and third optical units U1, U2, and U3 may be configured including the elements 1 and 2, the elements 3 and 4, and the elements 5 and 6 that were described in the second, fourth, and sixth light-emission mechanisms, respectively. That is, the respective optical units U1 to U3 (respective elements 1 to 6) described in the first to sixth light-emission mechanisms can be combined appropriately. Combining the respective optical units U1 to U3 appropriately enables the image display device elements 10 to 30 capable of displaying full colors to be constituted.

Other Uses

Although, in the above-described respective embodiments, image display device elements using reflection/absorption/transmission characteristics of visible light were described, the present invention is not limited to the image display device elements. For example, electromagnetic waves may be used in place of the above-described visible light. In this case, each of the above-described optical units U1 to U3 can be used as a reflective element or a filter element. For example, gamma rays may be used in place of the above-described visible light. In this case, each of the above-described optical units U1 to U3 can also be used as a reflective element or a filter element. For example, X rays may be used in place of the above-described visible light. In this case, each of the above-described optical units U1 to U3 can also be used as a reflective element or a filter element. For example, radio waves may be used in place of the above-described visible light. In this case, each of the above-described optical units U1 to U3 can also be used as a reflective element or a filter element.

Fourth Embodiment

Figure 10B:
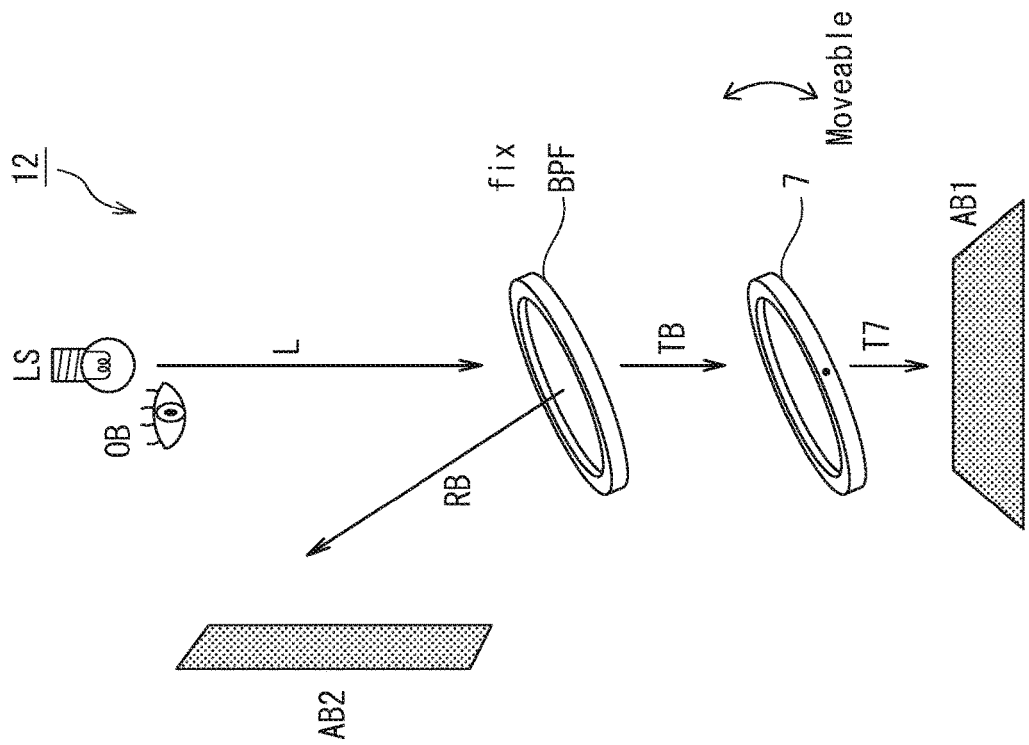
FIGS. 10A and 10B are conceptual diagrams illustrative of a configuration of an image display device element according a fourth embodiment of the present invention.
Figure 10A:
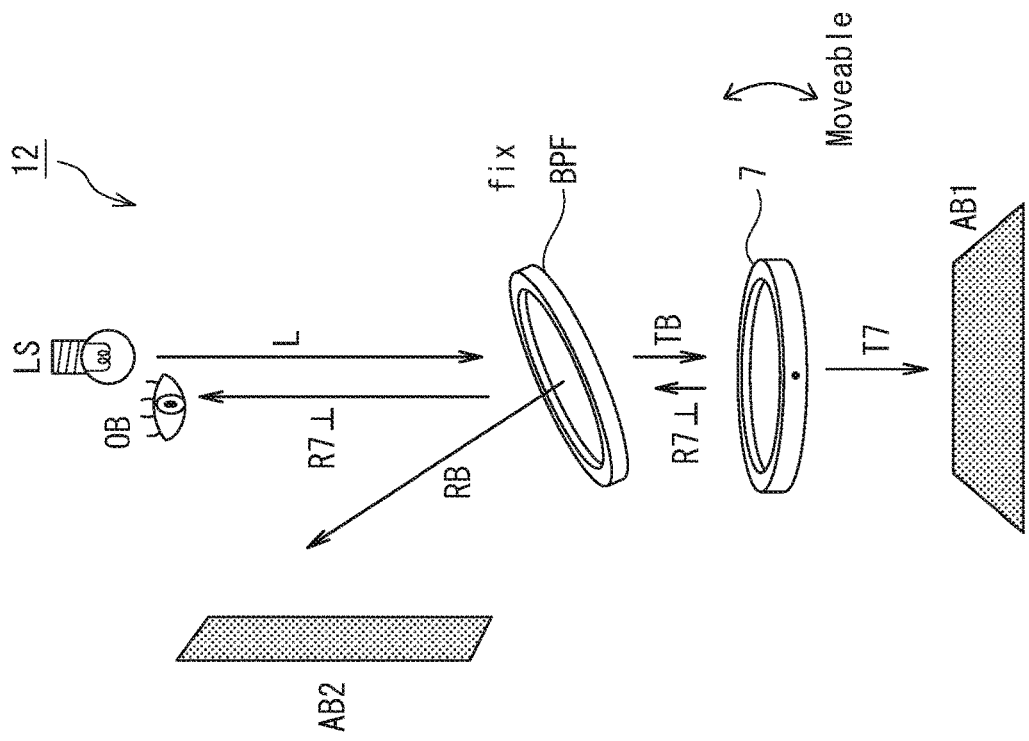

Hereinafter, a configuration of an image display device element 12 according to a fourth embodiment will be described. FIGS. 10A and 10B are conceptual diagrams illustrative of the configuration of the image display device element 12 according to the fourth embodiment of the present invention. As illustrated in FIGS. 10A and 10B, the image display device element 12 is an element for an image display device that develops a structural color and is an element that includes an element BPF that, among light L emitted by a light source LS, transmits light in a specific wavelength region(s) and reflects in an oblique direction or absorbs light in the other wavelength region, an element 7 that, among first transmitted light TB that is light transmitted by the element BPF, reflects light in a specific wavelength region and transmits light in the other wavelength region, a transmitted-light absorbing member AB1 that absorbs second transmitted light T7 that is light transmitted by the element 7, and a reflected-light absorbing member AB2 that absorbs first reflected light RB that is light reflected in an oblique direction by the element BPF. Hereinafter, the above-described respective components will be described.

Element BPF

The element BPF is an element that, among light (incident light) L that is emitted from the light source LS and is incident on the image display device element 12, transmits light in a specific wavelength region(s) and absorbs or reflects in the direction toward the reflected-light absorbing member AB2 light in the other wavelength region and is, for example, an optical filter including a dielectric multilayer film.

The element BPF is arranged on the display side, which is the light source LS side, in the image display device element 12. The surface on the display side of the element BPF is inclined, for example, approximately 80° with respect to the optical axis of the incident light L. For this reason, the first reflected light RB, which is light reflected by the element BPF, advances in a direction different from the direction toward an observer OB. Therefore, the observer OB never visually recognizes the first reflected light RB.

For the element BPF, a filter that, among the incident light L, transmits, for example, light in a wavelength region of at least one of blue (B), green (G), and red (R) and absorbs or reflects in the direction toward the reflected-light absorbing member AB2 light in the other wavelength region, that is, a so-called multi-band pass filter, is selected.

Note that, when the element BPF absorbs light in a specific wavelength region among the incident light L, the surface on the display side of the element BPF does not have to be inclined with respect to the optical axis of the incident light L.

Element 7

The element 7 is an element that, among the first transmitted light TB, reflects light in a specific wavelength region in the direction toward the element BPF and transmits light in the other wavelength region and is, for example, an optical filter including a dielectric multilayer film or a polymer film developing a structural color. In FIGS. 10A and 10B, light reflected in the direction toward the observer OB (the direction toward the element BPF) by the element 7 and light transmitted by the element 7 are denoted as second reflected light R71 and second transmitted light T7, respectively.

The element 7 is arranged on the opposite side to the display side of the element BPF. The element 7 is also arranged in such a way that the surface on the element BPF side thereof can cross the optical axis of the incident light L at right angles. That is, the element 7 is arranged on the optical axis of the incident light L. In other words, the element 7 is overlapped by the element BPF when viewed from the observer OB side.

Inclination of the element 7 is variable. The element 7 is oriented in different inclinations in FIGS. 10A and 10B.

Transmitted-Light Absorbing Member AB1

The transmitted-light absorbing member AB1 is a member that absorbs the second transmitted light T7 and is, for example, black paper or a device bottom face the surface of which is processed into a black color.

The transmitted-light absorbing member AB1 is arranged on the opposite side to the element BPF side of the element 7 and on the optical axis of the incident light L. That is, the transmitted-light absorbing member AB1 is overlapped by the elements BPF and 7 when viewed from the observer OB side.

Because the transmitted-light absorbing member AB1 absorbs the second transmitted light T7, the observer OB never visually recognizes the second transmitted light T7.

Reflected-Light Absorbing Member AB2

The reflected-light absorbing member AB2 is a member that absorbs the first reflected light RB and is, for example, black paper or a device side face the surface of which is processed into a black color.

The reflected-light absorbing member AB2 is arranged at a place deviated from the optical axis of the incident light L.

Because the reflected-light absorbing member AB2 absorbs the first reflected light RB, the observer OB never visually recognizes the first reflected light RB.

Fifth Embodiment

Figure 11B:
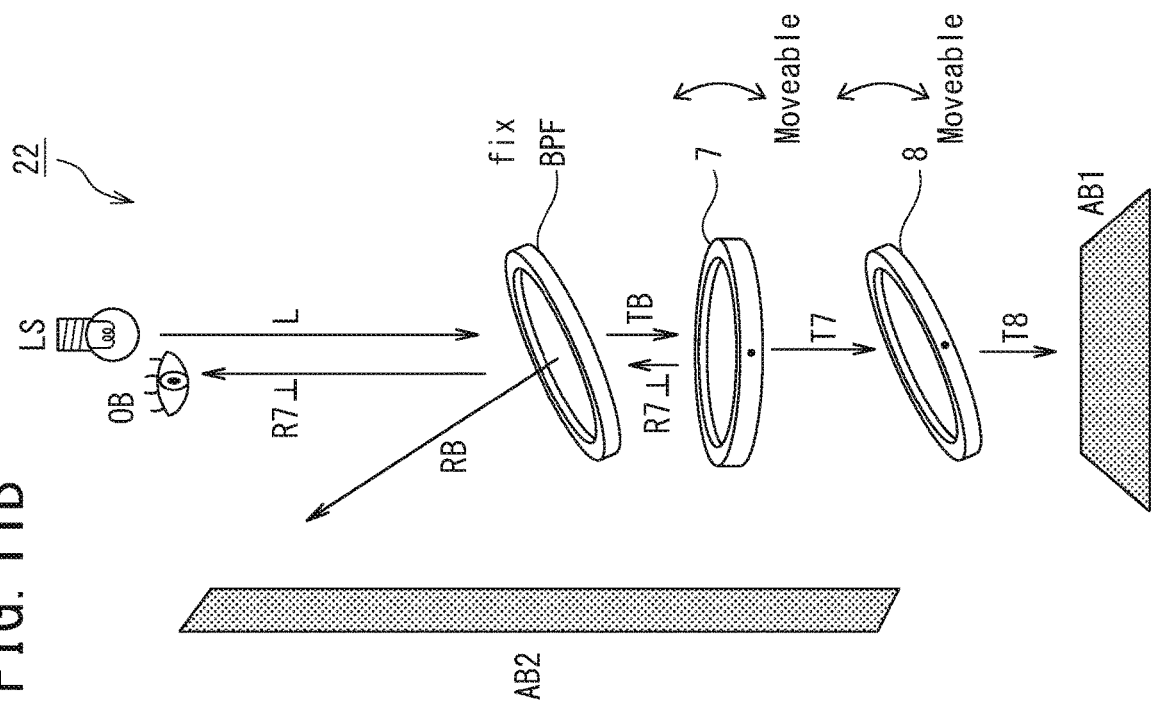
FIGS. 11A and 11B are conceptual diagrams illustrative of a configuration of an image display device element according a fifth embodiment of the present invention.
Figure 11A:
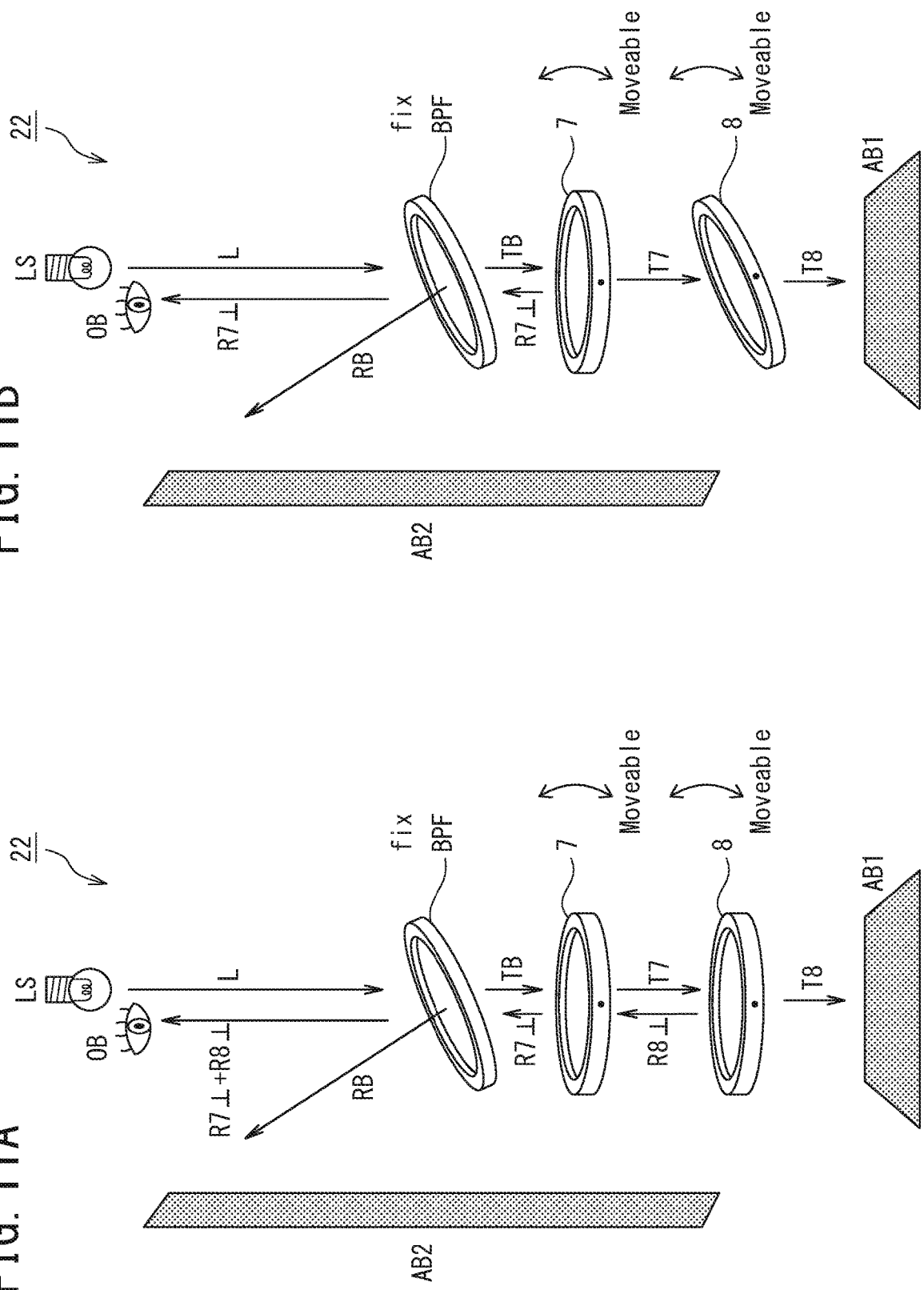

Hereinafter, a configuration of an image display device element 22 according to a fifth embodiment will be described. FIGS. 11A and 11B are conceptual diagrams illustrative of the configuration of the image display device element 22 according to the fifth embodiment of the present invention. As illustrated in FIGS. 11A and 11B, the image display device element 22 is an element for an image display device that develops structural colors and is an element that includes an element BPF that, among light L emitted by a light source LS, transmits light in a specific wavelength region(s) and reflects in an oblique direction or absorbs light in the other wavelength region, an element 7 that, among first transmitted light TB that is light transmitted by the element BPF, reflects light in a specific wavelength region and transmits light in the other wavelength region, an element 8 that, among second transmitted light T7 that is light transmitted by the element 7, reflects light in a specific wavelength region and transmits light in the other wavelength region, a transmitted-light absorbing member AB1 that absorbs third transmitted light T8 that is light transmitted by the element 8, and a reflected-light absorbing member AB2 that absorbs first reflected light RB that is light reflected by the element BPF. That is, the image display device element 22 according to the present embodiment is an image display device element that has a configuration in which the element 8 is added to the configuration of the image display device element 12 according to the above-described fourth embodiment. Therefore, the element 8, which is a portion different from the fourth embodiment, will be described below.

Element 8

The element 8 is an element that, among the second transmitted light T7, reflects light in a specific wavelength region in the direction toward the element 7 and transmits light in the other wavelength region and is, for example, an optical filter including a dielectric multilayer film or a polymer film developing a structural color. In FIGS. 11A and 11B, light reflected in the direction toward an observer OB (the direction toward the element BPF) by the element 8 and light transmitted by the element 8 are denoted as third reflected light R8⊥ and third transmitted light T8, respectively.

The element 8 is arranged on the opposite side to the display side of the element 7. The element 8 is also arranged in such a way that the surface on the element 7 side thereof can cross the optical axis of the incident light L at right angles. That is, the element 8 is arranged on the optical axis of the incident light L and is overlapped by the elements BPF and 7 when viewed from the observer OB side.

Inclination of the element 8 is variable. The element 7 is oriented in different inclinations in FIGS. 11A and 11B.

Sixth Embodiment

Figure 12A:
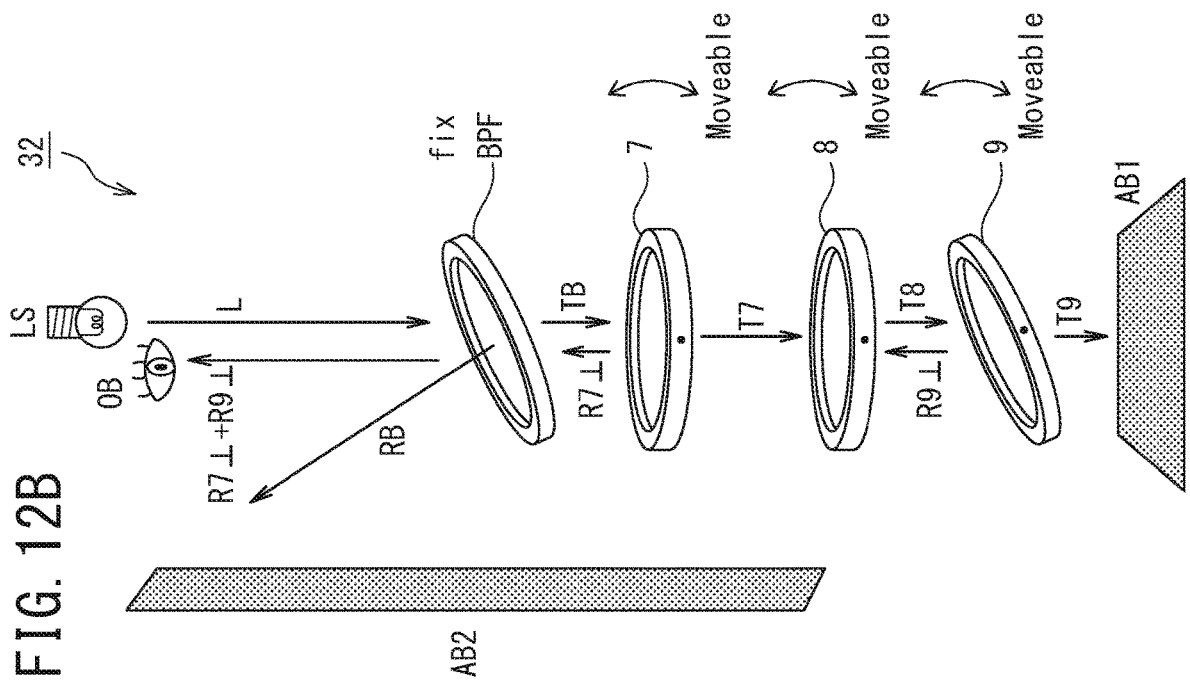
FIGS. 12A and 12B are conceptual diagrams illustrative of a configuration of an image display device element according a sixth embodiment of the present invention.
Figure 12B:
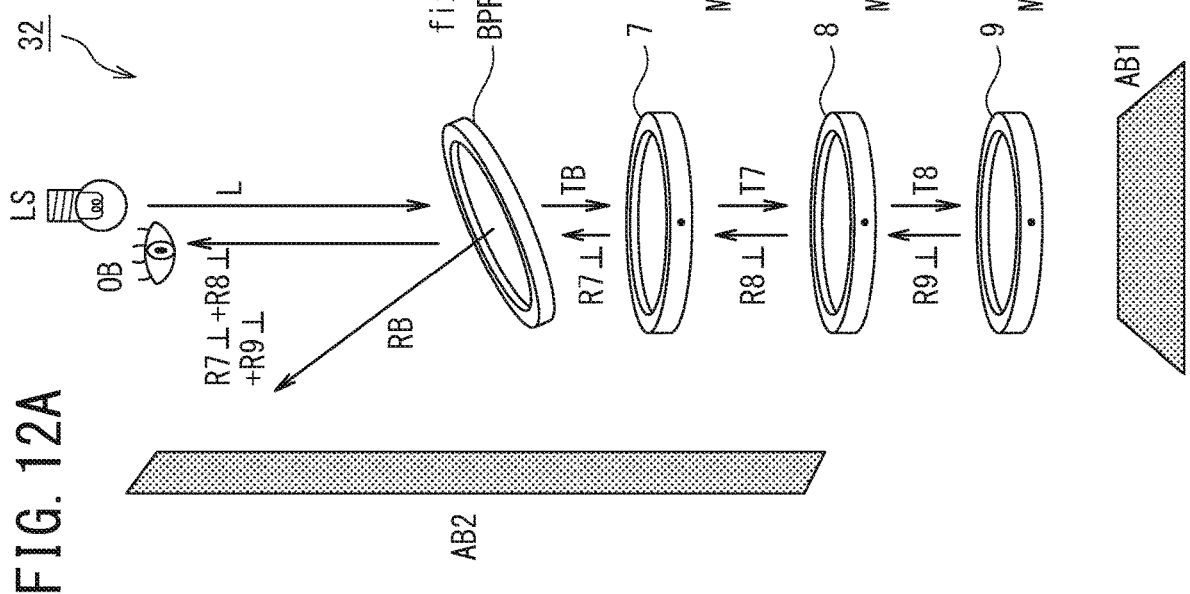

Hereinafter, a configuration of an image display device element 32 according to a sixth embodiment will be described. FIGS. 12A and 12B are conceptual diagrams illustrative of the configuration of the image display device element 32 according to the sixth embodiment of the present invention. As illustrated in FIGS. 12A and 12B, the image display device element 32 is an element for an image display device that develops structural colors and is an element that includes an element BPF that, among light L emitted by a light source LS, transmits light in a specific wavelength region(s) and reflects in an oblique direction or absorbs light in the other wavelength region, an element 7 that, among first transmitted light TB that is light transmitted by the element BPF, reflects light in a specific wavelength region and transmits light in the other wavelength region, an element 8 that, among second transmitted light T7 that is light transmitted by the element 7, reflects light in a specific wavelength region and transmits light in the other wavelength region, an element 9 that, among third transmitted light T8 that is light transmitted by the element 8, reflects light in a specific wavelength region and transmits light in the other wavelength region, and a reflected-light absorbing member AB2 that absorbs first reflected light RB that is light reflected by the element BPF. That is, the image display device element 32 according to the present embodiment is an image display device element that has a configuration in which the element 9 is added to and the transmitted-light absorbing member AB1 is removed from the configuration of the image display device element 22 according to the above-described fifth embodiment. Therefore, the element 9, which is a portion different from the fifth embodiment, will be described below.

Element 9

The element 9 is an element that, among the third transmitted light T8, reflects light in a specific wavelength region in the direction toward the element 8 and transmits light in the other wavelength region and is, for example, an optical filter including a dielectric multilayer film or a polymer film developing a structural color. In FIGS. 12A and 12B, light reflected in the direction toward an observer OB (the direction toward the element BPF) by the element 9 is denoted as fourth reflected light R9.

The element 9 is arranged on the opposite side to the display side of the element 8. The element 9 is also arranged in such a way that the surface on the element 8 side thereof can cross the optical axis of the incident light L at right angles. That is, the element 9 is arranged on the optical axis of the incident light L and is overlapped by the elements BPF, 7, and 8 when viewed from the observer OB side.

Inclination of the element 9 is variable. The element 7 is oriented in different inclinations in FIGS. 12A and 12B.

Note that, although, in the embodiment, a case where the element 9 reflects light (third transmitted light T8) in a specific wavelength region was described, the present invention is not limited to the case. For example, the element 9 may be an element that reflects light in the whole wavelength region of visible light. That is, the element 9 may be a mirror.

Other Embodiments

The present invention is not limited to the above-described respective embodiments. For example, the present invention may be embodied in an embodiment in which elements according to each of the above-described embodiments are housed in a housing container the inner wall of which is colored in black. In this case, a side wall of the housing container acts as the reflected-light absorbing member AB2.

Hereinafter, ninth and tenth color development mechanisms that are color development mechanisms using the image display device element 32 will be described with reference to FIGS. 13 and 14.

Ninth Color Development Mechanism

Figure 13:
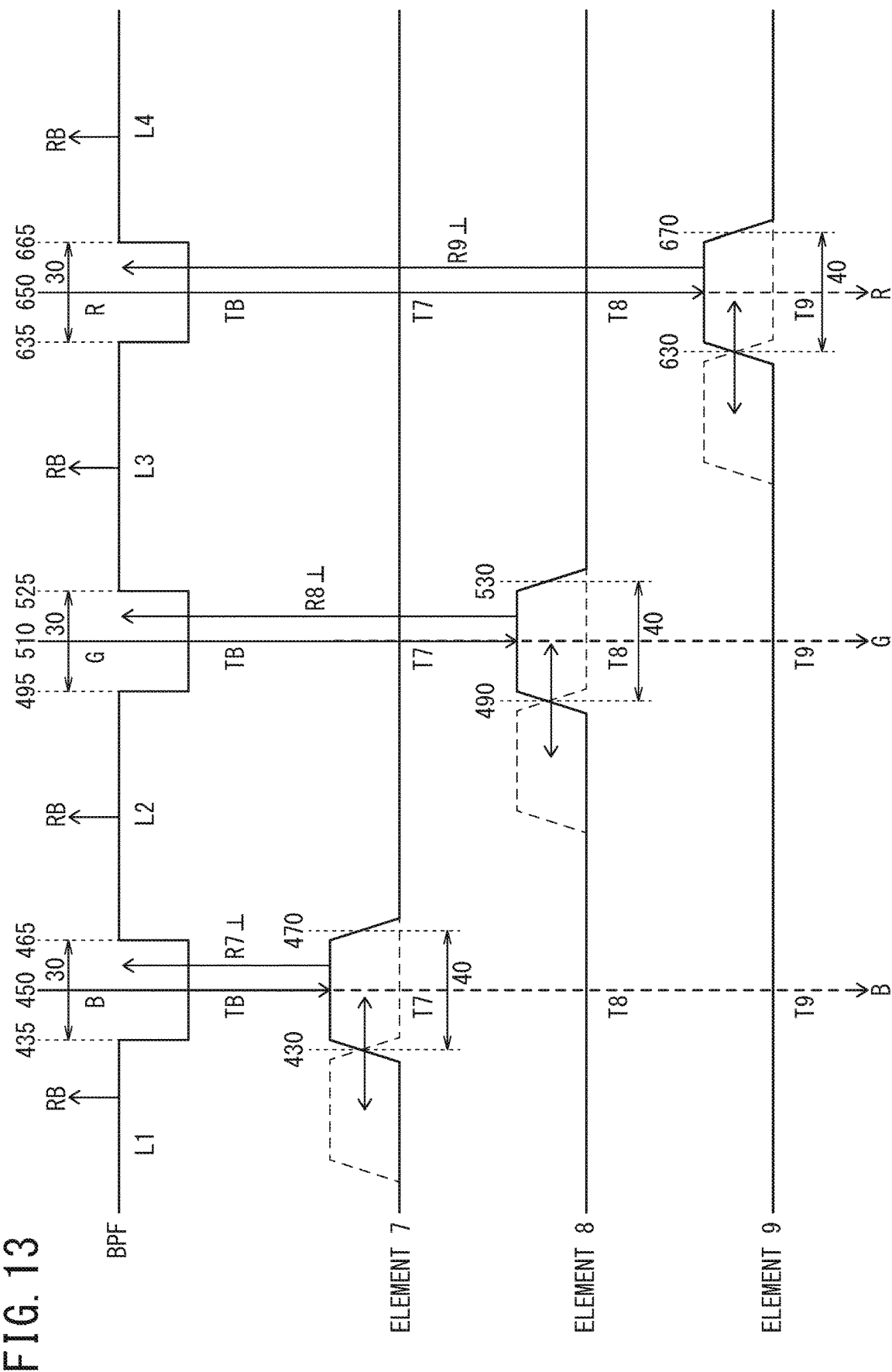
FIG. 13 is a diagram illustrative of reflection/transmission characteristics of respective elements used in the fourth to sixth embodiments.
Figure 14:
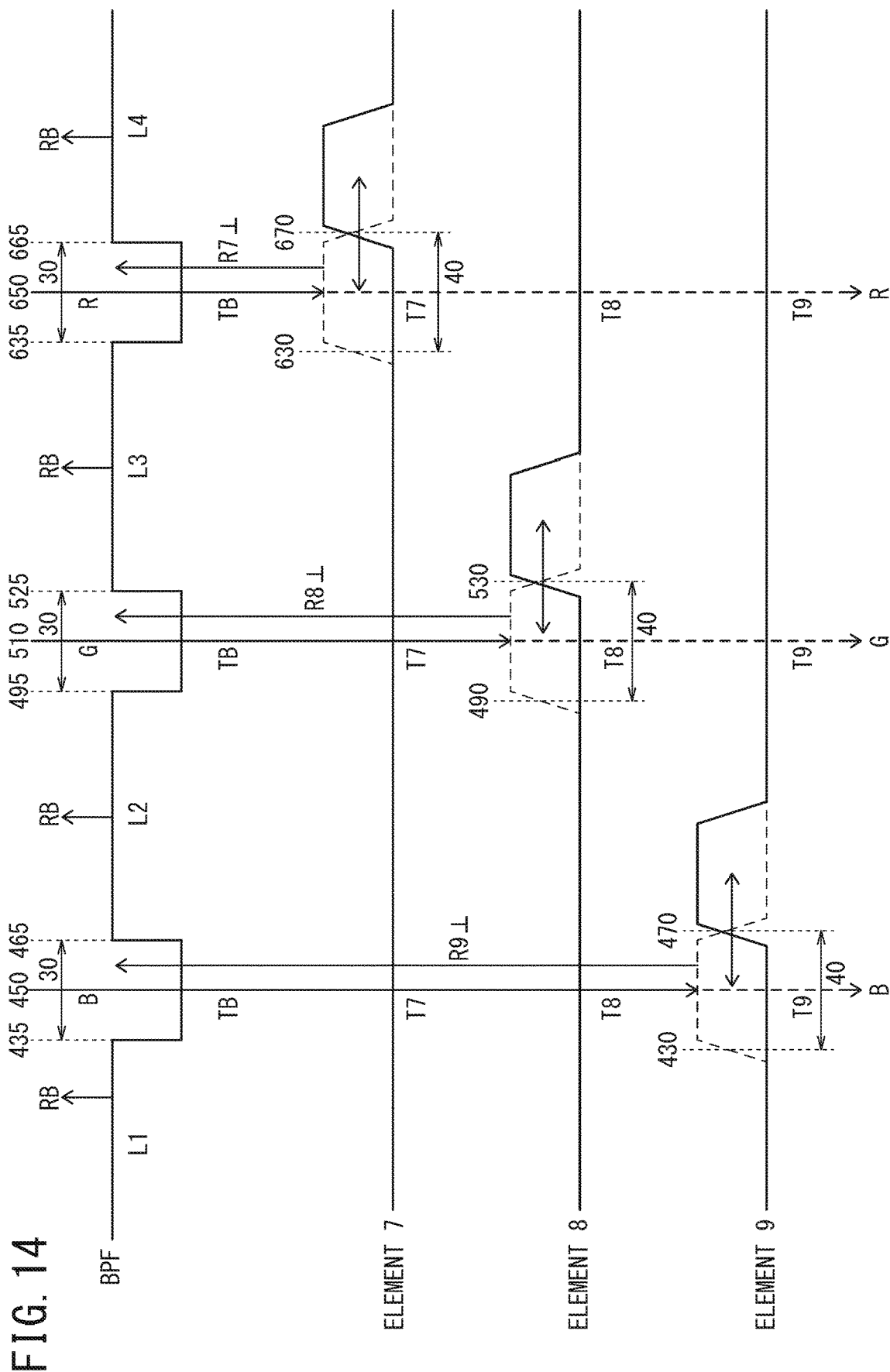
FIG. 14 is a diagram illustrative of reflection/transmission characteristics of other respective elements used in the fourth to sixth embodiments.

FIG. 13 is a diagram illustrative of respective reflection/transmission characteristics of the elements BPF and 7 to 9 included in the image display device element 32. Hereinafter, the respective reflection/transmission characteristics of the elements BPF and 7 to 9 and color development characteristics of the elements 7 to 9 will be described.

Reflection/transmission characteristics of element BPF

Among the reflection/transmission characteristics on the wavelength axis illustrated in FIG. 13, the reflection/transmission characteristics at the top illustrate reflection/transmission characteristics of the element BPF. Because the reflection/transmission characteristics of the element BPF in the color development mechanism is the same as the reflection/transmission characteristics of the element BPF described in a seventh color development mechanism, a description thereof will now be omitted.

Reflection/Transmission Characteristics of Element 7

Among the reflection/transmission characteristics on the wavelength axis illustrated in FIG. 13, the reflection/transmission characteristics in the second row from the top illustrate reflection/transmission characteristics of the element 7. The solid line in the second row in FIG. 13 illustrates reflectance of the element 7 when arranged with the incident surface of the element 7 crossing the optical axis of the incident light L at right angles. When the element 7 is arranged with the incident surface thereof crossing the optical axis of the incident light L at right angles, the reflectance of the element 7 is approximately 100% for light (blue (B)) having a wavelength within a range of 435 nm or longer and 465 nm or shorter centered around a wavelength of 450 nm and approximately 0% for light having a wavelength outside the range.

The dashed line DL in the second row in FIG. 13 illustrates reflectance of the element 7 when arranged with the incident surface of the element 7 inclined approximately 40° with respect to the optical axis of the incident light L. When the element 7 is arranged with the incident surface thereof inclined approximately 40° with respect to the optical axis of the incident light L, a high reflectance region of the element 7 is shifted to the short wavelength side and the light (blue (B)) having a wavelength of around 450 nm can be transmitted by the element 7.

That is, inclining the incident surface of the element 7 with respect to the optical axis of the incident light L enables a transmission wavelength region for the incident light L to be shifted to the short wavelength side.

Color Development Characteristics of Element 7

Color development characteristics of the above-described element 7 will be described.

When the light L from the light source LS is incident on the element BPF, the light (blue (B)) having a wavelength of around 450 nm among the incident light L is transmitted by the element BPF and reflected (Bragg reflection) by the element 7 to the observer OB side. The light reflected by the element 7 is transmitted by the element BPF. For this reason, the observer OB can visually recognize the light (blue (B)) having a wavelength of around 450 nm, which is the second reflected light R7⊥.

Light (green (G)) having a wavelength of around 510 nm and light (red (R)) having a wavelength of around 650 nm among the first transmitted light TB transmitted by the element BPF are transmitted by the element 7 and incident on the element 8.

In the case of the image display device element 12, which includes only the elements BPF and 7, the second transmitted light T7 that is transmitted by the element 7 is absorbed by the transmitted-light absorbing member AB1 as illustrated in FIG. 10B. For this reason, the observer OB cannot visually recognize the second transmitted light T7. Therefore, as illustrated in FIG. 10A, the observer OB can visually recognize only the light (blue (B)) having a wavelength of around 450 nm, which is the second reflected light R7⊥.

Varying the amount of overlap between a light transmission band of the element BPF and a light reflection band of the element 7 through varying boundary wavelengths of the element 7 enables a band of reflected light and the amount of the light to be varied, and eliminating the overlap between the light transmission band of the element BPF and the light reflection band of the element 7 enables light advancing in the direction toward the observer OB to be reduced and cut off. In other words, eliminating the overlap between the light transmission band of the element BPF and the light reflection band of the element 7 enables light incident on the element 7 to be transmitted as it is. That is, the element 7 transmitting the light (blue (B)) having a wavelength of around 450 nm also enables the light to be prevented from being visually recognized.

As described above, an image display device element based on the color development mechanism includes the element BPF that has light transmission characteristics for at least one wavelength region and light absorption characteristics or light reflection characteristics in an oblique direction for the other wavelength region and in which boundary wavelengths between the characteristics are fixed and the element 7 that, among light transmitted by the element BPF, has light reflection characteristics for a specific wavelength region located farthest on the short wavelength side and light transmission characteristics for the other wavelength region and in which boundary wavelengths between the characteristics are variable and is configured in such a way that light emitted from a light source proceeds toward the element BPF, the element BPF absorbs or reflects in an oblique direction light in the other wavelength region, light transmitted by the element BPF reaches the element 7, the element 7 reflects light in a specific wavelength region located farthest on the short wavelength side among the light having reached the element 7, and the reflected light proceeds toward the element BPF, is transmitted by the element BPF, and advances toward an observer.

Reflection/Transmission Characteristics of Element 8

Among the reflection/transmission characteristics on the wavelength axis illustrated in FIG. 13, the reflection/transmission characteristics in the third row from the top illustrate reflection/transmission characteristics of the element 8. The solid line in the third row in FIG. 13 illustrates reflectance of the element 8 when arranged with the incident surface of the element 8 crossing the optical axis of the incident light L at right angles. When the element 8 is arranged with the incident surface thereof crossing the optical axis of the incident light L at right angles, the reflectance of the element 8 is approximately 100% for light (green (G)) having a wavelength within a range of 495 nm or longer and 525 nm or shorter centered around a wavelength of 510 nm and approximately 0% for light having a wavelength outside the range.

The dashed line DL in the third row in FIG. 13 illustrates reflectance of the element 8 when arranged with the incident surface of the element 8 inclined approximately 40° with respect to the optical axis of the incident light L. When the element 8 is arranged with the incident surface thereof inclined approximately 40° with respect to the optical axis of the incident light L, a high reflectance region of the element 8 is shifted to the short wavelength side and the light (green (G)) having a wavelength of around 510 nm can be transmitted by the element 8.

That is, inclining the incident surface of the element 8 with respect to the optical axis of the incident light L enables a transmission wavelength region for the incident light L to be shifted to the short wavelength side.

Color Development Characteristics of Element 8

Color development characteristics of the above-described element 8 will be described.

When the second transmitted light T7 transmitted by the above-described element 7 is incident on the element 8, the light (green (G)) having a wavelength of around 510 nm among the second transmitted light T7 is reflected by the element 8 to the observer OB side. The light reflected by the element 8 is transmitted by the elements 7 and BPF. For this reason, the observer OB can visually recognize the light (green (G)) having a wavelength of around 510 nm, which is the third reflected light R8⊥.

Light (red (R)) having a wavelength of around 650 nm among the second transmitted light T7 is transmitted by the element 8 and incident on the element 9.

In the case of the image display device element 22, which includes the elements BPF, 7, and 8, the third transmitted light T8 that is transmitted by the element 8 is absorbed by the transmitted-light absorbing member AB1, as illustrated in FIG. 11B. For this reason, the observer OB cannot visually recognize the third transmitted light T8. Therefore, as illustrated in FIG. 11A, the observer OB can visually recognize a cyan color that is a composite color of the light (blue (B)) having a wavelength of around 450 nm, which is the second reflected light R7⊥, and the light (green (G)) having a wavelength of around 510 nm, which is the third reflected light R8⊥.

Varying the amount of overlap between a light transmission band of the element 7 and a light reflection band of the element 8 through varying boundary wavelengths of the element 8 enables a band of reflected light and the amount of the light to be varied, and eliminating the overlap between the light transmission band of the element 7 and the light reflection band of the element 8 enables light advancing in the direction toward the observer OB to be reduced and cut off. In other words, eliminating the overlap between the light transmission band of the element 7 and the light reflection band of the element 8 enables light incident on the element 8 to be transmitted as it is. That is, the element 8 transmitting the light (green (G)) having a wavelength of around 510 nm also enables the light to be prevented from being visually recognized.

As described above, the image display device element based on the color development mechanism further includes the element 8 that has light reflection characteristics for a specific wavelength region and light transmission characteristics for the other wavelength region and in which boundary wavelengths between the characteristics are variable and is configured in such a way that light emitted from the light source and transmitted by the elements BPF and 7 reaches the element 8, the element 8 reflects light in a specific wavelength region located farthest on the short wavelength side among the light having reached the element 8, and the reflected light proceeds toward the element 7, is transmitted by the elements 7 and BPF, and advances toward the observer.

Reflection/Transmission Characteristics of Element 9

Among the reflection/transmission characteristics on the wavelength axis illustrated in FIG. 13, the reflection/transmission characteristics in the fourth row from the top illustrate reflection/transmission characteristics of the element 9. The solid line in the fourth row in FIG. 13 illustrates reflectance of the element 9 when arranged with the incident surface of the element 9 crossing the optical axis of the incident light L at right angles. When the element 9 is arranged with the incident surface thereof crossing the optical axis of the incident light L at right angles, the reflectance of the element 9 is approximately 100% for light (red (R)) having a wavelength within a range of 635 nm or longer and 665 nm or shorter centered around a wavelength of 650 nm and approximately 0% for light having a wavelength outside the range.

The dashed line DL in the fourth row in FIG. 13 illustrates reflectance of the element 9 when arranged with the incident surface of the element 9 inclined approximately 40° with respect to the optical axis of the incident light L. When the element 9 is arranged with the incident surface thereof inclined approximately 40° with respect to the optical axis of the incident light L, a high reflectance region of the element 9 is shifted to the short wavelength side and the light (red(R)) having a wavelength of around 650 nm can be transmitted by the element 9.

That is, inclining the incident surface of the element 9 with respect to the optical axis of the incident light L enables a transmission wavelength region for the incident light L to be shifted to the short wavelength side.

Color Development Characteristics of Element 9

Color development characteristics of the above-described element 9 will be described.

When the third transmitted light T8 transmitted by the above-described element 8 is incident on the element 9, the light (red (R)) having a wavelength of around 650 nm among the third transmitted light T8 is reflected by the element 9 to the observer OB side. The light reflected by the element 9 is transmitted by the elements 8, 7, and BPF. For this reason, the observer OB can visually recognize the light (red (R)) having a wavelength of around 650 nm, which is the fourth reflected light R9⊥.

Varying the amount of overlap between a light transmission band of the element 8 and a light reflection band of the element 9 through varying boundary wavelengths of the element 9 enables a band of reflected light and the amount of the light to be varied, and eliminating the overlap between the light transmission band of the element 8 and the light reflection band of the element 9 enables light advancing in the direction toward the observer OB to be reduced and cut off. In other words, eliminating the overlap between the light transmission band of the element 8 and the light reflection band of the element 9 enables light incident on the element 9 to be transmitted as it is. That is, the element 9 transmitting the light (red (R)) having a wavelength of around 650 nm also enables the light to be prevented from being visually recognized.

As described above, in the case of the image display device element 32 including the elements BPF, 7, 8, and 9 as optical elements, the observer OB can visually recognize all the light (blue (B)), which is the second reflected light R7⊥, the light (green (G)), which is the third reflected light R8⊥, and the light (red (R)), which is the fourth reflected light R9⊥, as illustrated in FIG. 12A. Therefore, the observer OB can visually recognize a white color that is a composite color of the second, third, and fourth reflected light R7⊥, R8⊥, and R9⊥. Meanwhile, when the configuration illustrated in FIG. 12B is used, the observer OB can visually recognize a magenta color that is a composite color of the second and fourth reflected light R7⊥ and R9⊥.

That is, the image display device element based on the color development mechanism further includes the element 9 that has light reflection characteristics for a specific wavelength region and light transmission characteristics for the other wavelength region and in which boundary wavelengths between the characteristics are variable and is configured in such a way that light emitted from the light source and transmitted by the elements BPF, 7, and 8 reaches the element 9, the element 9 reflects light in a specific wavelength region located farthest on the short wavelength side among the light having reached the element 9, and the reflected light proceeds toward the element 8, is transmitted by the elements 8, 7, and BPF, and advances toward the observer.

The image display device element illustrated in FIGS. 12A and 12B expresses full colors by reflecting blue (B), green (G), and red (R) light in this order, that is, reflecting light in ascending order of wavelength. That is, the element 7, which develops a blue (B) color, switches, with respect to light in a wavelength region of blue (B), reflection in the direction in which the observer OB can visually recognize the light and transmission in the direction toward the element 8 at the succeeding stage.

The element 8, which develops a green (G) color, switches, with respect to light in a wavelength region of green (G), reflection in the direction in which the observer OB can visually recognize the light and transmission in the direction toward the element 9 at the succeeding stage.

The element 9, which develops a red (R) color, switches, with respect to light in a wavelength region of red (R), reflection in the direction in which the observer OB can visually recognize the light and transmission.

Variations

Although, in the above-described ninth color development mechanism, a case where, in the image display device element 12 including the elements BPF and 7, a blue color is developed was described, the present invention is not limited to the case. By combining the elements BPF and 8, a green color may be developed. In addition, by combining the elements BPF and 9, a red color may be developed.

Although a case where, in the image display device element 22 including the elements BPF, 7, and 8, blue and green colors are developed was described, the present invention is not limited to the case. By combining the elements BPF, 8, and 9, green and red colors may be developed by the elements 8 and 9, respectively. In addition, by combining the elements BPF, 7, and 9, blue and red colors may be developed by the elements 7 and 9, respectively.

The above-described specific numerical values indicating reflection bands and transmission bands of the elements BPF and 7 to 9 were used for descriptive purposes, and the claimed invention is not limited to the numerical values. It is essential that the element BPF is required to be an element that transmits light in specific wavelength regions and the element 7 is required to be an element that reflects only blue light. The element 8 is required to be an element that reflects only green light. The element 9 is required to be an element that reflects only red light.

Tenth Color Development Mechanism

Although, in the above-described ninth color development mechanism, a case where blue, green, and red light are reflected by the elements 7, 8, and 9, respectively, was described, the present invention is not limited to the case. For example, as illustrated in FIG. 14, red, green, and blue light may be reflected by the elements 7, 8, and 9, respectively, to the observer OB side and the respective colors may be visually recognized by the observer OB. It is essential that the element BPF is required to be an element that transmits light in specific wavelength regions and the element 7 is required to be an element that reflects red light. The element 8 is required to be an element that reflects green light. The element 9 is required to be an element that reflects blue light. Alternatively, although not illustrated, blue, red, and green light may be reflected by the elements 7, 8, and 9, respectively, to the observer OB side and the respective colors may be visually recognized by the observer OB.

The basic principle of the color development mechanism is the same as the basic principle of the ninth color development mechanism. Therefore, a description of the basic principle of the color development mechanism will now be omitted.

That is, an image display device element based on the color development mechanism includes the element BPF that has light transmission characteristics for at least one wavelength region and light absorption characteristics or light reflection characteristics in an oblique direction for the other wavelength region and in which boundary wavelengths between the characteristics are fixed and the element 7 that, among light transmitted by the element BPF, has light reflection characteristics for a specific wavelength region located farthest on the long wavelength side and light transmission characteristics for the other wavelength region and in which boundary wavelengths between the characteristics are variable and is configured in such a way that light emitted from a light source proceeds toward the element BPF, the element BPF absorbs or reflects in an oblique direction light in the other wavelength region, light transmitted by the element BPF reaches the element 7, the element 7 reflects light in a specific wavelength region located farthest on the long wavelength side among the light having reached the element 7, and the reflected light proceeds toward the element BPF, is transmitted by the element BPF, and advances toward an observer.

In addition, the image display device element based on the color development mechanism further includes the element 8 that has light reflection characteristics for a specific wavelength region and light transmission characteristics for the other wavelength region and in which boundary wavelengths between the characteristics are variable and is configured in such a way that light emitted from the light source and transmitted by the elements BPF and 7 proceeds toward the element 8, the element 8 reflects light in a specific wavelength region located farthest on the long wavelength side among the light having reached the element 8, and the reflected light proceeds toward the element 7, is transmitted by the elements 7 and BPF, and advances toward the observer.

Further, the image display device element based on the color development mechanism further includes the element 9 that has light reflection characteristics for a specific wavelength region and light transmission characteristics for the other wavelength region and in which boundary wavelengths between the characteristics are variable and is configured in such a way that light emitted from the light source and transmitted by the elements BPF, 7, and 8 proceeds toward the element 9, the element 9 reflects light in a specific wavelength region located farthest on the long wavelength side among the light having reached the element 9, and the reflected light proceeds toward the element 8, is transmitted by the elements 8, 7, and BPF, and advances toward the observer.

Seventh Embodiment

Figure 15B:
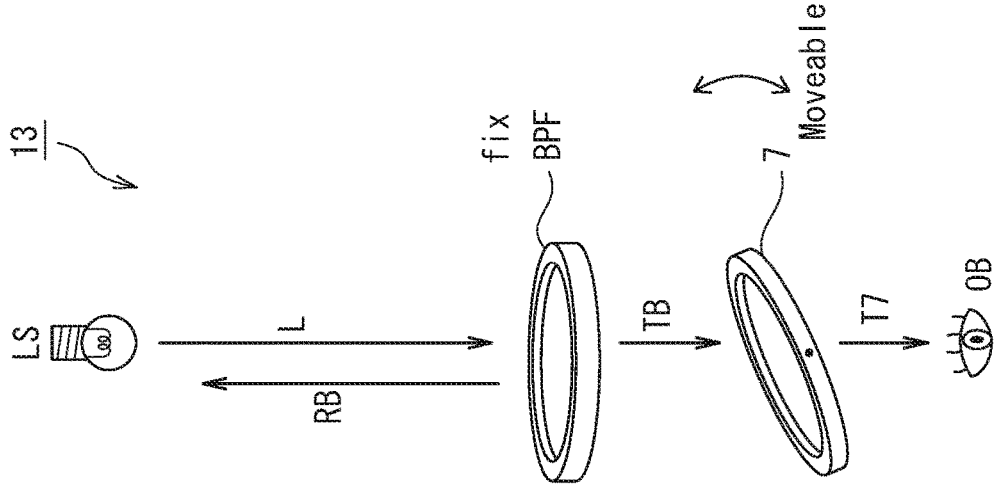
FIGS. 15A and 15B are conceptual diagrams illustrative of a configuration of an image display device element according a seventh embodiment of the present invention.
Figure 15A:
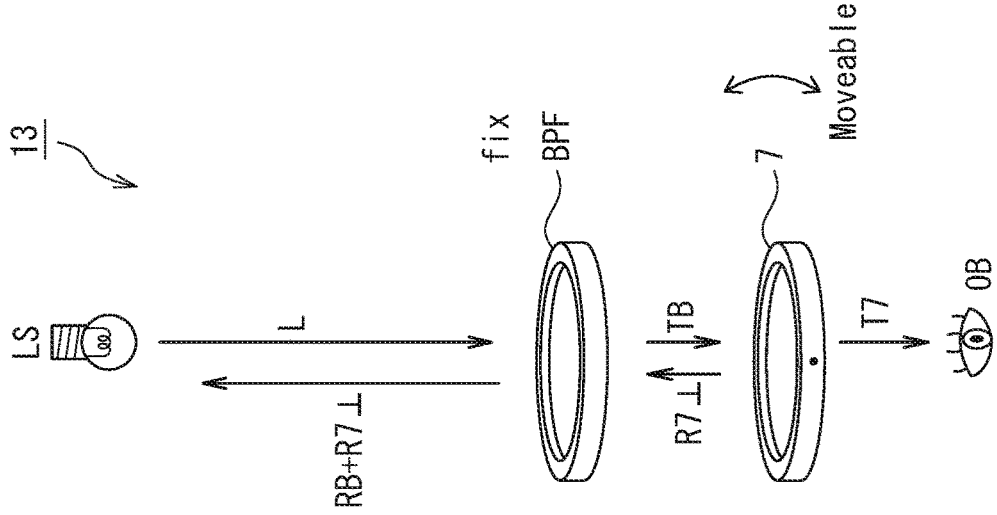

Hereinafter, a configuration of an image display device element 13 according to a seventh embodiment will be described. FIGS. 15A and 15B are conceptual diagrams illustrative of the configuration of the image display device element 13 according to the seventh embodiment of the present invention. As illustrated in FIGS. 15A and 15B, the image display device element 13 is an element for an image display device that develops a structural color and is an element that includes an element BPF that, among light L emitted by a light source LS, transmits light in a specific wavelength region(s) and reflects or absorbs light in the other wavelength region and an element 7 that, among first transmitted light TB that is light transmitted by the element BPF, reflects light in a specific wavelength region and transmits light in the other wavelength region. Hereinafter, the above-described respective components will be described.

The image display device element 13 according to the seventh embodiment works as a display element when including the light source LS and works as a filter element when not including the light source LS.

Element BPF

The element BPF is an element that, among light (incident light) L that is emitted from the light source LS and is incident on the image display device element 13, transmits light in a specific wavelength region(s) and absorbs or reflects in the direction toward the light source LS light in the other wavelength region and is, for example, an optical filter including a dielectric multilayer film.

The element BPF is arranged on the light source LS side in the image display device element 13. The surface on the light source LS side of the element BPF crosses the optical axis of the incident light L at right angles. For this reason, first reflected light RB that is light reflected by the element BPF advances in the direction toward the light source LS. Therefore, an observer OB never visually recognizes the first reflected light RB.

For the element BPF, a filter that, among the incident light L, transmits, for example, light in a wavelength region of at least one of blue (B), green (G), and red (R) colors and absorbs or reflects in the direction toward the light source LS light in the other wavelength region, that is, a so-called multi-band pass filter, is selected.

Element 7

The element 7 is an element that, among the first transmitted light TB, reflects light in a specific wavelength region in the direction toward the element BPF and transmits light in the other wavelength region and is, for example, an optical filter including a dielectric multilayer film or a polymer film developing a structural color. In FIGS. 15A and 15B, light reflected in the direction toward the element BPF by the element 7 and light transmitted by the element 7 are denoted as second reflected light R7⊥ and second transmitted light T7, respectively.

The element 7 is arranged on the observer OB side of the element BPF. The element 7 is also arranged in such a way that the surface on the element BPF side thereof can cross the optical axis of the incident light L at right angles. That is, the element 7 is arranged on the optical axis of the incident light L. In other words, the element 7 is overlapped by the element BPF when viewed from the observer OB side.

Inclination of the element 7 is variable. The element 7 is oriented in different inclinations in FIGS. 15A and 15B.

Eighth Embodiment

Figure 16B:
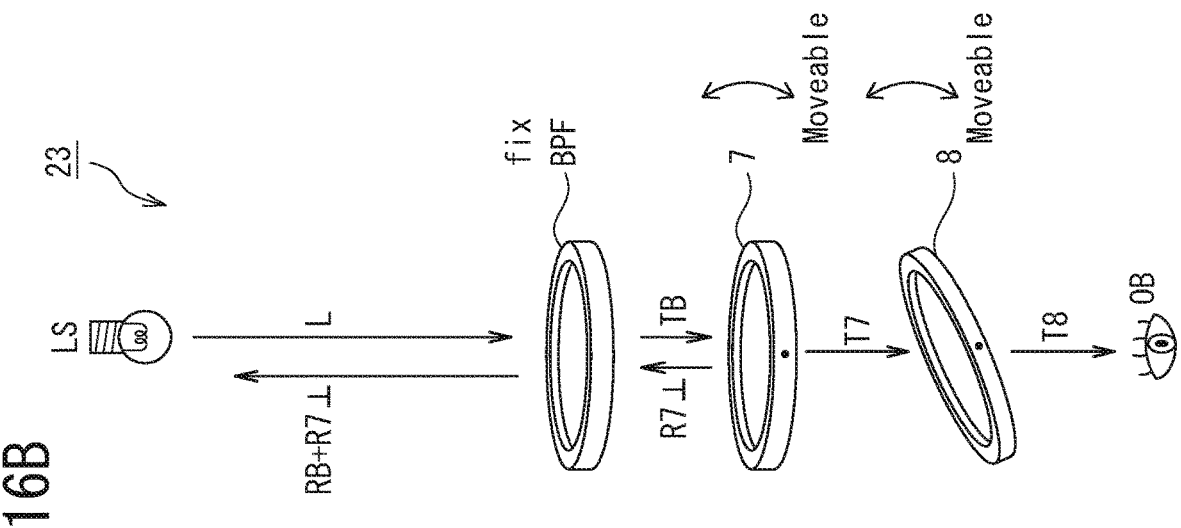
FIGS. 16A and 16B are conceptual diagrams illustrative of a configuration of an image display device element according an eighth embodiment of the present invention.
Figure 16A:
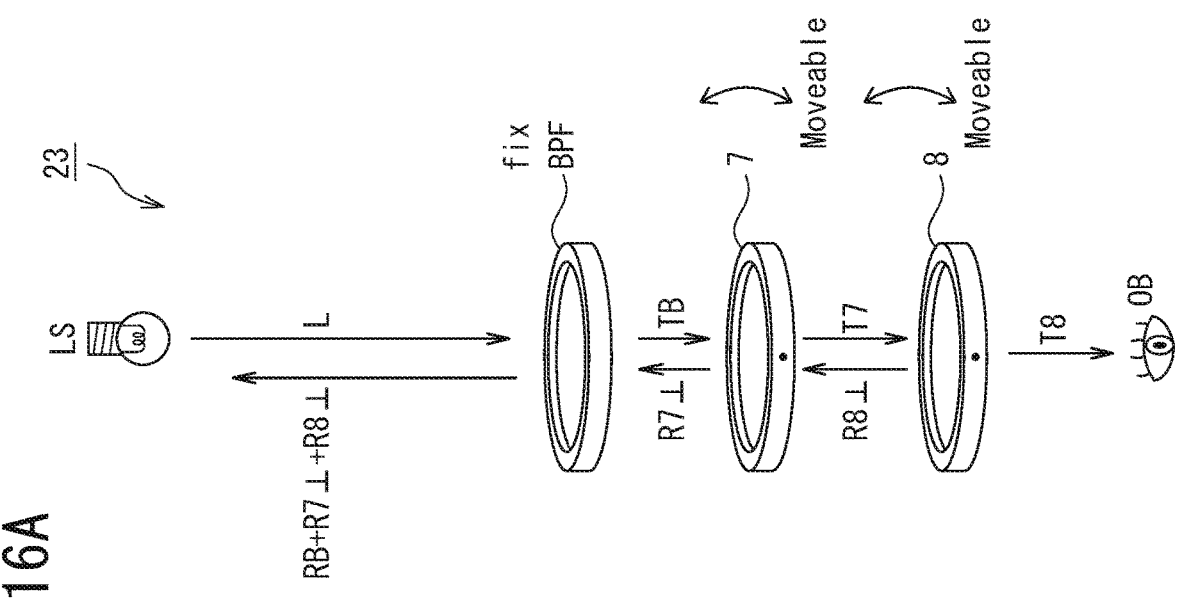

Hereinafter, a configuration of an image display device element 23 according to an eighth embodiment will be described. FIGS. 16A and 16B are conceptual diagrams illustrative of the configuration of the image display device element 23 according to the eighth embodiment of the present invention. As illustrated in FIGS. 16A and 16B, the image display device element 23 is an element for an image display device that develops structural colors and is an element that includes an element BPF that, among light L emitted by a light source LS, transmits light in a specific wavelength region(s) and reflects or absorbs light in the other wavelength region, an element 7 that, among first transmitted light TB that is light transmitted by the element BPF, reflects light in a specific wavelength region and transmits light in the other wavelength region, and an element 8 that, among second transmitted light T7 that is light transmitted by the element 7, reflects light in a specific wavelength region and transmits light in the other wavelength region. That is, the image display device element 23 according to the present embodiment is an image display device element that has a configuration in which the element 8 is added to the configuration of the image display device element 13 according to the above-described seventh embodiment. Therefore, the element 8, which is a portion different from the seventh embodiment, will be described below.

The image display device element 23 according to the eighth embodiment works as a display element when including the light source LS and works as a filter element when not including the light source LS.

Element 8

The element 8 is an element that, among the second transmitted light T7, reflects light in a specific wavelength region in the direction toward the element 7 and transmits light in the other wavelength region and is, for example, an optical filter including a dielectric multilayer film or a polymer film developing a structural color. In FIGS. 16A and 16B, light reflected in the direction toward the element BPF by the element 8 and light transmitted by the element 8 are denoted as third reflected light R8⊥ and third transmitted light T8, respectively.

The element 8 is arranged on the observer OB side of the element 7. The element 8 is also arranged in such a way that the surface on the element 7 side thereof can cross the optical axis of the incident light L at right angles. That is, the element 8 is arranged on the optical axis of the incident light L and is overlapped by the elements BPF and 7 when viewed from the observer OB side.

Inclination of the element 8 is variable. The element 7 is oriented in different inclinations in FIGS. 16A and 16B.

Ninth Embodiment

Figure 17A:
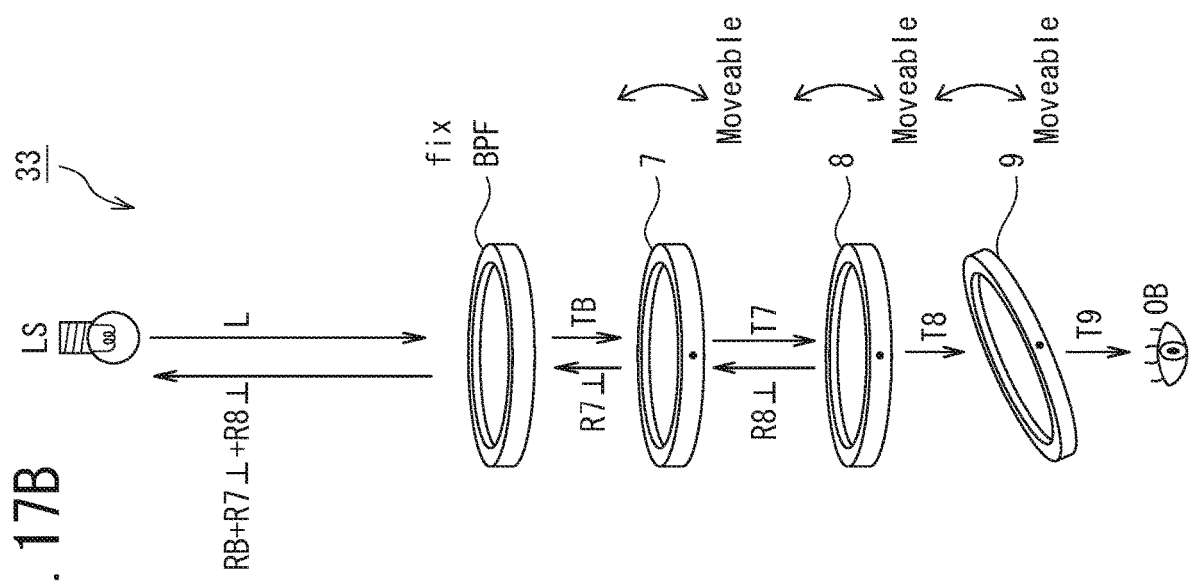
FIGS. 17A and 17B are conceptual diagrams illustrative of a configuration of an image display device element according a ninth embodiment of the present invention.
Figure 17B:
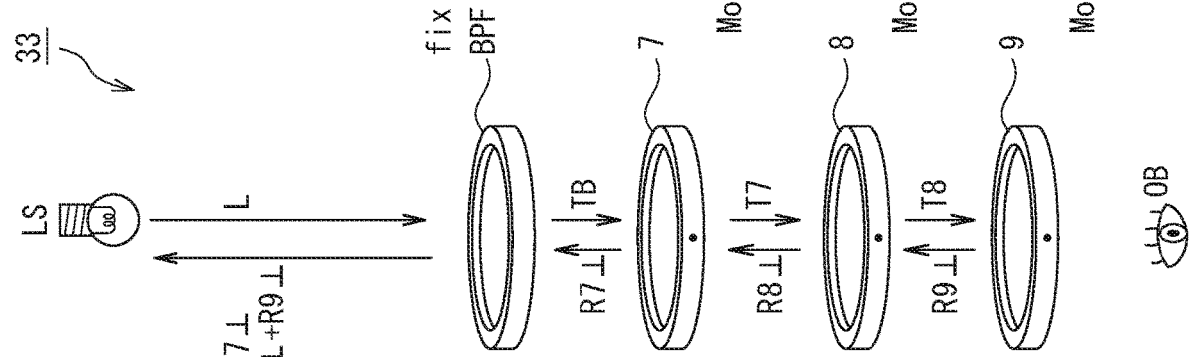

Hereinafter, a configuration of an image display device element 33 according to a ninth embodiment will be described. FIGS. 17A and 17B are conceptual diagrams illustrative of the configuration of the image display device element 33 according to the ninth embodiment of the present invention. As illustrated in FIGS. 17A and 17B, the image display device element 33 is an element for an image display device that develops structural colors and is an element that includes an element BPF that, among light L emitted by a light source LS, transmits light in a specific wavelength region(s) and reflects or absorbs light in the other wavelength region, an element 7 that, among first transmitted light TB that is light transmitted by the element BPF, reflects light in a specific wavelength region and transmits light in the other wavelength region, an element 8 that, among second transmitted light T7 that is light transmitted by the element 7, reflects light in a specific wavelength region and transmits light in the other wavelength region, and an element 9 that, among third transmitted light T8 that is light transmitted by the element 8, reflects light in a specific wavelength region and transmits light in the other wavelength region. That is, the image display device element 33 according to the present embodiment is an image display device element that has a configuration in which the element 9 is added to the configuration of the image display device element 23 according to the above-described eighth embodiment. Therefore, the element 9, which is a portion different from the eighth embodiment, will be described below.

The image display device element 33 according to the ninth embodiment works as a display element when including the light source LS and works as a filter element when not including the light source LS.

Element 9

The element 9 is an element that, among the third transmitted light T8, reflects light in a specific wavelength region in the direction toward the element 8 and transmits light in the other wavelength region and is, for example, an optical filter including a dielectric multilayer film or a polymer film developing a structural color. In FIGS. 17A and 17B, light reflected in the direction toward the element BPF by the element 9 is denoted as fourth reflected light R9⊥.

The element 9 is arranged on the observer OB side of the element 8. The element 9 is also arranged in such a way that the surface on the element 8 side thereof can cross the optical axis of the incident light L at right angles. That is, the element 9 is arranged on the optical axis of the incident light L and is overlapped by the elements BPF, 7, and 8 when viewed from the observer OB side.

Inclination of the element 9 is variable. The element 7 is oriented in different inclinations in FIGS. 17A and 17B.

Hereinafter, eleventh and twelfth color development mechanisms that are color development mechanisms using the image display device element 33 will be described with reference to FIGS. 13 and 14.

Eleventh Color Development Mechanism

FIG. 13 is a diagram illustrative of respective reflection/transmission characteristics of the elements BPF and 7 to 9 included in the image display device element 33. Because the reflection/transmission characteristics of the elements BPF and 7 to 9 were already described in the ninth color development mechanism, a description thereof will now be omitted.

Color Development Characteristics of Element 7

When the light L from the light source LS is incident on the element BPF, light (blue (B)) having a wavelength of around 450 nm among the incident light L is transmitted by the element BPF and reflected (Bragg reflection) by the element 7 to the light source LS side in the case of the configuration illustrated in FIG. 15A. The light reflected by the element 7 is transmitted by the element BPF. For this reason, the observer OB cannot visually recognize the light (blue (B)) having a wavelength of around 450 nm, which is the second reflected light R7⊥. On the other hand, in the case of the configuration illustrated in FIG. 15B, the observer OB can visually recognize the light (blue (B)) having a wavelength of around 450 nm. Further, the observer OB can also visually recognize light (green (G)) having a wavelength of around 510 nm and light (red (R)) having a wavelength of around 650 nm, which are not reflected by the element 7 to the light source LS side.

Color Development Characteristics of Element 8

When the second transmitted light T7 transmitted by the above-described element 7 is incident on the element 8, the light (green (G)) having a wavelength of around 510 nm among the second transmitted light T7 is reflected by the element 8 to the light source LS side in the case of the configuration illustrated in FIG. 16A. The light reflected by the element 8 is transmitted by the elements 7 and BPF. For this reason, the observer OB cannot visually recognize the light (green (G)) having a wavelength of around 510 nm, which is the third reflected light R8⊥. On the other hand, in the case of the configuration illustrated in FIG. 16B, the observer OB can visually recognize the light (green (G)) having a wavelength of around 510 nm. Further, the observer OB can also visually recognize light (red (R)) having a wavelength of around 650 nm, which is not reflected by the element 8 to the light source LS side.

Color Development Characteristics of Element 9

When the third transmitted light T8 transmitted by the above-described element 8 is incident on the element 9, light (red (R)) having a wavelength of around 650 nm among the third transmitted light T8 is reflected by the element 9 to the light source LS side in the case of the configuration illustrated in FIG. 17A. The light reflected by the element 9 is transmitted by the elements 8, 7, and BPF. For this reason, the observer OB cannot visually recognize the light (red (R)) having a wavelength of around 650 nm, which is the fourth reflected light R9⊥. On the other hand, in the case of the configuration illustrated in FIG. 17B, the observer OB can visually recognize only the light (red (R)) having a wavelength of around 650 nm.

As described above, in the case of the image display device element 33 including the elements BPF, 7, 8, and 9 as optical elements, the observer OB cannot visually recognize all the light (blue (B)), which is the second reflected light R7⊥, the light (green (G)), which is the third reflected light R8⊥, and the light (red (R)), which is the fourth reflected light R9⊥, in the case of the configuration illustrated in FIG. 17A. On the other hand, in the case of a configuration in which all of the elements 7, 8, and 9 are inclined, the observer OB can visually recognize a white color that is a composite color of blue (B), green (G), and red (R) colors.

The image display device element illustrated in FIGS. 17A and 17B expresses full colors by transmitting and reflecting blue (B), green (G), and red (R) light in this order, that is, transmitting and reflecting light in ascending order of wavelength. That is, the element 7, which develops a blue (B) color, switches, with respect to light in a wavelength region of blue (B), transmission in the direction in which the observer OB can visually recognize the light and reflection in the direction toward the light source LS.

The element 8, which develops a green (G) color, switches, with respect to light in a wavelength region of green (G), transmission in the direction in which the observer OB can visually recognize the light and reflection in the direction toward the light source LS.

The element 9, which develops a red (R) color, switches, with respect to light in a wavelength region of red (R), transmission in the direction in which the observer OB can visually recognize the light and reflection in the direction toward the light source LS.

Twelfth Color Development Mechanism

Although, in the above-described eleventh color development mechanism, a case where transmission and reflection of blue, green, and red light are switched by the elements 7, 8, and 9, respectively, was described, the present invention is not limited to the case. For example, as illustrated in FIG. 14, red, green, and blue light may be transmitted by the elements 7, 8, and 9, respectively, to the observer OB side and the respective colors may be visually recognized by the observer OB. It is essential that the element BPF is required to be an element that transmits light in a specific wavelength region(s) and the element 7 is required to be an element that switches transmission and reflection of red light. The element 8 is required to be an element that switches transmission and reflection of green light. The element 9 is required to be an element that switches transmission and reflection of blue light. Alternatively, although not illustrated, blue, red, and green light may be reflected by the elements 7, 8, and 9, respectively, to the observer OB side and the respective colors may be visually recognized by the observer OB.

The basic principle of the color development mechanism is the same as the basic principle of the eleventh color development mechanism. Therefore, a description of the basic principle of the color development mechanism will now be omitted.

EXAMPLES

Hereinafter, examples corresponding to the above-described first to third embodiments will be described.

Experimental Example 1: Control Experiment of Monochromatic Luminance

Outline of Experimental Example 1

An experimental example 1 that was conducted to verify that an image display device element configured by combining two dielectric multilayer film filters is capable of (1) reflecting (illuminating) visible light in a specific wavelength region or (2) absorbing (darkening) visible light in a specific wavelength region and further (3) setting luminance of reflected light arbitrarily will be described below.

Experimental Apparatus 510

Outline

Figure 18A:
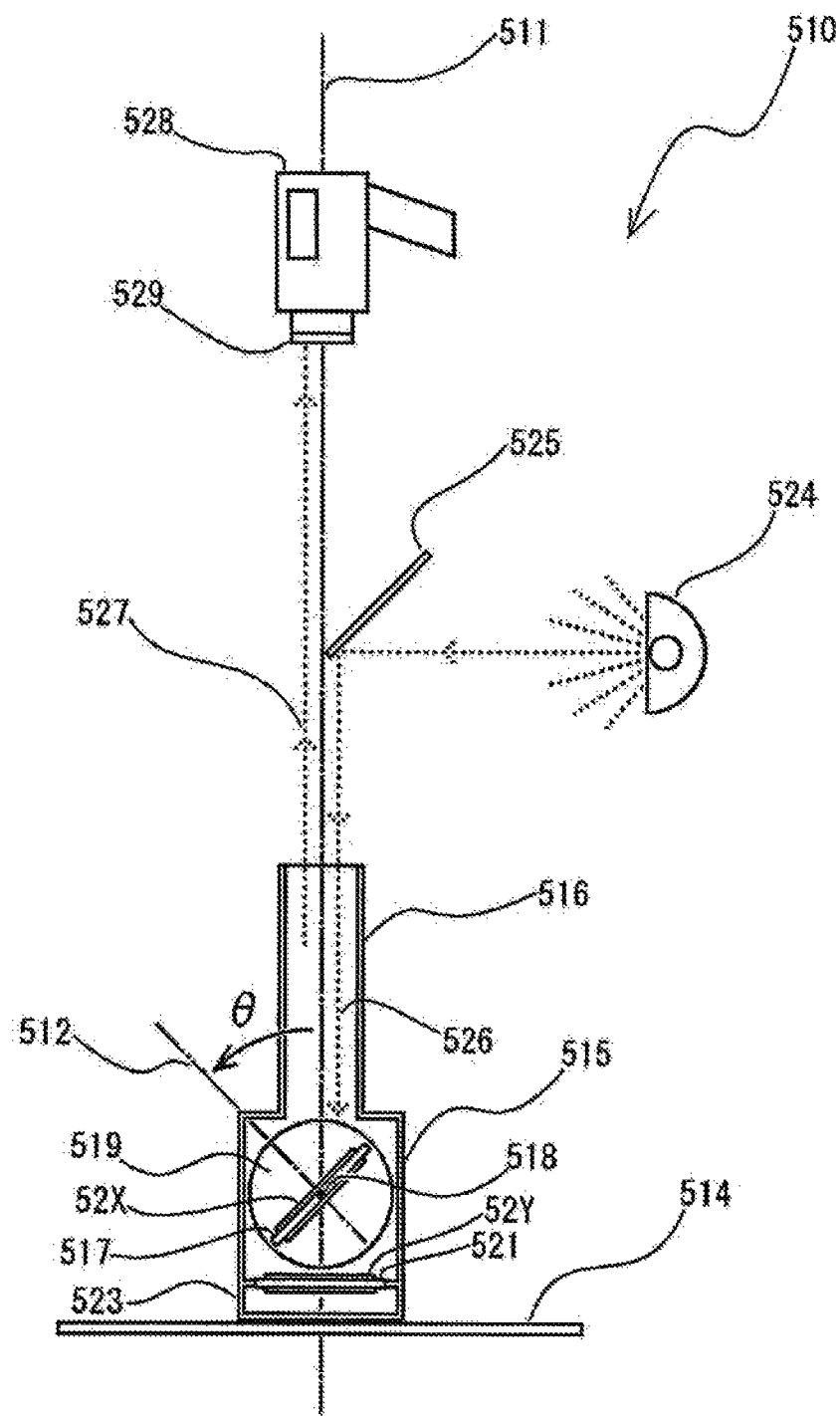
FIG. 18A is a schematic view illustrative of a configuration of an experimental apparatus for control experiment of monochromatic luminance used in an example 1 of the present invention.
Figure 18B:
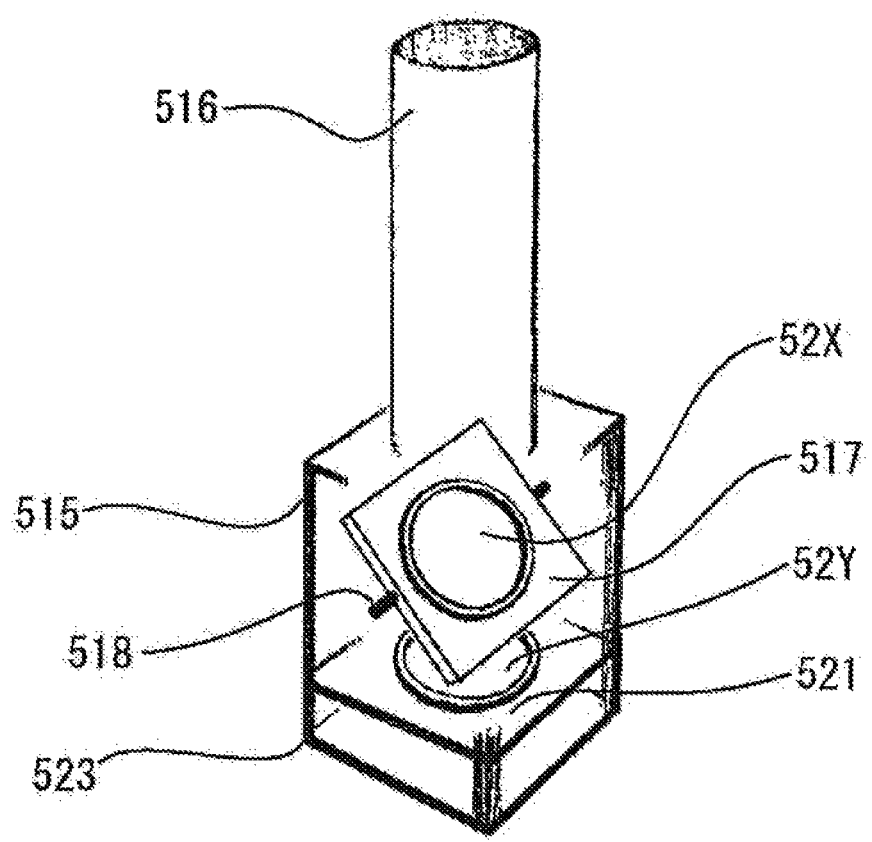
FIG. 18B is another schematic view illustrative of the configuration of the experimental apparatus for control experiment of monochromatic luminance used in the example 1 of the present invention.

FIGS. 18A and 18B are schematic views illustrative of a configuration of an experimental apparatus used in the experimental example 1. An apparatus (hereinafter, also simply referred to as an "experimental apparatus") 510 used in a control experiment of monochromatic luminance was used placed in a darkroom.

Arrangement

Hereinafter, an arrangement of constituent components of the experimental apparatus 510 will be described.

The experimental apparatus 510 includes, in order from the top, a chroma meter 528, a mirror 525, a light source device 524, a cylindrical pipe 516, a container 515, movable shafts 518, an angle setting knob 519, a folder 517, an element 52X, a folder 521, an element 52Y, a container 523, and a support platform 514 as principal constituent components. The chroma meter 528 includes a light receiving lens 529.

Hereinafter, the above-described principal constituent components will be described.

Support Platform 514

The support platform 514 is a base portion of the experimental apparatus 510 and has the upper surface thereof kept horizontal.

In FIG. 18A, a reference line 511 is illustrated. The reference line 511 is an imaginary line originating from the center on the upper surface of the support platform 514 and extending in the vertical direction. The reference line 511 serves as a reference for optical paths in the experiment.

The light receiving lens 529, the cylindrical pipe 516, the folder 521, and the element 52Y are placed in such a way as to have the center lines thereof coincident with the reference line 511.

Light Source Device 524

The light source device 524 is a component that provides white light required in the experiment.

The light source device 524 is placed at a position apart from the reference line 511 to avoid the light source device 524 itself from obstructing an optical path of light 527 to be described later.

As the light source device 524, a high color rendering fluorescent tube (type: FL20S•N-EDL•NU) manufactured by Mitsubishi Electric Lighting Corporation was used. The specifications of the fluorescent tube stipulate that the color temperature is 5000 K and the average color rendering index (Ra) is 99.

Mirror 525

The mirror 525 is a component that changes the direction of light emitted by the light source device 524 approximately 90° and directs the light to the cylindrical pipe 516 side.

The mirror 525 is placed between the chroma meter 528 and the cylindrical pipe 516. The reflection surface of the mirror 525 is inclined approximately 45° with respect to the optical axis of the light emitted by the light source device 524. The reflection surface of the mirror 525 is formed into a square shape, and the mirror 525 is placed in such a way that one edge of the reflection surface is positioned right next to the reference line 511. The reason for the arrangement is to avoid the mirror 525 itself from obstructing the optical path of the light 527.

Cylindrical Pipe 516

The cylindrical pipe 516 is a component that provides parallel light required in the experiment. The cylindrical pipe 516 is placed in such a way that the central axis of the pipe is coincident with the reference line 511. To the inner surface of the cylindrical pipe 516, a black coat 659 (see FIG. 21) for absorbing light not incident in parallel with the reference line 511 is applied. The cylindrical pipe 516 is disposed on an upper surface portion of the container 515, and the inner space of the cylindrical pipe 516 is in communication with the inner space of the container 515.

Container 515

The container 515 is an outer container that houses the following constituent components. The constituent components housed in the container 515 are the element 52X, the folder 517, the movable shafts 518, the angle setting knob 519, the element 52Y, and the folder 521. To the inner surface of the container 515, the black coat 659 (see FIG. 21) for absorbing light is applied.

Folder 517

The folder 517 is a component with which the element 52X, which is shaped into a thick coin, is mounted. The folder 517 is placed at the center of the inner space of the container 515. The movable shafts 518 are disposed to the folder 517, and the folder 517 can be rotated about the movable shafts 518.

Movable Shaft 518

The movable shafts 518 are components for rotating the folder 517. Each movable shaft 518 has the axis, while kept horizontal, crossing the reference line 511. One end and the other end of each movable shaft 518 are joined to the folder 517 and a bearing (not illustrated) disposed on the container 515, respectively. The element 52X, which is mounted on the folder 517, also rotates about the movable shafts 518 in conjunction with the folder 517.

Incident Angle θ

An incident angle θ to the element 52X is a determinant of reflection/transmission characteristics of the element 52X.

A central line 512 illustrated in FIG. 18A is an imaginary line that crosses the movable shafts 518 and is extended perpendicularly with respect to the center of the upper surface of the element 52X. In this configuration, the incident angle θ is an angle by which the central line 512 is turned with respect to the reference line 511. An angle at which the reference line 511 coincides with the central line 512 is an incident angle of 0°.

In the experiment, the incident angle θ was set at angles within a range from 20° to 60°. When the incident angle θ is set at an angle outside the range, a right result sometimes cannot be obtained because unnecessary light comes in or the optical path is obstructed.

FIG. 18A is illustrated in such a manner that the folder 51 and the element 52X the incident angle θ of which is set at 45° are viewed from a side face.

Angle Setting Knob 519

The angle setting knob 519 is a component that facilitates an observer to set the incident angle θ. The angle setting knob 519 is fixed to one of the movable shafts 518 and rotates in conjunction with the rotation of the element 52X. The angle setting knob 519 may be provided with a protractor to accurately set the incident angle θ.

Folder 521

The folder 521 is a component with which the element 52Y, which is shaped into a thick coin, is mounted. The bottom face portion of the container 515 serves as the folder 521. The element 52Y mounted on the folder 521 is placed in such a way that the reference line 511 passes through the center of the upper surface of the element 52Y vertically. That is, the incident angle to the element 52Y is constantly 0°.

FIG. 18A is illustrated in such a manner that the folder 521 and the element 52Y are viewed from a side face.

Container 523

The container 523 is a component for absorbing unnecessary light. To the inner surface of the container 523, the black coat 659 (see FIG. 21) for absorbing light is applied. Immediately below the element 52Y, the inner space of the container 523 exists.

Chroma Meter 528

The chroma meter 528 is a component that measures the light 527 that has passed through the inside of the cylindrical pipe 516. The chroma meter 528 is equipped with the light receiving lens 529. The light receiving lens 529 is directed to the far end of the cylindrical pipe 516, that is, the interior of the container 515.

The observer determines a measurement point and a measurement range, using a reticle circle imaged in a finder with which the chroma meter 528 is equipped. The chroma meter 528 is set in such a way as to perform a plurality of measurements and calculate and display luminance (Lv) and chromaticity (u', v') from averages of measured values in the measurements.

As the chroma meter 528, a chroma meter (type: Chroma Meter CS-160) manufactured by KONICA MINOLTA, INC. was used.

Element 52X

As the element 52X, a long-pass filter (with dielectric multilayer film coating) (model number: LOPF-25C-593) manufactured by SIGMAKOKI CO., LTD. was used.

In general, a long-pass filter (with dielectric multilayer film coating) has a characteristic of, with a boundary wavelength region as a boundary, reflecting (specular reflection) light on the short wavelength side and transmitting light on the long wavelength side. In addition, in general, a long-pass filter (with dielectric multilayer film coating) also has a characteristic that, as an incident angle to the long-pass filter increases, the boundary wavelength region is shifted further to the short wavelength side.

Figure 19:
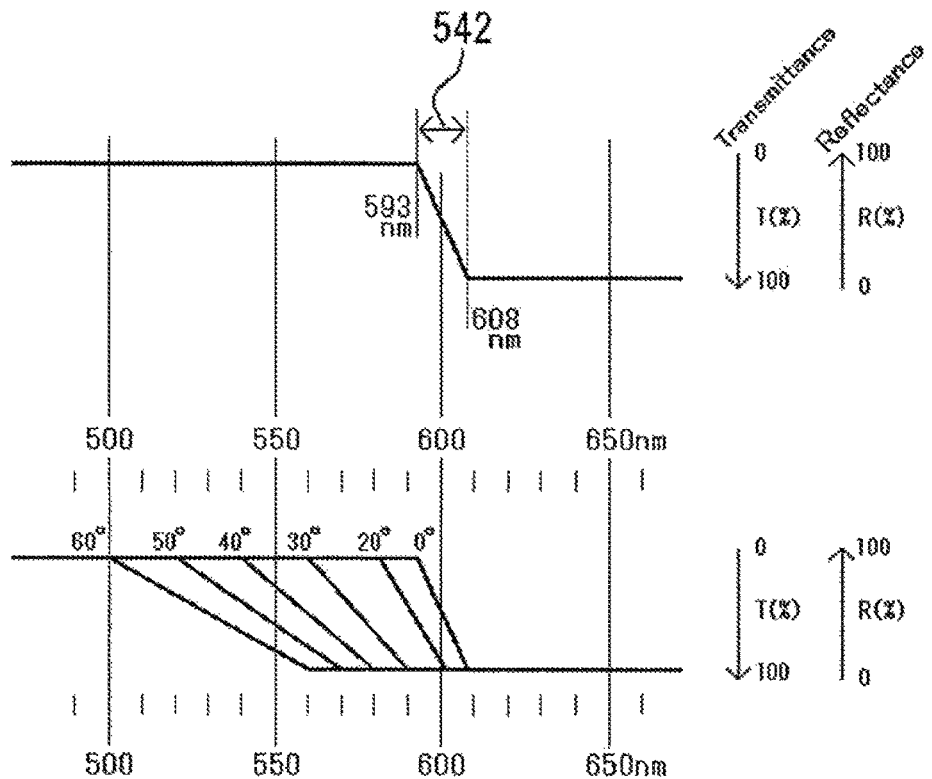
FIG. 19 is graphs illustrative of variation in reflection/transmission characteristics in association with variation in an incident angle θ to an element 52X used in the example 1 of the present invention.

FIG. 19 is graphs illustrative of variation in reflection/transmission characteristics of the element 52X in association with variation in an incident angle to the element 52X. The graphs illustrate only essential points drawn based on measured numerical values.

The graphs reveal that a boundary wavelength region 542 is present around approximately 600 nm when the incident angle θ is 0° and, as the incident angle θ is varied from 20° to 60°, the boundary wavelength region 542 influences light in a wavelength region from approximately 510 nm to approximately 590 nm. That is, it is revealed that the element 52X influences light in a wavelength region that a person recognizes as a green color.

Element 52Y

As the element 52Y, a notch filter (with dielectric multilayer film coating) (model number: NF-25C05-40-532) manufactured by SIGMAKOKI CO., LTD. was used.

In general, a notch filter (with dielectric multilayer film coating) has a characteristic of reflecting (specular reflection) light in a specific wavelength region and transmitting light outside the specific wavelength region.

Figure 20:
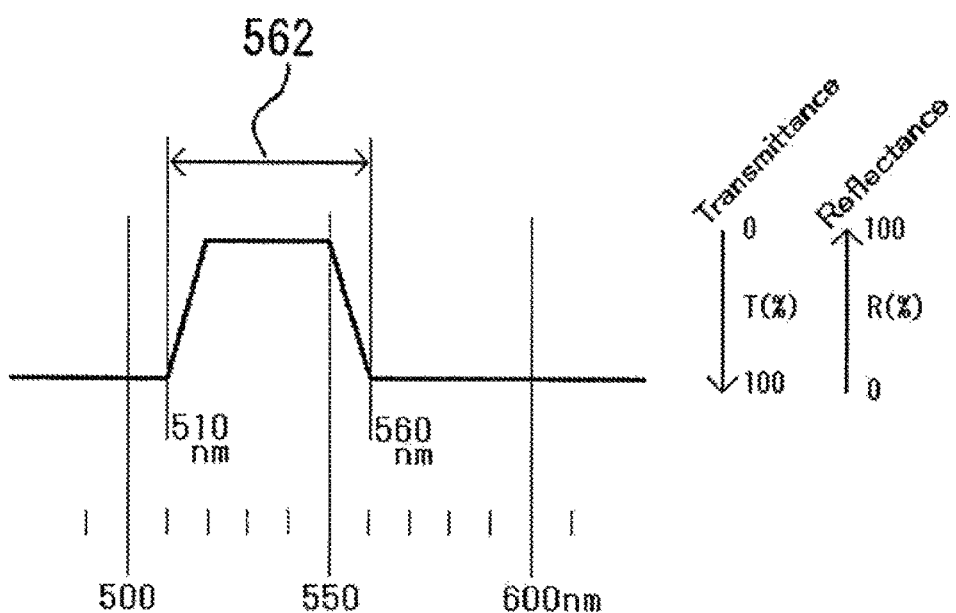
FIG. 20 is a graph illustrative of reflection/transmission characteristics of an element 52Y used in the example 1 of the present invention.

FIG. 20 is a diagram illustrative of reflection/transmission characteristics of the element 52Y. The graph in the diagram illustrates only essential points drawn based on measured numerical values at an incident angle of 0°.

FIG. 20 illustrates a characteristic of reflecting (specular reflection) light in a specific wavelength region 562 and transmitting light outside the specific wavelength region. In addition, FIG. 20 reveals that the specific wavelength region 562 is present centered around approximately 535 nm and the element 52Y reflects light in a wavelength region that a person recognizes as a green color.

Thus far is the description of the structures, arrangements, and features of the constituent components of the experimental apparatus 510.

Description of Optical Path

Figure 21:
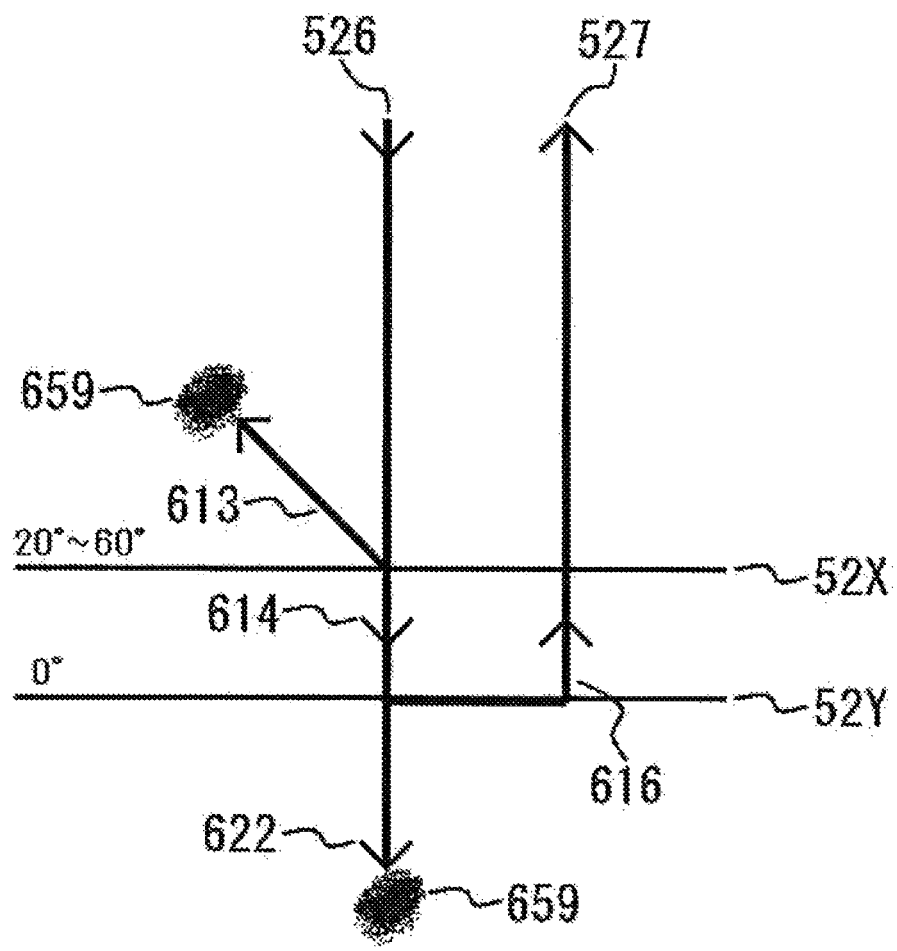
FIG. 21 is a diagram illustrative of a relationship between two elements used in the example 1 of the present invention and optical paths.

Hereinafter, using FIGS. 18A and 21, what optical path and process light emitted by the light source device 524 passes through to reach the chroma meter 528 in the experimental apparatus 510 will be described. FIG. 21 is a diagram illustrative of a relationship between the two elements and optical paths.

Light Source Device 524

Light emitted by the light source device 524 is white light (Ra: 99). The light, emitted by the light source device 524, turns its direction by approximately 90° by the mirror 525, passes through the inside of the cylindrical pipe 516, and proceeds toward the element 52X.

Among the light, light (that is, white parallel light) 526 that is substantially parallel with the reference line 511 passes through the inside of the cylindrical pipe 516 and light that is not is absorbed by the inner surface of the cylindrical pipe 516 to which the black coat 659 is applied.

Element 52X

As illustrated in FIG. 21, the light 526, which has passed through the cylindrical pipe 516, reaches the element 52X. The element 52X is a long-pass filter the incident angle θ of which is set at an angle within a range from 20° to 60° and separates the light 526, which has reached the element 52X, into light (reflected light) 613 on the short wavelength side that is reflected obliquely upward and light (transmitted light) 614 on the long wavelength side that is transmitted vertically downward. The light 613 is absorbed by the black coat 659. Note that the absorption of the light 613 by the black coat 659 can be considered equivalent to absorption of light on the short wavelength side by the element 52X.

Element 52Y

The light 614, which is transmitted by the element 52X, reaches the element 52Y. The element 52Y is a notch filter the incident angle θ of which is fixed to 0° and separates the light 614 into light 616 in a specific wavelength region that is reflected vertically upward and light 622 outside the specific wavelength region that is transmitted vertically downward.

The light 616 is transmitted by the element 52X, which is placed above the element 52Y, in the direction from down to up. The light is the light 527 that has passed through the inside of the cylindrical pipe 516 in the direction from down to up and the luminance of which has been controlled.

On the other hand, the light 622, which is light outside the specific wavelength region that was transmitted instead of being reflected, proceeds toward the container 523, which is placed below the element 52Y, and is absorbed by the black coat 659 applied to the inside of the container 523.

Chroma Meter 527

The light 527 proceeds upward, passes through the inside of the cylindrical pipe 516, passes by an edge of the mirror 525, and reaches the light receiving lens 529. The chroma meter 528, with respect to the light, performs measurement and calculation and displays luminance (Lv) and chromaticity (u', v'). The above is the optical path and process originating from the light source device 524 and reaching the chroma meter 528.

Wavelength Region Filtering

Figure 22:
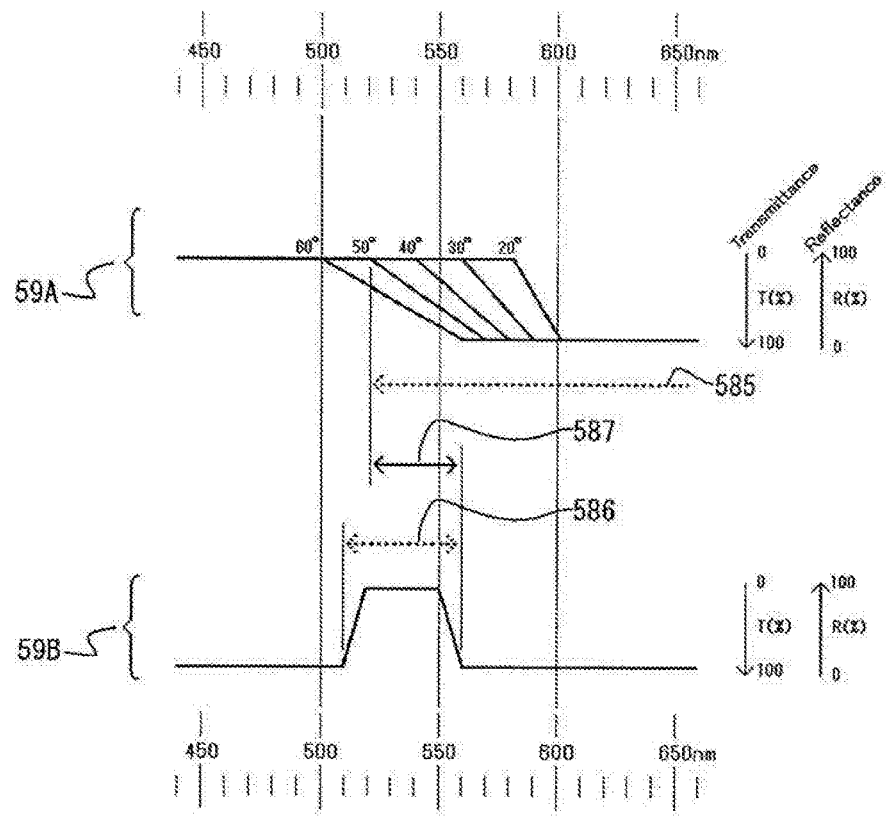
FIG. 22 is a diagram illustrative of a relationship between the two elements used in the example 1 of the present invention and wavelength regions.

Hereinafter, using FIG. 22, wavelength region filtering performed between the two elements will be described. FIG. 22 is a diagram in which how wavelength region filtering that is performed by the two optical elements (dielectric multilayer film filters) used in the experimental apparatus 510 works is drawn on the wavelength scale.

A chart 59X illustrates, with respect to the element 52X, variation in reflection/transmission characteristics when the incident angle θ is varied from 20° to 60° at 10° intervals. A chart 59B illustrates, with respect to the element 52Y, reflection/transmission characteristics at an incident angle of 0°.

A wavelength region 585 indicates a wavelength region of light that, when the incident angle θ to the element 52X is set at 50°, the element 52X transmits vertically downward below the element 52X.

A wavelength region 586 indicates a wavelength region of light that the element 52Y reflects vertically upward above the element 52Y.

A wavelength region 587 indicates a wavelength region of the light 527 as a result of the wavelength region filtering performed by the elements 52X and 52Y. On this occasion, the light 527 is light the luminance of which is controlled and that has a specific color, that is, green-colored visible light the luminance of which is adjusted, in this example.

Luminance Control

In the above-described description, a region where the wavelength regions 585 and 586 overlap each other is the wavelength region 587. Width of the wavelength region 587 can be widened or narrowed by varying the incident angle θ to the element 52X. These operations are equivalent to increasing or decreasing the amount of the light 527. That is, these operations are equivalent to controlling luminance.

As described above, the elements 52X and 52Y, housed in the container 515, are components that are capable of, among light that is incident from above, reflecting the light 527 upward and further controlling intensity (luminance) of the light.

Experimental Process

Hereinafter, using FIG. 18A, a process of the experiment will be described.

In the experimental apparatus 510, first, the light 526 is radiated from the light source device 524 to a set of elements housed inside the container 515 via the mirror 525 and the cylindrical pipe 516.

Then, from the inside of the container 515, the light 527, passing through the cylindrical pipe 516, is reflected upward and returns to the chroma meter 528. At this time, a "green glow" can be seen in the finder of the chroma meter 528. On this occasion, the light 527 is light the luminance of which is controlled and that has a specific color, that is, green-colored visible light the luminance of which is adjusted, in this example.

The light 527 is measured using the chroma meter 528, and luminance (Lv) and chromaticity (u', v') are displayed and recorded. The incident angle θ to the element 52X was set at angles from 60° to 20° at 5° intervals by turning the angle setting knob 519 and the above-described measurement was performed at the respective incident angles θ.

Measurement Result

Hereinafter, a numerical table obtained from the measurement and a graph and a chromaticity diagram drawn based on the table will be described.

Table 1 illustrates luminance values (Lv) and chromaticity values (u', v') obtained from the measurement. That is, Table 1 is a numerical table illustrative of variation in the luminance and the chromaticity in association with variation in the incident angle θ to the element 52X.

TABLE 1

| θ | Lv | u' | v' |
|---|---|---|---|
| 60° | 764.3 | 0.109 | 0.581 |
| 55° | 609.1 | 0.121 | 0.580 |
| 50° | 494.7 | 0.135 | 0.578 |
| 45° | 226.8 | 0.185 | 0.571 |
| 40° | 80.0 | 0.314 | 0.552 |
| 35° | 60.6 | 0.359 | 0.545 |
| 30° | 49.2 | 0.391 | 0.540 |
| 25° | 43.9 | 0.406 | 0.537 |
| 20° | 39.6 | 0.415 | 0.535 |

Figure 23:
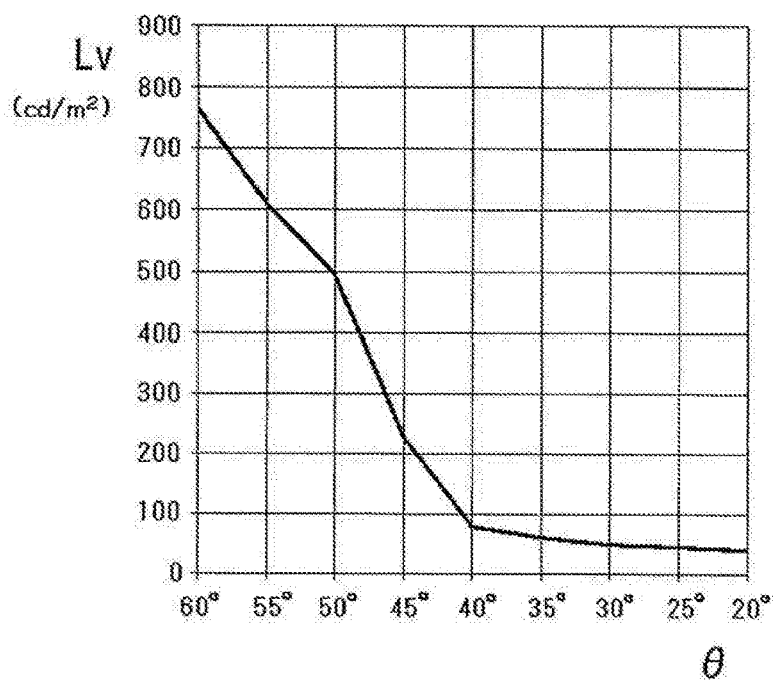
FIG. 23 is a graph illustrative of variation in luminance in association with variation in the incident angle θ to the element 52X used in the example 1 of the present invention.
Figure 24:
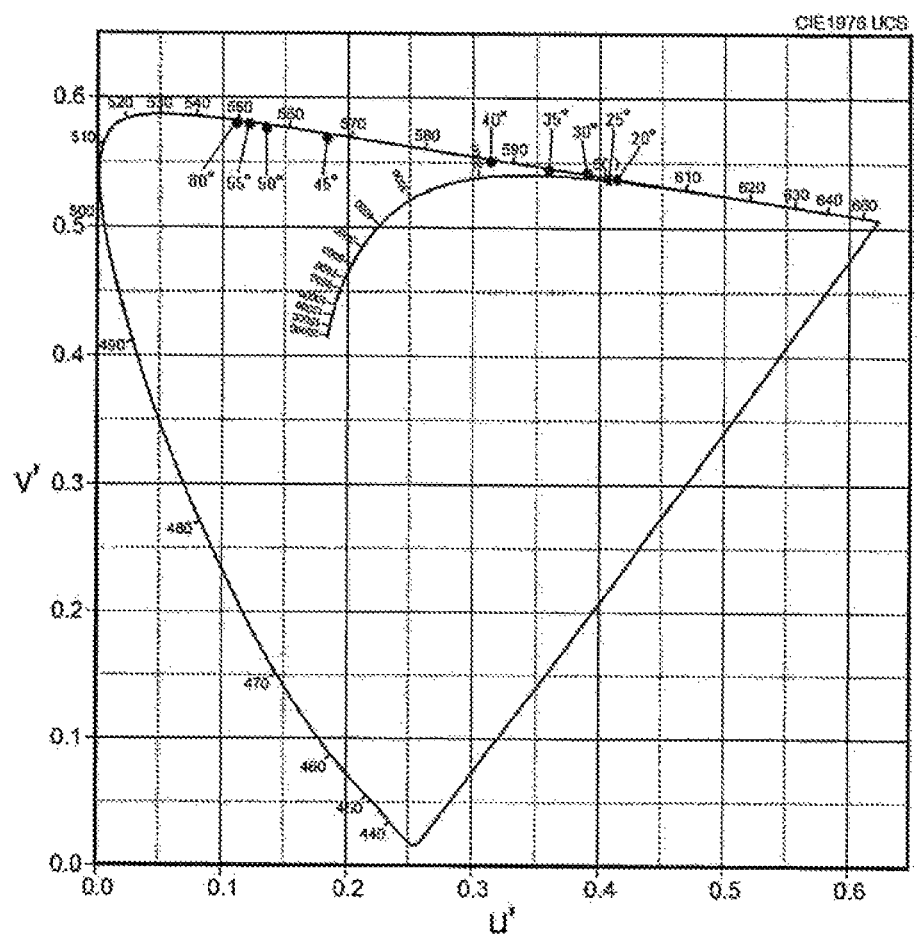
FIG. 24 is a chromaticity diagram illustrative of variation in chromaticity in association with variation in the incident angle θ to the element 52X used in the example 1 of the present invention.

FIG. 23 is a graph illustrative of a locus of luminance variation in association with variation in the incident angle θ to the element 52X, which is drawn based on the luminance values (Lv) in Table 1. FIG. 24 is a chromaticity diagram illustrative of a locus of chromaticity variation in association with variation in the incident angle θ to the element 52X, which is drawn based on the chromaticity values (u', v') in Table 1.

Evaluation of Luminance

First, variation in the luminance (Lv) will be described from a result obtained in the above-described experiment. In the experiment, it is desirable that the luminance (Lv) vary as largely and linearly as possible with respect to variation in the incident angle θ to the element 52X.

From FIG. 23, it can be seen that the luminance (Lv) continues to decrease substantially linearly with respect to variation in the incident angle θ while the incident angle θ to the element 52X decreases from 60° to 40° and remains at substantially the same level while the incident angle θ decreases from 40° to 20°.

Further, the luminance (Lv) is approximately 764 (cd/m²), which is the highest value, when the incident angle θ to the element 52X is 60°, and the luminance (Lv) is approximately 80 (cd/m²) or lower while the incident angle θ decreases from 40° to 20°. In addition, a clear contrast can be seen from the fact that the lowest value of the luminance (Lv) is approximately one tenth or less of the highest value of the luminance (Lv).

Evaluation of Chromaticity

Next, variation in the chromaticity (u', v') will be described. In the experiment, it is desirable that the chromaticity (u', v') do not vary as much as possible with respect to variation in the incident angle θ to the element 52X. From FIG. 24, it can be seen that variation in the chromaticity (u', v') is comparatively small while the incident angle θ to the element 52X decreases from 60° to 45° and large when the incident angle θ is 45° or less.

Relationship Between Luminance and Chromaticity

From the relationship between the luminance (Lv) and the chromaticity (u', v'), it can be seen that, while the incident angle θ to the element 52X is set at values (from 60° to 45°) that cause variation in the chromaticity (u', v') to be comparatively small, the luminance (Lv) has high values, can be varied largely, and continues to decrease substantially linearly.

Evaluation of Experiment

The above-described result reveals that (1), when the incident angle θ to the element 52X is set in such a way as to have only an angle of either 60° or 40°, it is possible to make the luminance (Lv) of the reflected light 527 have a maximum value or a minimum value.

Further, (2) while the incident angle θ to the element 52X is varied from 60° to 45°, variation in the chromaticity (u', v') is comparatively small. While the incident angle θ is varied from 60° to 40°, variation in the luminance with respect to variation in the angle is linear. That is, while the incident angle θ to the element 52X is varied from 60° to 40°, the luminance can be varied linearly with respect to the incident angle θ without chromaticity variation.

The above-described result reveals that the light 527 having a desired luminance and chromaticity can be generated. When the incident angle θ was varied from 60° or 40°, luminance of a green color became low without chromaticity variation. That is, the green color became dark while keeping the same green color.

From the above-described result, an image display device element configured by combining two dielectric multilayer film filters is capable of reflecting (illuminating) visible light in a specific wavelength region or absorbing (darkening) visible light in a specific wavelength region. Further, it was clearly verified that the image display device element was also capable of setting intensity (luminance) of reflected light at a desired value.

Experimental Example 2: Control Experiment of Polychromatic Luminance

Outline of Experimental Example 2

An experimental example 2 that was conducted to verify that an image display device element configured by combining three sets of two dielectric multilayer film filters, in total six dielectric multilayer film filters, is capable of (1) developing principal primary colors (blue, green, and red) and (2) developing composite colors (cyan, yellow, magenta, and white) of the primary colors will be described below.

The image display device element to be verified in the experimental example 2 is an image display device element that is configured by adding a function of sending light to a succeeding stage to the image display device element verified in the experimental example 1 and stacking three such augmented elements.

Experimental Apparatus 710

Outline

Figure 25:
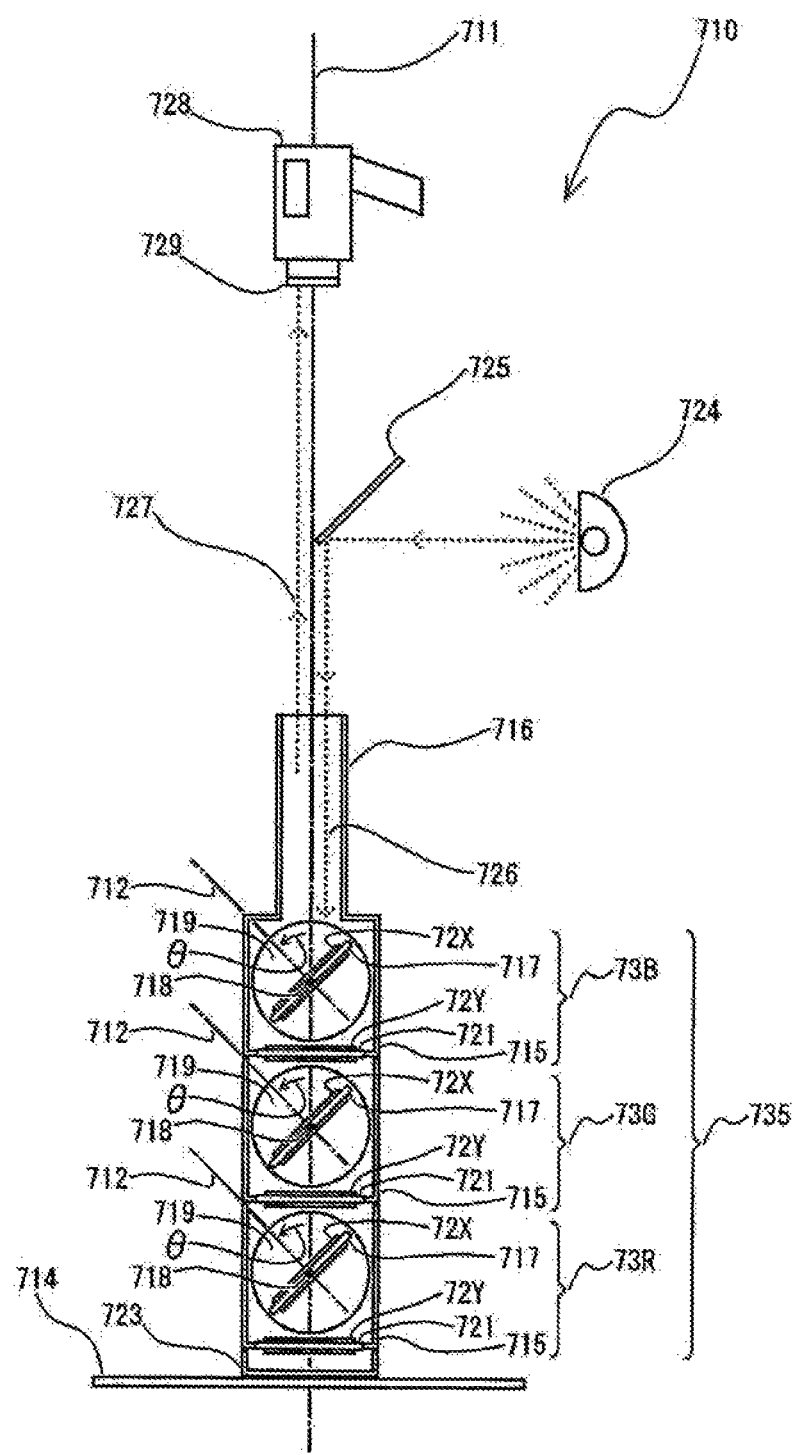
FIG. 25 is a schematic view illustrative of a configuration of an experimental apparatus used in an experimental example 2 of the present invention.

FIG. 25 is a schematic view illustrative of a configuration of an experimental apparatus used in the experimental example 2. An apparatus (hereinafter, also simply referred to as an "experimental apparatus") 710 used in the color development experiment was used placed in a darkroom.

<Arrangement>

Hereinafter, an arrangement of constituent components of the experimental apparatus 710 will be described. The experimental apparatus 710 includes, in order from the top, a chroma meter 728, a mirror 725, a light source device 724, a cylindrical pipe 716, an optical unit group 735, a container 723, and a support platform 714 as principal constituent components.

The optical unit group 735 is configured by stacking vertically an optical unit 73B for developing a blue color at the top stage, an optical unit 73G for developing a green color at the middle stage, and an optical unit 73R for developing a red color at the bottom stage. Each of the optical units 73B, 73G, and 73R is configured including a container 715, movable shafts 718, an angle setting knob 719, a folder 717, an element 72X, a folder 721, and an element 72Y.

Support Platform 714

The support platform 714 is a base portion of the experimental apparatus 710 and has the upper surface thereof kept horizontal.

In FIG. 25, a reference line 711 is illustrated. The reference line 711 is an imaginary line originating from the center on the upper surface of the support platform 714 and extending in the vertical direction. The reference line 711 serves as a reference for optical paths in the experiment.

A light receiving lens 729, the cylindrical pipe 716, the respective folders 721, and the respective elements 72Y are placed in such a way as to have central lines thereof coincident with the reference line 711.

Light Source Device 724

The light source device 724 is a component that provides white light required in the experiment. The light source device 724 is the same device as the light source device 524 described in the experimental example 1. Therefore, a description of the light source device 724 will now be omitted.

Mirror 725

The mirror 725 is a component that changes the direction of light emitted by the light source device 724 approximately 90° and directs the light to the cylindrical pipe 716 side. The mirror 725 is the same component as the mirror 525 described in the experimental example 1. Therefore, a description of the mirror 725 will now be omitted.

Cylindrical Pipe 716

The cylindrical pipe 716 is a component that provides parallel light required in the experiment. The cylindrical pipe 716 is the same component as the cylindrical pipe 516 described in the experimental example 1. Therefore, a description of the cylindrical pipe 716 will now be omitted. To the inner surface of the cylindrical pipe 716, a black coat 859 (see FIG. 28) for absorbing light not incident in parallel with the reference line 711 is applied.

Optical Unit Group 735

The optical unit group 735 is a component that reflects upward light 727, to be described later, that has a composite color. Because the optical unit group 735 is a core part relating to color development principle to be verified using the experimental apparatus 710, the optical unit group 735 will be described in detail later.

Chroma Meter 728

The chroma meter 728 is a component that measures the light 727 that has passed through the inside of the cylindrical pipe 716. The chroma meter 728 is the same component as the chroma meter 528 described in the experimental example 1. Therefore, a description of the chroma meter 728 will now be omitted.

Container 723

The container 723 is a component for absorbing unnecessary light. The container 723 is the same component as the container 523 described in the experimental example 1. Therefore, a description of the container 723 will now be omitted. To the inner surface of the container 723, the black coat 859 (see FIG. 28) for absorbing light is applied.

Configuration of Optical Unit Group 735

The optical unit group 735 is a component that reflects upward the light 727, which has a composite color, and is configured by stacking the optical units 73B, 73G, and 73R.

Hereinafter, a function and configuration of each optical unit will be described. The optical unit 73B is a component that reflects upward light in a wavelength region that a person recognizes as a blue color. The optical unit 73G is a component that reflects upward light in a wavelength region that a person recognizes as a green color. The optical unit 73R is a component that reflects upward light in a wavelength region that a person recognizes as a red color.

Configuration of Each Optical Unit

Each optical unit is configured including the container 715, the movable shafts 718, the angle setting knob 719, the folder 717, the element 72X, the folder 721, and the element 72Y.

Only difference among the respective optical units is a difference in features or characteristics of the elements 72X and 72Y belonging to the respective optical units and there is no difference for the other constituent components. Hereinafter, functions, arrangements, and features of the constituent components of each optical unit will be described.

Container 715

The container 715, included in each optical unit, is an outer container constituting the optical unit and is a component that covers a set of constituent components, including optical elements, belonging to the optical unit. The container 715 is the same component as the container 515 described in the experimental example 1. Therefore, a description of the container 715 will now be omitted. To the inner surface of the container 715, the black coat 859 (see FIG. 28) for absorbing light is applied.

Folder 717

The folder 717 included in each optical unit is a component with which the element 72X, which is shaped into a thick coin, is mounted. The folder 717 is the same component as the folder 517 described in the experimental example 1. Therefore, a description of the container 715 will now be omitted.

Configuration: Movable Shaft 718

The movable shafts 718 included in each optical unit are components for rotating the folder 717. The movable shafts 718 are the same components as the movable shafts 518 described in the experimental example 1. Therefore, a description of the movable shafts 718 will now be omitted.

Incident Angle $\theta$

An incident angle $\theta$ to the element 72X is a determinant of reflection/transmission characteristics of the element 72X.

The incident angle $\theta$ and a central line 712 are defined for each optical unit. The incident angle $\theta$ and the central line 712 are the same as the incident angle $\theta$ and the central line 512 described in the experimental example 1. Therefore, a description of the incident angle $\theta$ and the central line 712 will now be omitted.

Angle Setting Knob 719

The angle setting knob 719 is a component that facilitates an observer to set the incident angle $\theta$. The angle setting knob 719 is the same component as the angle setting knob 519 described in the experimental example 1. Therefore, a description of the angle setting knob 719 will now be omitted.

Folder 721

The folder 721 is a component with which the element 72Y, which is shaped into a thick coin, is mounted. The folder 721 is the same component as the folder 521 described in the experimental example 1. Therefore, a description of the folder 721 will now be omitted.

Element 72X

The elements 72X are approximately the same components as the element 52X described in the experimental example 1. Therefore, portions different from the element 52X, described in the experimental example 1, will be described below.

Element 72X in Optical Unit 73B

As the element 72X in the optical unit 73B, a long-pass filter (with dielectric multilayer film coating) (model number: LOPF-25C-488) manufactured by SIGMAKOKI CO., LTD. was used.

Figure 26A:
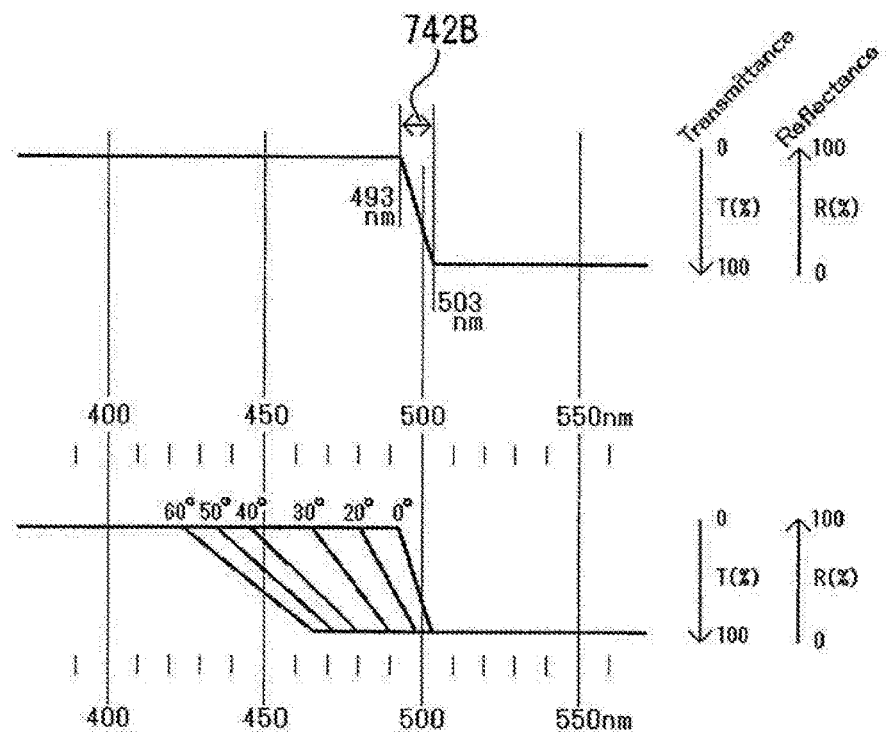
FIG. 26A is graphs illustrative of variation in transmittance/reflectance vs. wavelength characteristics in association with variation in an incident angle θ to an element 72X in an optical unit 73B.

FIG. 26A is graphs illustrative of, with respect to the element 72X in the optical unit 73B, variation in reflection/transmission characteristics in association with variation in an incident angle θ to the element 72X. The graphs illustrate only essential points drawn based on measured numerical values.

The graphs reveal that a boundary wavelength region 742B is present around approximately 500 nm when the incident angle θ is 0° and, for variation in the incident angle θ in a range from 20° to 60°, the boundary wavelength region 742B is shifted and thereby influences light in a wavelength region from approximately 430 nm to approximately 490 nm. That is, it is revealed that the element 72X influences light in a wavelength region that a person recognizes as a blue color.

Element 72X in Optical Unit 73G

As the element 72X in the optical unit 73G, a long-pass filter (with dielectric multilayer film coating) (model number: LOPF-25C-593) manufactured by SIGMAKOKI CO., LTD. was used.

Figure 26B:
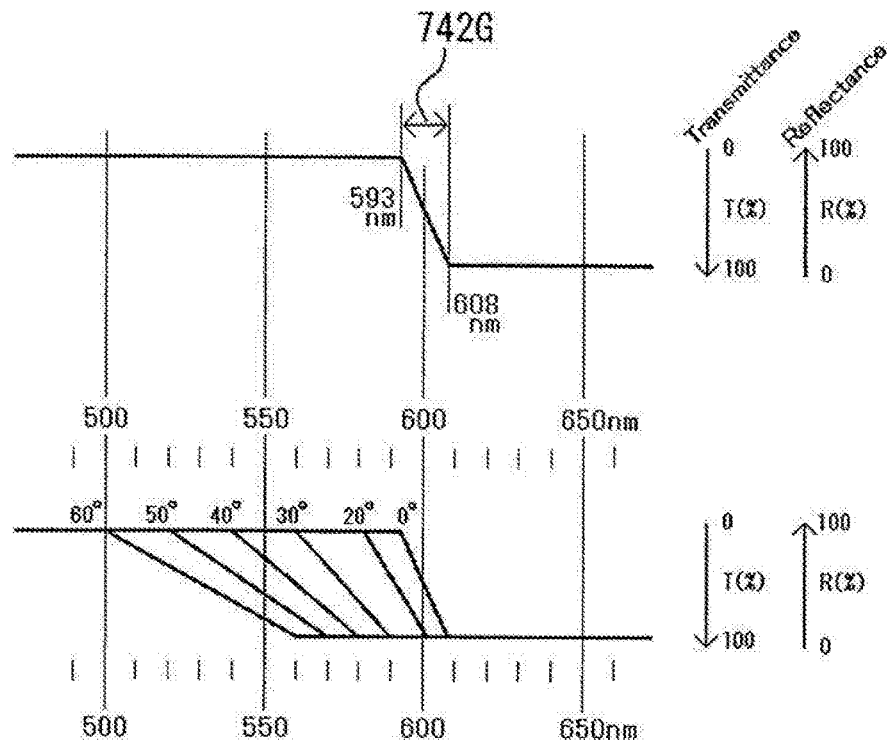
FIG. 26B is graphs illustrative of variation in reflection/transmission characteristics in association with variation in an incident angle θ to an element 72X in an optical unit 73G.

FIG. 26B is graphs illustrative of, with respect to the element 72X in the optical unit 73G, variation in reflection/transmission characteristics in association with variation in an incident angle θ to the element 72X. The graphs illustrate only essential points drawn based on measured numerical values.

The graphs reveal that a boundary wavelength region 742G is present around approximately 600 nm when the incident angle θ is 0° and, for variation in the incident angle θ in a range from 20° to 60°, the boundary wavelength region 542G is shifted and thereby influences light in a wavelength region from approximately 510 nm to approximately 590 nm. That is, it is revealed that the element 72X influences light in a wavelength region that a person recognizes as a green color.

Element 72X in Optical Unit 73R

As the element 72X in the optical unit 73R, a long-pass filter (with dielectric multilayer film coating) (model number: LOPF-25C-715) manufactured by SIGMAKOKI CO., LTD. was used.

Figure 26C:
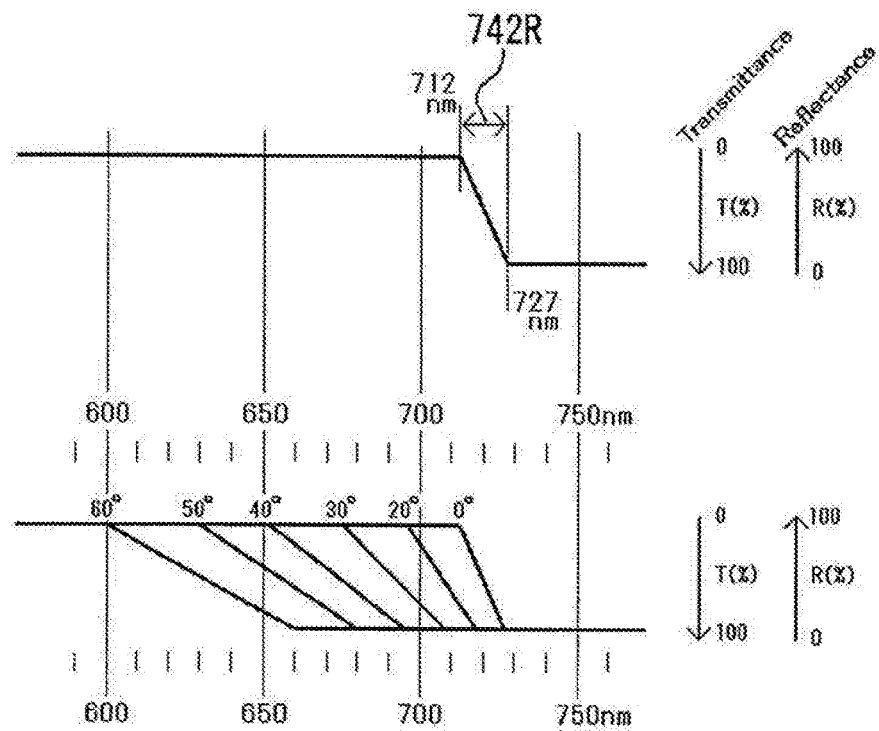
FIG. 26C is graphs illustrative of variation in reflection/transmission characteristics in association with variation in an incident angle θ to an element 72X in an optical unit 73R.

FIG. 26C is graphs illustrative of, with respect to the element 72X in the optical unit 73R, variation in reflection/transmission characteristics in association with variation in an incident angle θ to the element 72X. The graphs illustrate only essential points drawn based on measured numerical values.

The graphs reveal that a boundary wavelength region 742R is present around approximately 720 nm when the incident angle θ is 0° and, for variation in the incident angle θ in a range from 20° to 60°, the boundary wavelength region 742R is shifted and thereby influences light in a wavelength region from approximately 610 nm to approximately 710 nm. That is, it is revealed that the element 72X influences light in a wavelength region that a person recognizes as a red color.

Element 72Y

The elements 72Y are approximately the same components as the element 52Y described in the experimental example 1. Therefore, portions different from the element 52Y, described in the experimental example 1, will be described below.

Element 72Y in Optical Unit 73B

As the element 72Y in the optical unit 73B, a long-pass filter (with dielectric multilayer film coating) (model number: LOPF-25C-458) manufactured by SIGMAKOKI CO., LTD. was used.

Figure 27A:
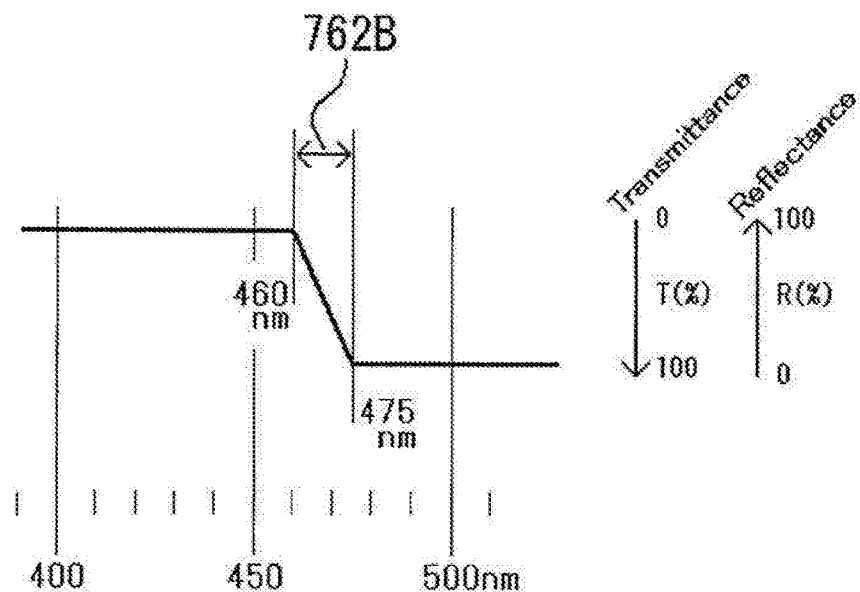
FIG. 27A is a graph illustrative of reflection/transmission characteristics with respect to an element 72Y in an optical unit 73B.

FIG. 27A is a graph illustrative of reflection/transmission characteristics with respect to the element 72Y in the optical unit 73B. The graph illustrates only essential points drawn based on measured numerical values at an incident angle of 0°.

The graph illustrates a characteristic of, with a boundary wavelength region 762B as a boundary, reflecting (specular reflection) light on the short wavelength side and transmitting light on the long wavelength side and reveals that, because the boundary wavelength region 762B is present around approximately 470 nm, the element 72Y reflects light in a wavelength region that a person recognizes as a blue color.

Element 72Y in Optical Unit 73G

As the element 72Y in the optical unit 73G, a notch filter (with dielectric multilayer film coating) (model number: NF-25C05-40-532) manufactured by SIGMAKOKI CO., LTD. was used.

Figure 27B:
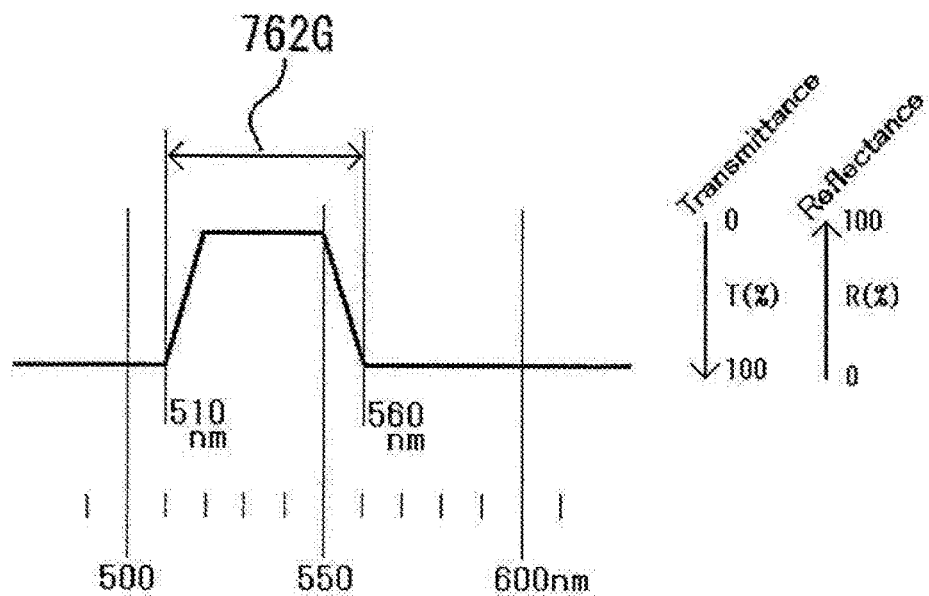
FIG. 27B is a graph illustrative of reflection/transmission characteristics with respect to an element 72Y in an optical unit 73G.

FIG. 27B is a graph illustrative of reflection/transmission characteristics with respect to the element 72Y in the optical unit 73G. The graph illustrates only essential points drawn based on measured numerical values at an incident angle of 0°.

The graph illustrates a characteristic of reflecting (specular reflection) light in a specific wavelength region 762G and transmitting light outside the specific wavelength region and reveals that, because the specific wavelength region 762G is present centered around approximately 535 nm, the element 72Y reflects light in a wavelength region that a person recognizes as a green color.

Element 72Y in Optical Unit 73R

As the element 72Y in the optical unit 73R, a short-pass filter (with dielectric multilayer film coating) (model number: SHPF-25C-650) manufactured by SIGMAKOKI CO., LTD. was used.

Figure 27C:
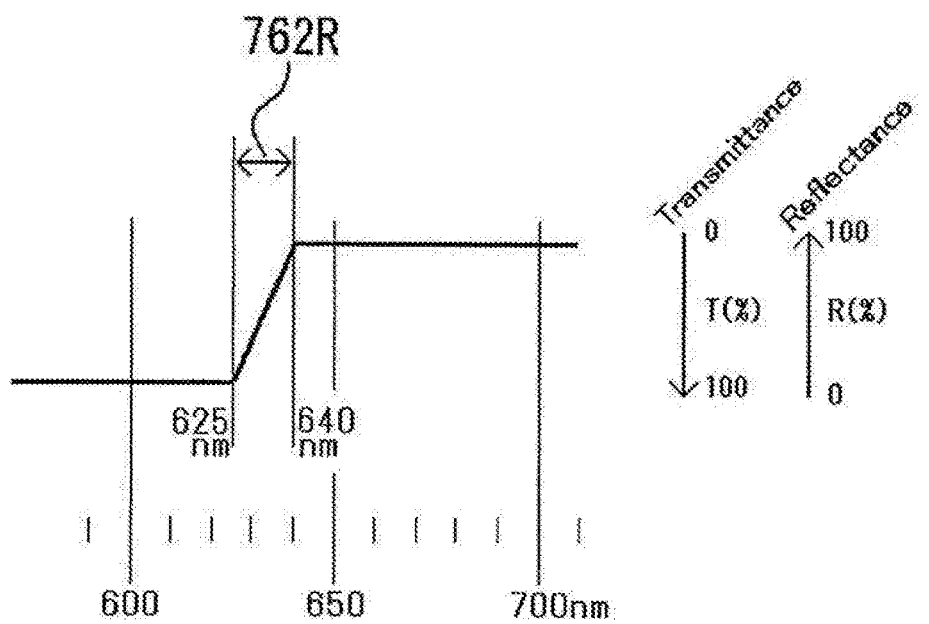
FIG. 27C is a graph illustrative of reflection/transmission characteristics with respect to an element 72Y in an optical unit 73R.

FIG. 27C is a graph illustrative of reflection/transmission characteristics with respect to the element 72Y in the optical unit 73R. The graph illustrates only essential points drawn based on measured numerical values at an incident angle of 0°.

The graph illustrates a characteristic of, with a boundary wavelength region 762R as a boundary, transmitting light on the short wavelength side and reflecting (specular reflection) light on the long wavelength side and reveals that, because the boundary wavelength region 762R is present around approximately 630 nm, the element 72Y reflects light in a wavelength region that a person recognizes as a red color.

Inner Space

Hereinafter, communication among the inner spaces of the cylindrical pipe 716, the optical unit 73B for a blue color, the optical unit 73G for a green color, the optical unit 73R for a red color, and the container 723 will be described.

The inner space of the cylindrical pipe 716 is in communication with the inner space of the container 715 of the optical unit 73B. Immediately below the element 72Y in the optical unit 73B, the inner space of the container 715 of the optical unit 73G exists. Immediately below the element 72Y in the optical unit 73G, the inner space of the container 715 of the optical unit 73R exists. Immediately below the element 72Y in the optical unit 73R, the inner space of the container 723 exists.

Thus far is the description of the structures, arrangements, and features of the constituent components of the experimental apparatus 710.

Description of Optical Path

Figure 28:
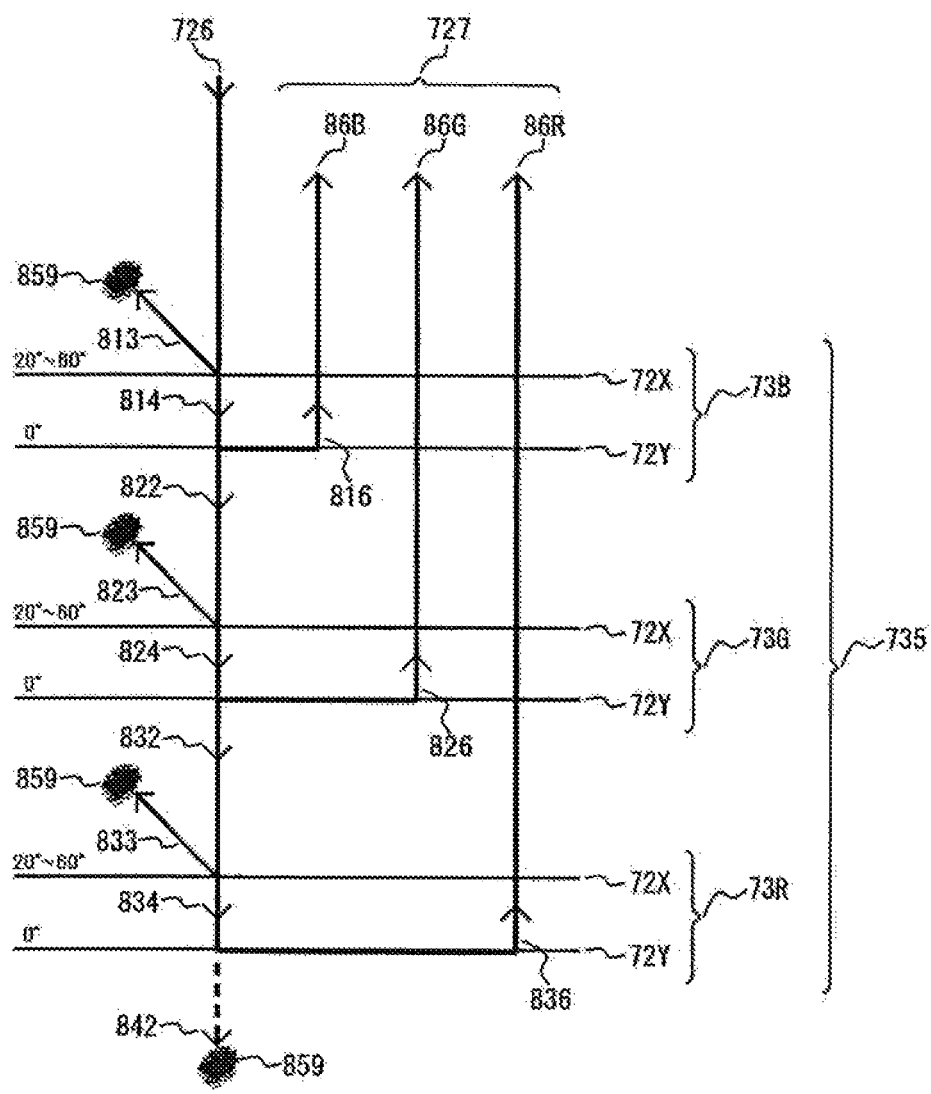
FIG. 28 is a diagram illustrative of a relationship between six elements used in an example 2 of the present invention and optical paths.

Hereinafter, using FIGS. 25 and 28, what optical path and process light emitted by the light source device 724 passes through to reach the chroma meter 728 in the experimental apparatus 710 will be described. FIG. 28 is a diagram illustrative of a relationship between the six elements and optical paths.

Light Source Device 724

Light emitted by the light source device 724 is white light (Ra: 99). The light source device 724 is approximately the same device as the light source device 524 described in the experimental example 1. Therefore, a portion different from the light source device 524, described in the experimental example 1, will be described below.

Element 72X in Optical Unit 73B

Light (white parallel light) 726 that has passed through the cylindrical pipe 716 reaches the element 72X in the optical unit 73B.

The element 72X in the optical unit 73B is a long-pass filter the incident angle θ of which is set at an angle within a range from 20° to 60° and separates the light 726 into light 813 on the short wavelength side that is reflected obliquely upward and light 814 on the long wavelength side that is transmitted vertically downward. The light 813 is absorbed by the black coat 859. Note that the absorption of the light 813 by the black coat 859 can be considered to be equivalent to absorption of light on the short wavelength side by the element 72X.

Element 72Y in Optical Unit 73B

In the optical unit 73B, the light 814, which is transmitted by the element 72X, reaches the element 72Y.

The element 72Y in the optical unit 73B is a long-pass filter the incident angle θ of which is fixed to 0° and separates the light 814 into light 816 on the short wavelength side that is reflected vertically upward and light 822 on the long wavelength side that is transmitted vertically downward.

The light 816 is transmitted by the element 72X, which is placed above the element 72Y, in the direction from down to up. The light is light 86B that is reflected upward by the optical unit 73B and is in a wavelength region that a person recognizes as a blue color. On the other hand, the light 822, which was transmitted instead of being reflected, proceeds toward the element 72X in the optical unit 73G, which is placed below the element 72Y.

Element 72X in Optical Unit 73G

The light 822 reaches the element 72X in the optical unit 73G. The element 72X in the optical unit 73G is a long-pass filter the incident angle θ of which is set at an angle within a range from 20° to 60° and separates the light 822 into light 823 on the short wavelength side that is reflected obliquely upward and light 824 on the long wavelength side that is transmitted vertically downward.

The light 823 is absorbed by the black coat 859. Note that the absorption of the light 823 by the black coat 859 can be considered to be equivalent to absorption of light on the short wavelength side by the element 72X.

Element 72Y in Optical Unit 73G

In the optical unit 73G, the light 824, which is transmitted by the element 72X, reaches the element 72Y. The element 72Y in the optical unit 73G is a notch filter the incident angle θ of which is fixed to 0° and separates the light 824 into light 826 in a specific wavelength region that is reflected vertically upward and light 832 outside the specific wavelength region that is transmitted vertically downward.

The light 826 is transmitted by the element 72X, which is placed above the element 72Y, in the direction from down to up. The light is light 86G that is reflected upward by the optical unit 73G and is in a wavelength region that a person recognizes as a green color. On the other hand, the light 832, which was transmitted instead of being reflected, proceeds toward the element 72X in the optical unit 73R, which is placed below the element 72Y.

Element 72X in Unit 73R for Red Color

The light 832, which has been transmitted by the optical unit 73G, reaches the element 72X in the optical unit 73R. The element 72X in the optical unit 73R is a long-pass filter the incident angle θ of which is set at an angle within a range from 20° to 60° and separates the light 832 into light 833 on the short wavelength side that is reflected obliquely upward and light 834 on the long wavelength side that is transmitted vertically downward.

The light 833 is absorbed by the black coat 859. Note that the absorption of the light 833 by the black coat 859 can be considered to be equivalent to absorption of light on the short wavelength side by the element 72X.

Element 72Y in Unit 73R for Red Color

In the optical unit 73R, the light 834, which is transmitted by the element 72X, reaches the element 72Y. The element 72Y in the optical unit 73R is a short-pass filter the incident angle θ of which is fixed to 0° and separates the light 834 into light 836 on the long wavelength side that is reflected vertically upward and light 842 on the short wavelength side that is transmitted vertically downward.

The light 836 is transmitted by the element 72X, which is placed above the element 72Y, in the direction from down to up. The light is light 86R that is reflected upward by the optical unit 73R and is in a wavelength region that a person recognizes as a red color.

On the other hand, the light 842, which was transmitted instead of being reflected, proceeds toward the container 723, which is placed below the element 72Y, and is absorbed by the black coat 859 applied to the inside of the container 723. However, the reflection/transmission characteristics of the element 72Y in the optical unit 73R were determined in such a way that no light is allowed to reach the container 723. Thus, no light is supposed to reach the container 723.

Reflected Light

The light 86R reflected upward by the optical unit 73R, advancing upward in a vicinity of the central, reference line 711, passes through the elements 72Y and 72X in the optical unit 73G and the elements 72Y and 72X in the optical unit 73B and proceeds to the cylindrical pipe 716.

The light 86G reflected upward by the optical unit 73G, advancing upward in a vicinity of the central line 711, passes through the elements 72Y and 72X in the optical unit 73B and proceeds to the cylindrical pipe 716.

The light 86B reflected upward by the optical unit 73B, advancing upward in a vicinity of the central line 711, proceeds to the cylindrical pipe 716.

Composite Light

The above-described light that is reflected upward by the respective optical units, that is, the light 86B, 86G, and 86R, are combined into the light 727. That is, light reflected upward by the optical unit group 735 is the composite light 727.

Chroma Meter 727

The light 727 proceeds upward, passes through the cylindrical pipe 716, passes by an edge of the mirror 725, and reaches the light receiving lens 729. The chroma meter 728, with respect to the light, performs measurement and calculation and displays luminance (Lv) and chromaticity (u', v'). The above is the optical path and process originating from the light source device 724 and reaching the chroma meter 728.

Wavelength Region Filtering

Hereinafter, using FIG. 29, wavelength region filtering will be described.

Figure 29:
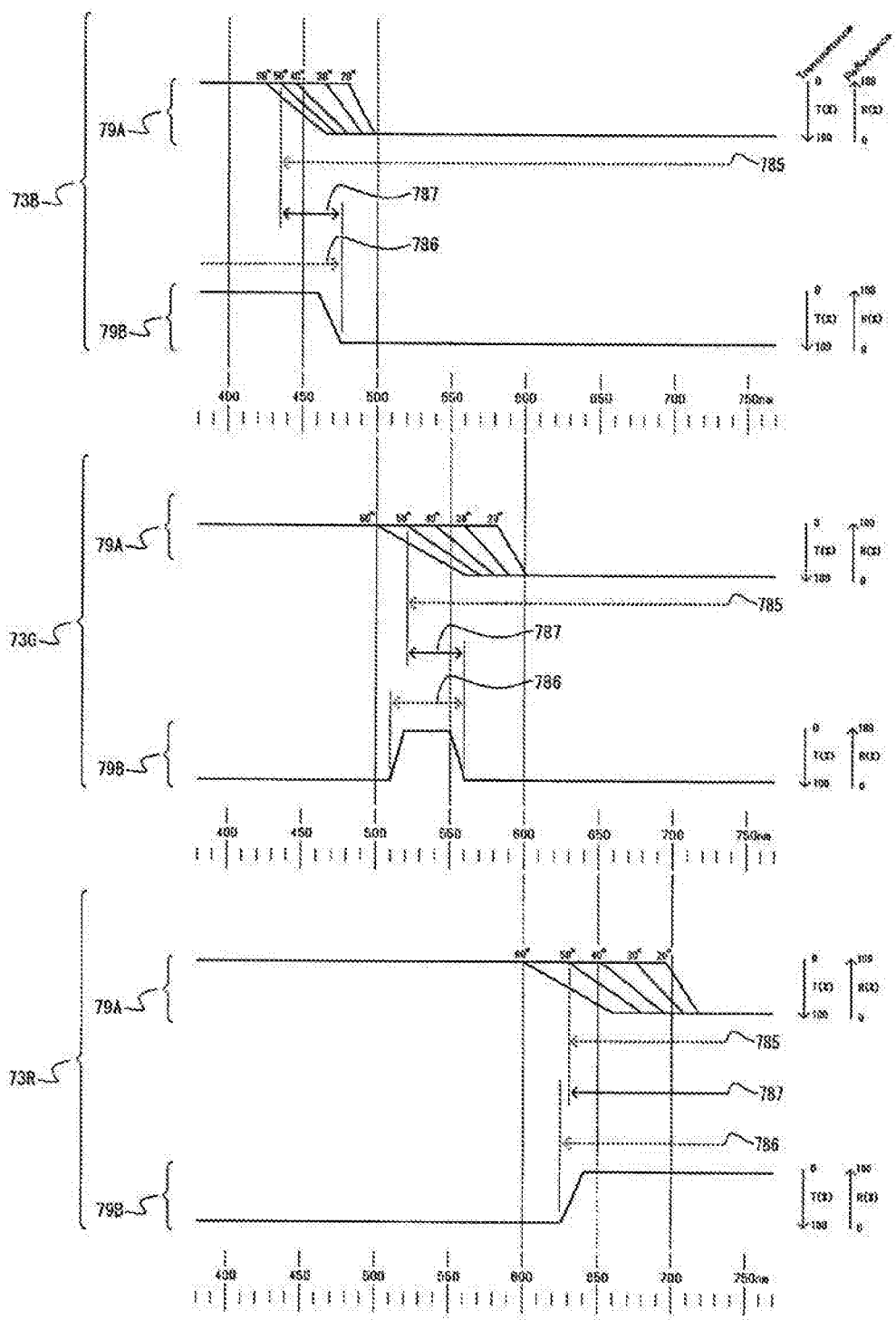
FIG. 29 is a diagram illustrative of a relationship between the six elements used in the example 2 of the present invention and wavelength regions.

FIG. 29 is a diagram in which how wavelength region filtering that is performed by the three sets of two elements (dielectric multilayer film filters), in total six elements, used in the experimental apparatus 710 works is drawn on the wavelength scale.

Filtering by Optical Unit 73B

The following is a description regarding the optical unit 73B.

A chart 79A illustrates, with respect to the element 72X in the optical unit 73B, variation in reflection/transmission characteristics when the incident angle θ is varied from 20° to 60° at 10° intervals. A chart 79B illustrates, with respect to the element 72Y in the optical unit 73B, reflection/transmission characteristics at an incident angle θ of 0°.

A wavelength region 785 indicates a wavelength region of light that, when the incident angle θ to the element 72X is set at 50°, the element 72X transmits vertically downward. A wavelength region 786 indicates a wavelength region of light that the element 72Y reflects vertically upward. A wavelength region 787 indicates a wavelength region of light that the optical unit 73B reflects upward as a result of the wavelength region filtering performed by the elements 72X and 72Y. The wavelength region 787 is a wavelength region of the light 86B, which is in a wavelength region that a person recognizes as a blue color.

Filtering by Optical Unit 73G

The following is a description regarding the optical unit 73G.

A chart 79A illustrates, with respect to the element 72X in the optical unit 73G, variation in reflection/transmission characteristics when the incident angle θ is varied from 20° to 60° at 10° intervals. A chart 79B illustrates, with respect to the element 72Y in the optical unit 73G, reflection/transmission characteristics at an incident angle θ of 0°.

A wavelength region 785 indicates a wavelength region of light that, when the incident angle θ to the element 72X is set at 50°, the element 72X transmits vertically downward. A wavelength region 786 indicates a wavelength region of light that the element 72Y reflects vertically upward. A wavelength region 787 indicates a wavelength region of light that the optical unit 73G reflects upward as a result of the wavelength region filtering performed by the elements 72X and 72Y. The wavelength region 787 is a wavelength region of the light 86G, which is in a wavelength region that a person recognizes as a green color.

Filtering by Optical Unit 73R

The following is a description regarding the optical unit 73R.

A chart 79A illustrates, with respect to the element 72X in the optical unit 73R, variation in reflection/transmission characteristics when the incident angle θ is varied from 20° to 60° at 10° intervals. A chart 79B illustrates, with respect to the element 72Y in the optical unit 73R, reflection/transmission characteristics at an incident angle θ of 0°.

A wavelength region 785 indicates a wavelength region of light that, when the incident angle θ to the element 72X is set at 50°, the element 72X transmits vertically downward. A wavelength region 786 indicates a wavelength region of light that the element 72Y reflects vertically upward. A wavelength region 787 indicates a wavelength region of light that the optical unit 73R reflects upward as a result of the wavelength region filtering performed by the elements 72X and 72Y. The wavelength region 787 is a wavelength region of the light 86R, which is in a wavelength region that a person recognizes as a red color.

Luminance Control of Principal Primary Colors

While, in each optical unit, a region where the wavelength regions 785 and 786 overlap each other is the wavelength region 787, width of the wavelength region 787 can be widened or narrowed by varying the incident angle θ to the element 72X. These operations are equivalent to increasing or decreasing the amount of the light that each optical unit reflects upward. That is, these operations are equivalent to controlling luminance.

As described above, the optical unit 73B for a blue color is an optical component that is capable of, among light that is incident from above, reflecting the light 86B upward and further controlling intensity (luminance) of the light. The optical unit 73G for a green color is an optical component that is capable of, among light that is incident from above, reflecting the light 86G upward and further controlling intensity (luminance) of the light. The optical unit 73R for a red color is an optical component that is capable of, among light that is incident from above, reflecting the light 86R upward and further controlling intensity (luminance) of the light.

Composite Color

Configuring the optical unit group 735 by stacking the respective optical units causes the light 86B, 86G, and 86R to be combined into the light 727, which has a composite color. That is, in the respective optical units, controlling intensity (luminance) of light in specific wavelength regions (blue, green, and red) reflected upward enables not only the principal primary colors (blue, green, and red) but also composite colors thereof (cyan, yellow, magenta, and white) to be developed.

Experimental Process

Hereinafter, using FIG. 25, a process of the experiment will be described. In the experimental apparatus 710, first, the light 726, which is white parallel light, is radiated from the light source device 724 to the inside of the optical unit group 735 via the mirror 725 and the cylindrical pipe 716.

Then, from the inside of the optical unit group 735, the light 727, which has a composite color, is reflected upward and returns to the chroma meter 728. The reflected light 727 is measured using the chroma meter 728, and luminance (Lv) and chromaticity (u', v') are displayed.

At this time, in accordance with a procedure to be described later, the observer, turning the respective angle setting knobs 719, which are disposed to the optical unit 73B for a blue color, the optical unit 73G for a green color, and the optical unit 73R for a red color, and reading luminance (Lv) and chromaticity (u', v') displayed on the chroma meter 728, sets the incident angles θ using the angle setting knobs 719 of the respective optical units in such a way that the light 727 comes to have a measurement target color. When the light 727 has the measurement target color, the observer visually observes the color glowing in the finder of the chroma meter 728 and subsequently records chromaticity values (u', v') that the chroma meter 728 indicates.

The above-described measurement and observation were performed with respect to white, cyan, blue, magenta, red, yellow, and green colors, which are measurement target colors.

Procedures for developing white, cyan, blue, magenta, red, yellow, and green colors, which are measurement target colors, will be described below. When the measurement target colors were developed, the observer looked through the finder of the chroma meter 728 and observed colors glowing therein, and a result of the observation will also be described.

White

The following is a procedure for developing a white color.

The observer, watching a display on the chroma meter 728, sets the incident angles θ using the angle setting knobs 719 of the respective optical units in such a way that the luminance (Lv) and the chromaticity (u', v') come close to a luminance value (Lv=770) and chromaticity values (u'=0.20, v'=0.47), respectively, as close as possible. This operation causes a white color to be developed. When the procedure was conducted, a glow that a person could recognize as a white color was able to be seen in the finder of the chroma meter 728 in the visual observation.

Hereinafter, each of the measurement target colors other than the white color is generated by, using the white color as a base, removing an unnecessary color(s) from the white color.

Cyan

The following is a procedure for developing a cyan color.

First, a white color is developed in accordance with the above-described procedure for developing a white color. Subsequently, by setting the incident angle θ of the optical unit 73R at an angle between 20° and 30° using the angle setting knob 719 thereof, a red color is caused to be absorbed. This operation causes a cyan color to be developed. When the procedure was conducted, a glow that a person can recognize as a cyan color was able to be seen in the finder of the chroma meter 728 in the visual observation.

Blue

The following is a procedure for developing a blue color.

First, a cyan color is developed in accordance with the above-described procedure for developing a cyan color. Subsequently, by setting the incident angle θ of the optical unit 73G at an angle between 20° and 30° using the angle setting knob 719 thereof, a green color is caused to be absorbed. This operation causes a blue color to be developed. When the procedure was conducted, a glow that a person can recognize as a blue color was able to be seen in the finder of the chroma meter 728 in the visual observation.

Magenta

The following is a procedure for developing a magenta color.

First, a white color is developed in accordance with the above-described procedure for developing a white color. Subsequently, by setting the incident angle θ of the optical unit 73G at an angle between 20° and 30° using the angle setting knob 719 thereof, a green color is caused to be absorbed. This operation causes a magenta color to be developed. When the procedure was conducted, a glow that a person can recognize as a magenta color was able to be seen in the finder of the chroma meter 728 in the visual observation.

Red

The following is a procedure for developing a red color.

First, a magenta color is developed in accordance with the above-described procedure for developing a magenta color. Subsequently, by setting the incident angle θ of the optical unit 73B at an angle between 20° and 30° using the angle setting knob 719 thereof, a blue color is caused to be absorbed. This operation causes a red color to be developed. When the procedure was conducted, a glow that a person can recognize as a red color was able to be seen in the finder of the chroma meter 728 in the visual observation.

Yellow

The following is a procedure for developing a yellow color.

First, a white color is developed in accordance with the above-described procedure for developing a white color. Subsequently, by setting the incident angle θ of the optical unit 73B at an angle between 20° and 30° using the angle setting knob 719 thereof, a blue color is caused to be absorbed. This operation causes a yellow color to be developed. When the procedure was conducted, a glow that a person can recognize as a yellow color was able to be seen in the finder of the chroma meter 728 in the visual observation.

Green

The following is a procedure for developing a green color.

First, a yellow color is developed in accordance with the above-described procedure for developing a yellow color. Subsequently, by setting the incident angle θ of the optical unit at an angle between 20° and 30° using the angle setting knob 719 thereof, a red color is caused to be absorbed. This operation causes a green color to be developed. When the procedure was conducted, a glow that a person can recognize as a green color was able to be seen in the finder of the chroma meter 728 in the visual observation.

Thus far is the description of the process and procedure of the experiment and results of the visual observation.

Measurement Result

Hereinafter, a chromaticity table obtained from the measurement and a chromaticity diagram drawn based on the table will be described. Table 2 is a table obtained by measuring chromaticity (u', v') with respect to the light 727, which is reflected by the optical unit group 735 set to develop each of white, cyan, blue, magenta, red, yellow, and green colors, which are measurement target colors, and tabulating results from the measurement into a numerical table.

TABLE 2

|         | u'    | v'    |
|---------|-------|-------|
| White   | 0.200 | 0.473 |
| Cyan    | 0.166 | 0.457 |
| Blue    | 0.222 | 0.290 |
| Magenta | 0.279 | 0.321 |
| Red     | 0.383 | 0.534 |
| Yellow  | 0.209 | 0.565 |
| Green   | 0.170 | 0.571 |

Figure 30:
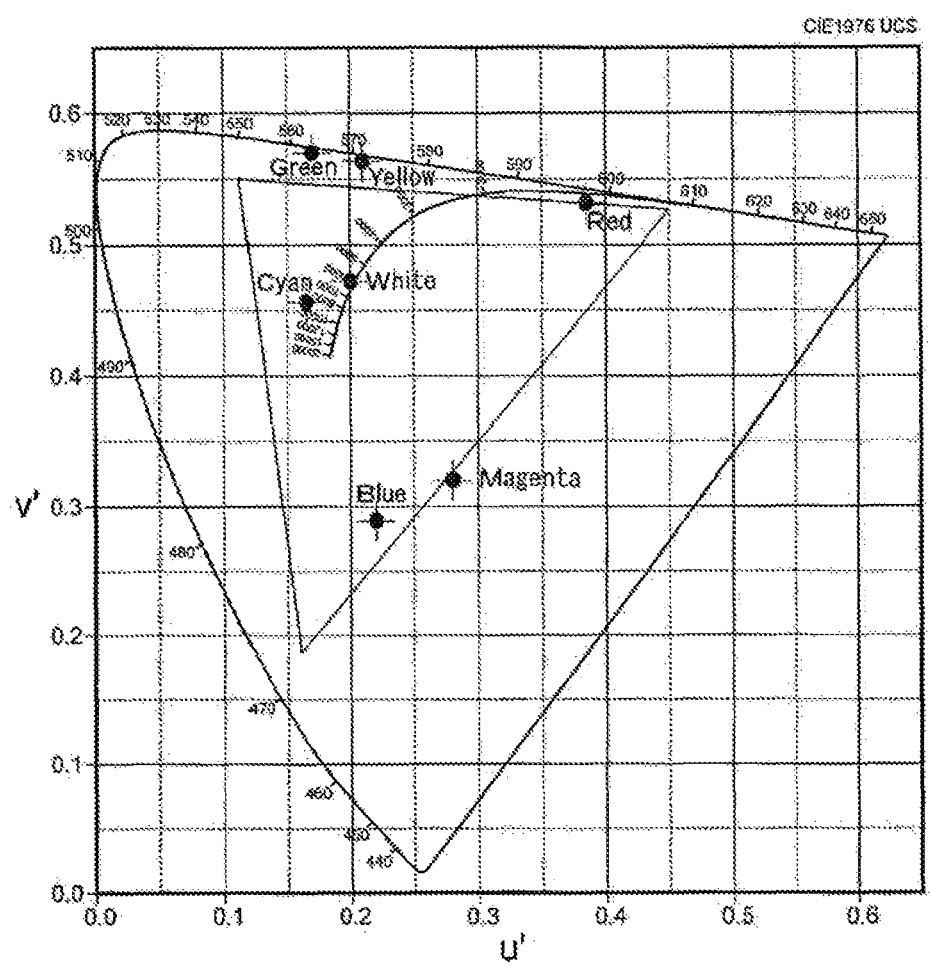
FIG. 30 is a chromaticity diagram illustrative of chromaticity of seven colors developed in the example 2 of the present invention.

FIG. 30 is a chromaticity diagram drawn based on the chromaticity values (u', v') in Table 2. With respect to measured white, cyan, blue, magenta, red, yellow, and green colors, dot marks are drawn at coordinates that the chromaticity values (u', v') of the respective colors indicate. In addition, a triangle indicating a color gamut of a cold cathode fluorescent lamp backlit liquid crystal display is drawn as a reference example.

<Chromaticity Observation>

The following is an examination on the respective dot marks drawn on the chromaticity diagram in FIG. 30.

A dot mark (• White) indicating the chromaticity of a white color was located in a vicinity of a point of 6000 K on the blackbody locus. That is, light having this chromaticity is light that a person can recognize as having a white color. Note that a white color is a composite color of blue, green, and red colors. Hereinafter, "• White" is also simply referred to as "• W".

A dot mark (• Blue) indicating the chromaticity of a blue color was located, with "• W" as a center, in a direction toward an area where a lot of blue color components are contained in the chromaticity diagram. That is, light having this chromaticity is light that a person can recognize as having a blue color. Hereinafter, "• Blue" is also simply referred to as "• B".

A dot mark (• Green) indicating the chromaticity of a green color was located, with "• W" as a center, in a direction toward an area where a lot of green color components are contained in the chromaticity diagram. That is, light having this chromaticity is light that a person can recognize as having a green color. Hereinafter, "• Green" is also simply referred to as "• G".

A dot mark (• Red) indicating the chromaticity of a red color was located, with "• W" as a center, in a direction toward an area where a lot of red color components are contained in the chromaticity diagram. That is, light having this chromaticity is light that a person can recognize as having a red color. Hereinafter, "• Red" is also simply referred to as "• R".

A dot mark (• Yellow) indicating the chromaticity of a yellow color was located, with "• W" as a center, in the opposite direction to the direction toward "• B" and between "• G" and "• R". That is, light having this chromaticity is light that a person can recognize as having a yellow color. Note that a yellow color is a complementary color of a blue color and a composite color of green and red colors.

A dot mark (• Cyan) indicating the chromaticity of a cyan color was located, with "• W" as a center, in the opposite direction to the direction toward "• R" and between "• B" and "• G". That is, light having this chromaticity is light that a person can recognize as having a cyan color. Note that a cyan color is a complementary color of a red color and a composite color of blue and green colors.

A dot mark (• Magenta) indicating the chromaticity of a magenta color was located, with "• W" as a center, in the opposite direction to the direction toward the "• G" and between the "• B" and "• R". That is, light having this chromaticity is light that a person can recognize as having a magenta color. Note that a magenta color is a complementary color of a green color and a composite color of blue and red colors.

Evaluation of Experiment

As described above, from the visual observation and the measured chromaticity in the experiment described so far, it could be confirmed that, when the experimental apparatus 710 was set to develop a white color, light that a person could recognize as having a white color was generated. It could also be confirmed that, when the experimental apparatus 710 was set to develop a cyan color, light that a person could recognize as having a cyan color was generated. It could also be confirmed that, when the experimental apparatus 710 was set to develop a blue color, light that a person could recognize as having a blue color was generated. It could also be confirmed that, when the experimental apparatus 710 was set to develop a magenta color, light that a person could recognize as having a magenta color was generated. It could also be confirmed that, when the experimental apparatus 710 was set to develop a red color, light that a person could recognize as having a red color was generated. It could also be confirmed that, when the experi-mental apparatus 710 was set to develop a yellow color, light that a person could recognize as having a yellow color was generated. It could also be confirmed that, when the experimental apparatus 710 was set to develop a green color, light that a person could recognize as having a green color was generated.

Evaluation of Experimental Apparatus 710

As described above, it could be confirmed that, in the experimental apparatus 710, (1) the optical unit 73B for a blue color reflected upward the light 86B, which was in a wavelength region that a person can recognize as a blue color, the optical unit 73G for a green color reflected upward the light 86G, which was in a wavelength region that a person can recognize as a green color, and the optical unit 73R for a red color reflected upward the light 86R, which was in a wavelength region that a person can recognize as a red color. It could also be confirmed that (2) stacking vertically the optical units 73B, 73G, and 73R caused the light 86B, which was in a wavelength region that a person can recognize as a blue color, the light 86G, which was in a wavelength region that a person can recognize as a green color, and the light 86R, which was in a wavelength region that a person can recognize as a red color, to be combined and the optical unit group 735 reflected upward the light 727, which had a composite color thereof.

As described above, from the result of the verification experiment conducted using the experimental apparatus 710, it was clearly verified that the image display device element configured by combining three sets of two dielectric multi-layer film filters, in total six dielectric multilayer film filters, was capable of developing not only (1) principal primary colors (blue, green, and red) but also (2) all composite colors (for example, cyan, yellow, magenta, and white) of the primary colors.

Hereinafter, examples corresponding to the above-described seventh to ninth embodiments will be described.

(Experimental Example 3) Experiment on Transmission-Type Color Development

Outline of Experimental Example 3

An "experiment on transmission-type color development" will be described below. In this experiment, using a transmission-type color development experimental apparatus 410, which is an embodiment of the present invention that is configured by combining four dielectric multilayer film filters, it will be verified that the present invention is one of the principles enabling light having any color to be emitted.

The experiment is made up of the following two verification experiments.

1. (Experimental Example 3-A) "Transmission-Type Color Development: Control Experiment on Development of Seven Colors"

In the experiment, it will be verified that varying combinations of light having three primary colors, which can be emitted in accordance with the principle, enables hue to be varied. In the experiment, it will be confirmed that three primary colors (blue, green, and red) and composite colors (cyan, yellow, magenta, and white) thereof can be developed.

2. (Experimental Example 3-B) "Transmission-Type Color Development: Control Experiment on Monochromatic Luminance"

In the experiment, it will be verified that brightness/darkness of light having each of the three primary colors, which can be emitted in accordance with the principle, can be varied gradually. In the experiment, it will be confirmed that, with respect to light in a specific wavelength region (a red color) that constitutes the three primary colors, intensity (luminance) of the light can be controlled gradually between a maximum value and a minimum value thereof.

Configuration of Experimental Apparatus 410

Arrangement

Hereinafter, an arrangement of principal constituent components of the transmission-type color development experimental apparatus 410, which was used in the experiments, will be described.

Figure 31:
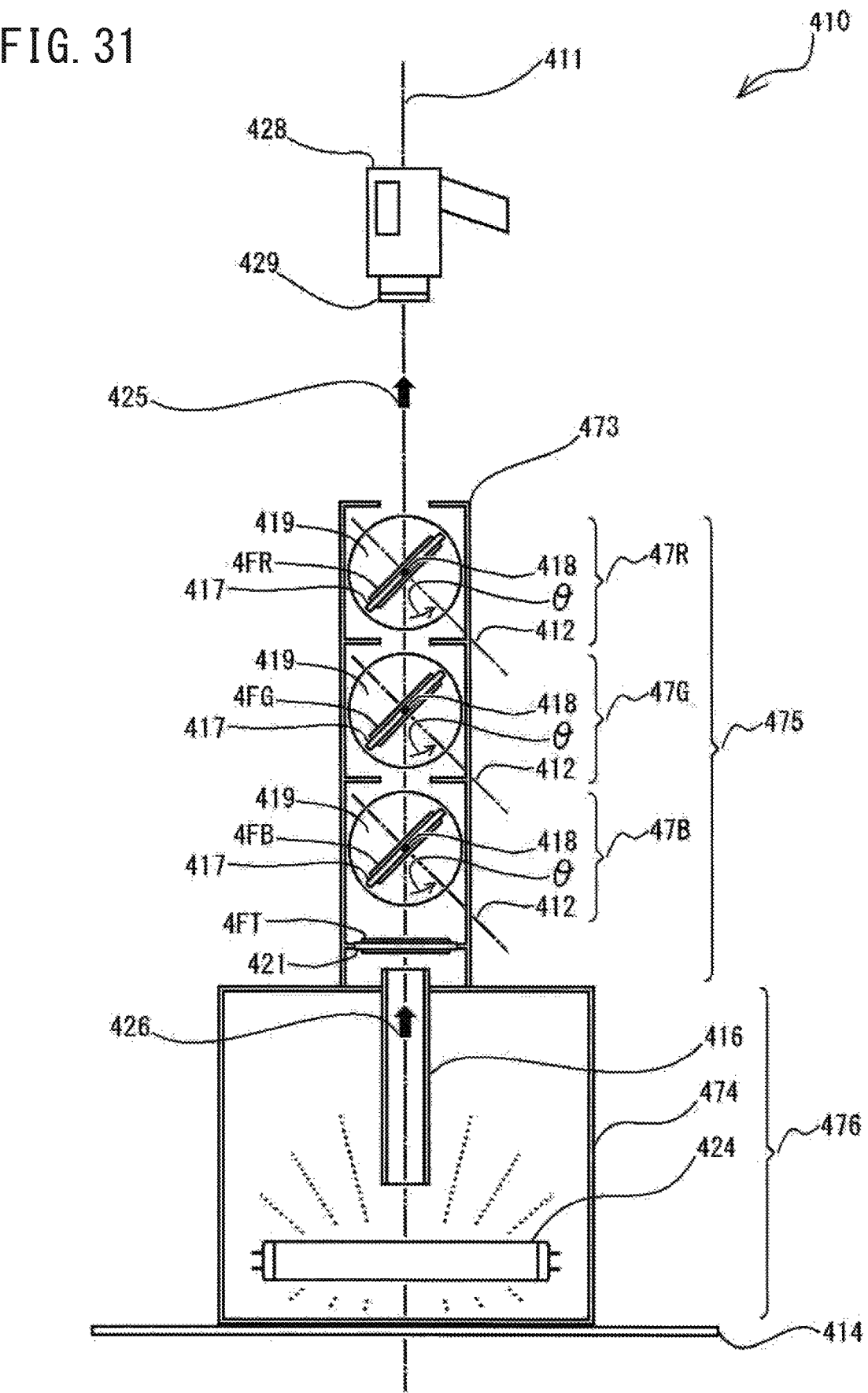
FIG. 31 is a schematic view illustrative of a configuration of a transmission-type color development experimental apparatus used in an experimental example 3 of the present invention.
Figure 32:
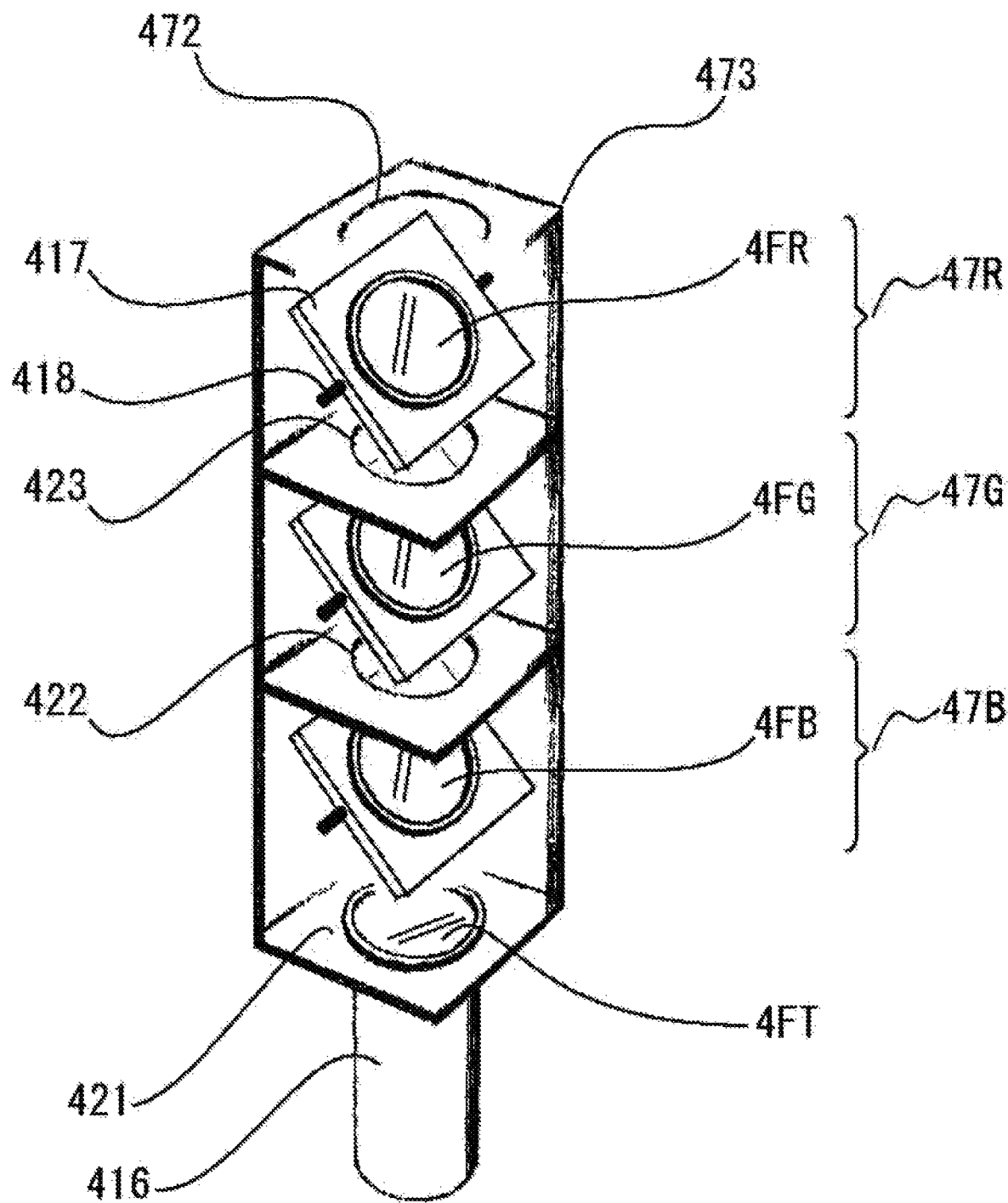
FIG. 32 is a sketch of a color development unit and a cylindrical pipe used in an example 3 of the present invention.

FIG. 31 is a schematic view illustrative of a configuration of the experimental apparatus 410. FIG. 32 is a sketch in which a portion of the configuration of the experimental apparatus 410 is extracted to facilitate understanding of the structure thereof. Note that, in FIGS. 31 and 32, the positional relationship among the respective constituent components constituting the experimental apparatus 410 is opposite to that among the respective constituent components illustrated in FIGS. 15A, 15B, 16A, 16B, 17A, and 17B.

The experimental apparatus 410 was used placed in a darkroom. The experimental apparatus 410 includes a support platform 414, which has the upper surface thereof kept horizontal, as a base portion. On the upper surface of the support platform 414, a light source unit 476 is placed. On the light source unit 476, a color development unit 475 is placed. Above the color development unit 475, a chroma meter 428 is placed.

Reference Line 411

The reference line 411 is an imaginary line originating from the center on the upper surface of the support platform 414 and extending in the vertical direction. The reference line 411 serves as a reference for optical paths in the experiment.

Light Source Unit 476

The light source unit 476 is a component that provides white parallel light 426 required in the experiment. The light source unit 476 is configured including a container 474, a fluorescent tube 424, and a cylindrical pipe 416.

Hereinafter, the respective constituent components of the light source unit 476 will be described.

Container 474

The container 474 is a component that prevents light unnecessary for the experiment from escaping out of the container 474 itself. The container 474 houses the fluorescent tube 424 and the cylindrical pipe 416. To the inner surface of the container 474, a black coat for absorbing unnecessary light is applied.

Fluorescent Tube 424

The fluorescent tube 424 emits high color rendering white light. The light source device 424 is a high color rendering fluorescent tube (type: FL20S•N-EDL•NU) manufactured by Mitsubishi Electric Lighting Corporation. The specifications of the fluorescent tube stipulate that the color temperature is 5000 K and the average color rendering index (Ra) is 99. The fluorescent tube 424 is placed in such a way that the central axis of the tube is horizontal and crosses the reference line 411 at the center of the tube.

Cylindrical Pipe 416

The cylindrical pipe 416 is a component that extracts, among white light emitted by the fluorescent tube 424, only light parallel with the reference line 411. The cylindrical pipe 416 is placed in such a way that the central axis of the pipe is coincident with the reference line 411. To the inner surface of the cylindrical pipe 416, a black coat for absorbing light not incident in parallel with the reference line 411 is applied.

The cylindrical pipe 416 has a portion thereof projecting out of a central portion of the upper surface of the container 474. The fluorescent tube 424 emits the white parallel light 426 upward via the cylindrical pipe 416.

Color Development Unit 475

The color development unit 475 is a part that embodies the principle of the present invention. The color development unit 475 is a component that, when the white parallel light 426 is supplied, emits light generated in accordance with the principle, that is, output light 425. The color development unit 475 is configured in such a manner that the inside of a container 473, which serves as the peripheral wall, is partitioned into three chambers and a set of mechanism is housed in each chamber.

Hereinafter, the respective constituent components of the color development unit 475 will be described.

Container 473

The container 473 is the peripheral wall of the color development unit 475. The inside of the container 473 is partitioned into three chambers, a chamber 47B at the bottom stage, a chamber 47G at the middle stage, and a chamber 47R at the top stage. To the inner surface of the container 473, a black coat for absorbing discarded light is applied.

Chambers 47B, 47G, and 47R

In the chamber 47B, a set of mechanism influencing light that can be recognized as having a blue color is housed. In the chamber 47G, a set of mechanism influencing light that can be recognized as having a green color is housed. In the chamber 47R, a set of mechanism influencing light that can be recognized as having a red color is housed. In each of the three chambers, movable shafts 418, an angle setting knob 419, and a folder 417 are disposed.

Hereinafter, roles, arrangements, and features of the constituent components disposed to the three chambers in the same manner will be described.

Folder 417

The folders 417 are components with which elements 4FB, 4FG, and 4FR, each of which is an element shaped into a thick coin, are mounted. The folders 417 are placed at the centers of the respective chambers. The movable shafts 418 are disposed to each folder 417, and the folder 417 can be rotated about the movable shafts 418.

The elements mounted on the folders 417 have different characteristics for each chamber. On the folder 417 in the chamber 47B, the element 4FB is mounted. On the folder 417 in the chamber 47G, the element 4FG is mounted. On the folder 417 in the chamber 47R, the element 4FR is mounted.

Movable Shaft 418

The movable shafts 418 are components for rotating each folder 417. Each movable shaft 418 has the axis, while kept horizontal, crossing the reference line 411 at right angles. One end and the other end of each movable shaft 418 are joined to the folder 417 and a bearing (not illustrated) disposed to the inside of the chamber, respectively. That is, the elements 4FB, 4FG, and 4FR, which are elements mounted on the folders 417, also rotate about the movable shafts 418 in conjunction with the folders 417.

Incident Angle θ

Incident angles θ to the elements 4FB, 4FG, and 4FR are determinants of respective reflection/transmission characteristics of the elements 4FB, 4FG, and 4FR. Central lines 412 illustrated in FIG. 31 are imaginary lines that cross the movable shafts 418 and are extended perpendicularly with respect to the centers of the respective upper surfaces of the elements 4FB, 4FG, and 4FR.

In this configuration, the incident angles θ are angles by which the central lines 412 are turned with respect to the reference line 411. An incident angle θ at which the reference line 411 coincides with the central line 412 is 0°. In FIG. 31, the folders 417 and the elements 4FB, 4FG, and 4FR the incident angles θ of which are set at 45° are illustrated in such a manner as to be viewed from a side face.

Angle Setting Knob 419

The angle setting knobs 419 are components that facilitate an observer to set the incident angles θ. The angle setting knobs 419 are fixed to the respective movable shafts 418 and rotate in conjunction with the rotations of the elements 4FB, 4FG, and 4FR. The angle setting knobs 419 may be provided with protractors to accurately set the incident angles θ.

Circular Windows 422, 423, and 472

In FIG. 32, three circular windows 422, 423, and 472 are illustrated. The circular windows were disposed to let light pass through. To the ceiling portion of the container 473, the circular window 472 is disposed. To the partition wall between the chambers 47B and 47G, the circular window 422 is disposed. To the partition wall between the chambers 47G and 47R, the circular window 423 is disposed.

Folder 421

The folder 421 is a component with which the element 4FT, which is shaped into a thick coin, is mounted. The folder 421 is disposed in one body with the bottom face portion of the container 473. The folder 421 is fixed in such a way that the reference line 411 passes through the center of the circular shape of the folder 421 vertically. That is, the reference line 411 also passes through the center of the upper surface of the element 4FT mounted on the folder 421 vertically, and an incident angle θ to the element 4FT is constantly set at 0°. In FIG. 31, the folder 421 and the element 4FT are illustrated in such a manner as to be viewed from a side face.

Chroma Meter 428

The chroma meter 428 is a component that measures light emitted from the color development unit 475, that is, the output light 425.

The chroma meter 428 is equipped with a light receiving lens 429. The chroma meter 428 is placed in such a way that the reference line 411 passes through the center of the light receiving lens 429 of the chroma meter 428. The light receiving lens 429 is directed to the interior of the color development unit 475. The observer determines a measurement point and a measurement range, using a reticle circle imaged in a finder with which the chroma meter 428 is equipped. Luminance (Lv) and chromaticity (u', v') are measured in accordance with the measurement point and the measurement range, and a result of the measurement is displayed.

As the chroma meter 428, a chroma meter (type: Chroma Meter CS-160) manufactured by KONICA MINOLTA, INC. was used.

Optical Characteristics of Elements

Hereinafter, characteristics of the elements 4FB, 4FG, 4FR, and 4FT, which are four elements used in the experiments, will be described. The characteristics are a core part relating to color development principle according to the present invention.

Characteristics: Element 4FB

The element 4FB is used to control luminance of light in a wavelength region that can be recognized as a blue color. As the element 4FB, a long-pass filter (with dielectric multilayer film coating) (model number: LOPF-25C-448) manufactured by SIGMAKOKI CO., LTD. was used.

In general, a long-pass filter (with dielectric multilayer film coating) has a characteristic of, with a boundary wavelength region as a boundary, reflecting (specular reflection) light on the short wavelength side and transmitting light on the long wavelength side. In addition, in general, a long-pass filter (with dielectric multilayer film coating) also has a characteristic that, as an incident angle thereto increases, the boundary wavelength region is shifted further to the short wavelength side.

Figure 33A:
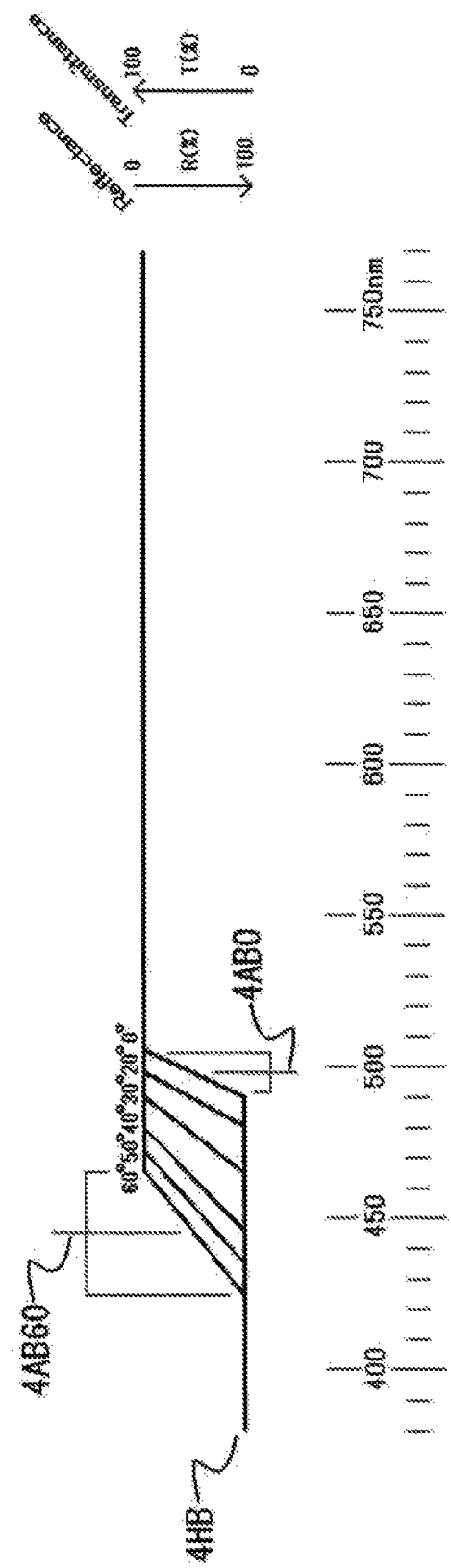
FIG. 33A is a diagram illustrative of characteristics of an element 4FB itself used in the example 3 of the present invention.

In FIG. 33A, a graph 4HB indicating variation in reflection/transmission characteristics of the element 4FB in association with variation in an incident angle θ to the element 4FB is illustrated. The graph illustrates only essential points drawn based on measured numerical values.

The graph illustrates that a center 4AB0 of a boundary wavelength region is located around approximately 498 nm when the incident angle θ is 0° and, when the incident angle θ is varied to 60°, a center 4AB60 of the boundary wavelength region is shifted to around approximately 445 nm on the short wavelength side.

In FIG. 33B, how light in three wavelength regions, namely light 48B in a wavelength region centered around 480 nm that can be recognized as a blue color, light 48V in a wavelength region present slightly apart from the light 48B on the short wavelength side, and light 48CGYRI in a wavelength region present slightly apart from the light 48B on the long wavelength side, are influenced by variation in the incident angle θ set to the element 4FB when the light in the three wavelength regions is radiated from below the element 4FB is illustrated in such a manner that optical paths are drawn on the graph 4HB.

Regarding the light 48B, when the incident angle θ to the element 4FB is 0°, reflectance (R %) for the light 48B is high and the light 48B is reflected downward. On the other hand, when the incident angle θ is 60°, transmittance (T %) for the light 48B is high and the light 48B is transmitted upward. Regarding the light 48V, for any incident angle θ to the element 4FB in a range from 0° to 60°, reflectance (R %) for the light 48V is high and the light 48V is always reflected downward. Regarding the light 48CGYRI, for any incident angle θ to the element 4FB in a range from 0° to 60°, transmittance (T %) for the light 48CGYRI is high and the light 48CGYRI is always transmitted upward.

That is, it is revealed that variation in the incident angle θ to the element 4FB significantly (dynamically) influences only the light 48B in the wavelength region centered around 480 nm that can be recognized as a blue color.

Characteristics: Element 4FG

The element 4FG is used to control luminance of light in a wavelength region that can be recognized as a green color. As the element 4FG, a notch filter (with dielectric multilayer film coating) (model number: NF-25C05-40-532) manufactured by SIGMAKOKI CO., LTD. was used.

In general, a notch filter (with dielectric multilayer film coating) has a characteristic of having a high reflectance wavelength region in which light within a limited wavelength region is reflected (specular reflection) and transmitting light in the other wavelength region. In addition, in general, a notch filter (with dielectric multilayer film coating) also has a characteristic that, as an incident angle thereto increases, the high reflectance wavelength region is shifted further to the short wavelength side.

Figure 34A:
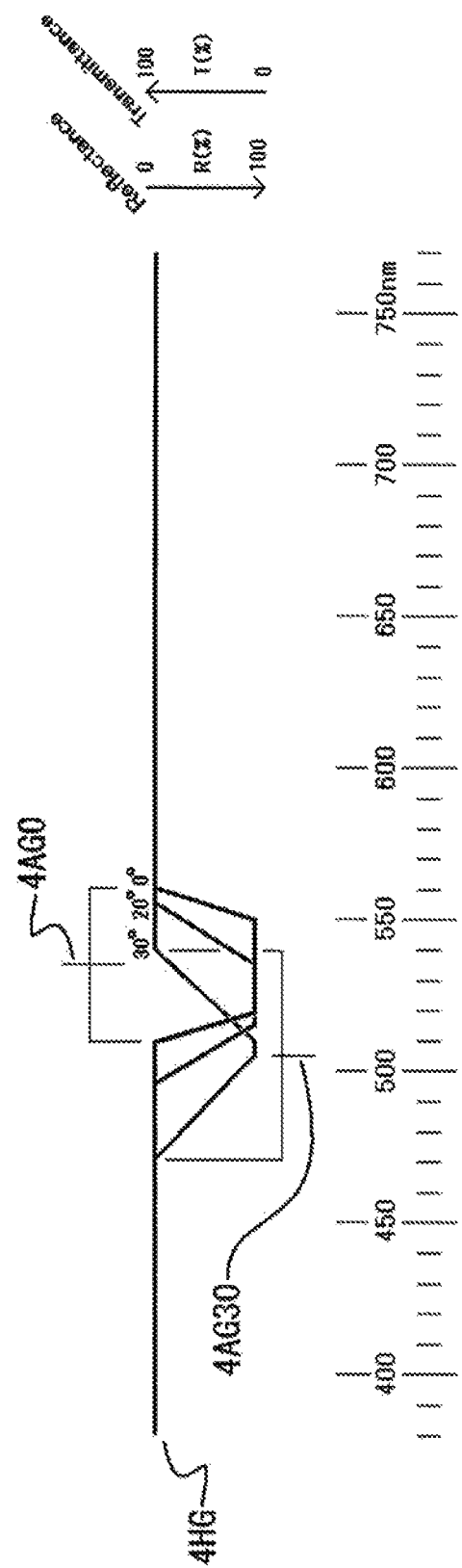
FIG. 34A is a diagram illustrative of characteristics of an element 4FG itself used in the example 3 of the present invention.

In FIG. 34A, a graph 4HG indicating variation in reflection/transmission characteristics of the element 4FG in association with variation in an incident angle θ to the element 4FG is illustrated. The graph illustrates only essential points drawn based on measured numerical values. The graph illustrates that a center 4AG0 of a high reflectance wavelength region is located around approximately 535 nm when the incident angle θ is 0° and, when the incident angle θ is varied to 30°, a center 4AG30 of the high reflectance wavelength region is shifted to around approximately 505 nm on the short wavelength side.

In FIG. 34B, how light in three wavelength regions, namely light 48G in a wavelength region centered around 545 nm that can be recognized as a green color, light 48VBC in a wavelength region present slightly apart from the light 48G on the short wavelength side, and light 48YRI in a wavelength region present slightly apart from the light 48G on the long wavelength side, are influenced by variation in the incident angle θ set to the element 4FG when the light in the three wavelength regions is radiated from below the element 4FG is illustrated in such a manner that optical paths are drawn on the graph 4HG.

Regarding the light 48G, when the incident angle θ to the element 4FG is 0°, reflectance (R %) for the light 48G is high and the light 48G is reflected downward. On the other hand, when the incident angle θ is 30°, transmittance (T %) for the light 48G is high and the light 48G is transmitted upward. Regarding the light 48VBC, for any incident angle θ to the element 4FG in a range from 0° to 30°, transmittance (T %) for the light 48VBC is high and the light 48VBC is always transmitted upward. Regarding the light 48YRI, for any incident angle θ to the element 4FG in a range from 0° to 30°, transmittance (T %) for the light 48YRI is high and the light 48YRI is always transmitted upward.

That is, it is revealed that variation in the incident angle θ to the element 4FG significantly (dynamically) influences only the light 48G in the wavelength region centered around 545 nm that can be recognized as a green color.

Characteristics: Element 4FR

The element 4FR is used to control luminance of light in a wavelength region that can be recognized as a red color. As the element 4FR, a long-pass filter (with dielectric multilayer film coating) (model number: SHPF-25C-650) manufactured by SIGMAKOKI CO., LTD. was used.

In general, a short-pass filter (with dielectric multilayer film coating) has a characteristic of, with a boundary wavelength region as a boundary, reflecting (specular reflection) light on the long wavelength side and transmitting light on the short wavelength side. In addition, in general, a short-pass filter (with dielectric multilayer film coating) also has a characteristic that, as an incident angle thereto increases, the boundary wavelength region is shifted further to the short wavelength side.

Figure 35A:
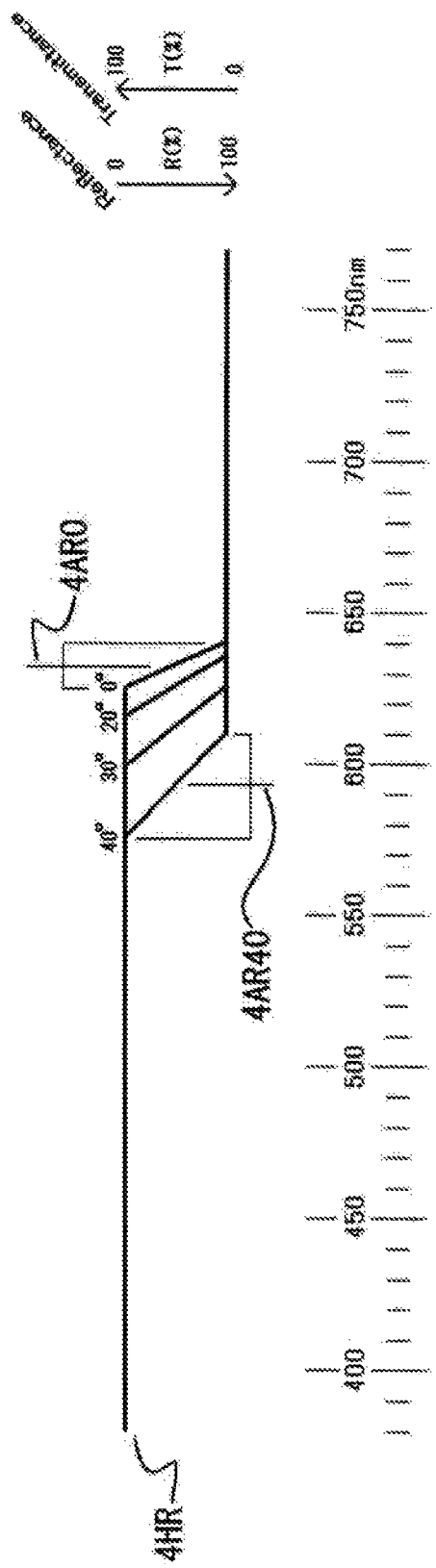
FIG. 35A is a diagram illustrative of characteristics of an element 4FR itself used in the example 3 of the present invention.

In FIG. 35A, a graph 4HR indicating variation in reflection/transmission characteristics of the element 4FR in association with variation in an incident angle θ to the element 4FR is illustrated. The graph illustrates only essential points drawn based on measured numerical values. The graph illustrates that a center 4AR0 of a boundary wavelength region is located around approximately 633 nm when the incident angle θ is 0° and, when the incident angle θ is varied to 40°, a center 4AR40 of the boundary wavelength region is shifted to around approximately 593 nm on the short wavelength side.

Figure 35B:
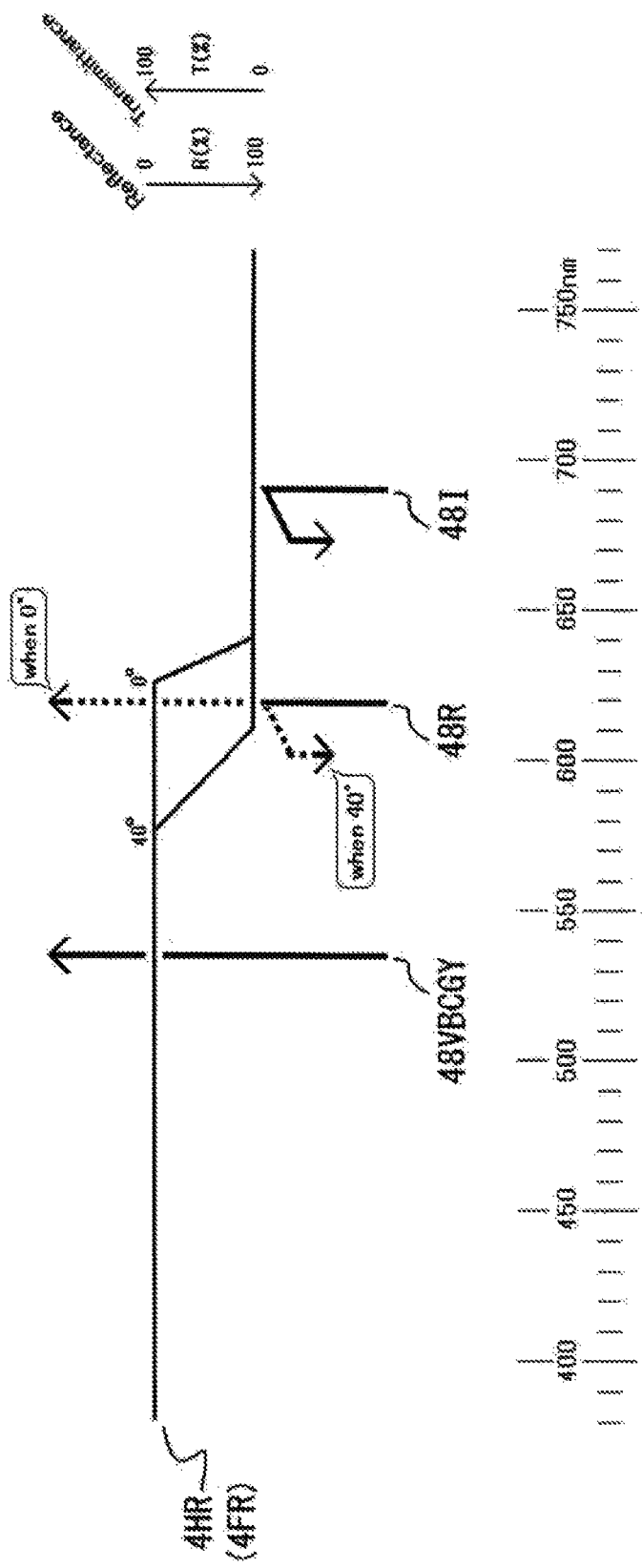
FIG. 35B is another diagram illustrative of the characteristics of the element 4FR itself used in the example 3 of the present invention.

In FIG. 35B, how light in three wavelength regions, namely light 48R in a wavelength region centered around 620 nm that can be recognized as a red color, light 48VBCGY in a wavelength region present slightly apart from the light 48R on the short wavelength side, and light 48I in a wavelength region present slightly apart from the light 48R on the long wavelength side, are influenced by variation in the incident angle θ set to the element 4FR when the light in the three wavelength regions is radiated from below the element 4FR is illustrated in such a manner that optical paths are drawn on the graph 4HR.

Regarding the light 48R, when the incident angle θ to the element 4FR is 0°, transmittance (T %) for the light 48R is high and the light 48R is transmitted upward. On the other hand, when the incident angle θ is 40°, reflectance (R %) for the light 48R is high and the light 48R is reflected downward. Regarding the light 48VBCGY, for any incident angle θ to the element 4FR in a range from 0° to 40°, transmittance (T %) for the light 48VBCGY is high and the light 48VBCGY is always transmitted upward. Regarding the light 48I, for any incident angle θ to the element 4FR in a range from 0° to 40°, reflectance (R %) for the light 48I is high and the light 48I is always reflected downward.

That is, it is revealed that variation in the incident angle θ to the element 4FR significantly (dynamically) influences only the light 48R in the wavelength region centered around 620 nm that can be recognized as a red color.

<Characteristics: Element 4FT>

The element 4FT is used to extract light in three wavelength regions. As the element 4FT, a multiband-pass filter (with dielectric multilayer film coating) (model number: 457/530/628NM 25MM Tri-Band Filter) manufactured by Edmund Optics Japan Ltd. was used.

In general, a multiband-pass filter (with dielectric multilayer film coating) has a characteristic of having a plurality of high transmittance wavelength regions in each of which light within the limited wavelength region is transmitted and reflecting (specular reflection) light in the other wavelength region.

Figure 36A:
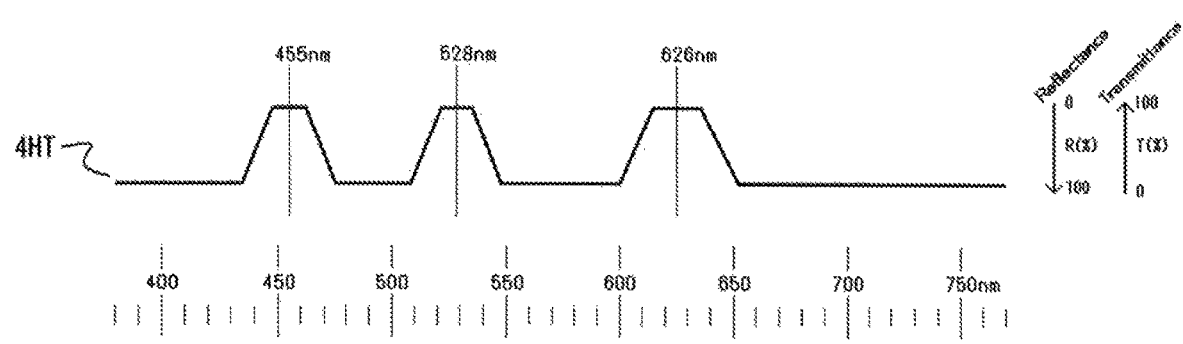
FIG. 36A is a diagram illustrative of characteristics of an element 4FT itself used in the example 3 of the present invention.

In FIG. 36A, a graph 4HT indicating reflection/transmission characteristics of the element 4FT is illustrated. The graph illustrates only essential points of the characteristics drawn based on measured numerical values. The graph illustrates that there are three high transmittance wavelength regions, namely a wavelength region centered around 455 nm and having a width of approximately 30 nm, a wavelength region centered around 528 nm and having a width of approximately 30 nm, and a wavelength region centered around 626 nm and having a width of approximately 40 nm.

Figure 36B:
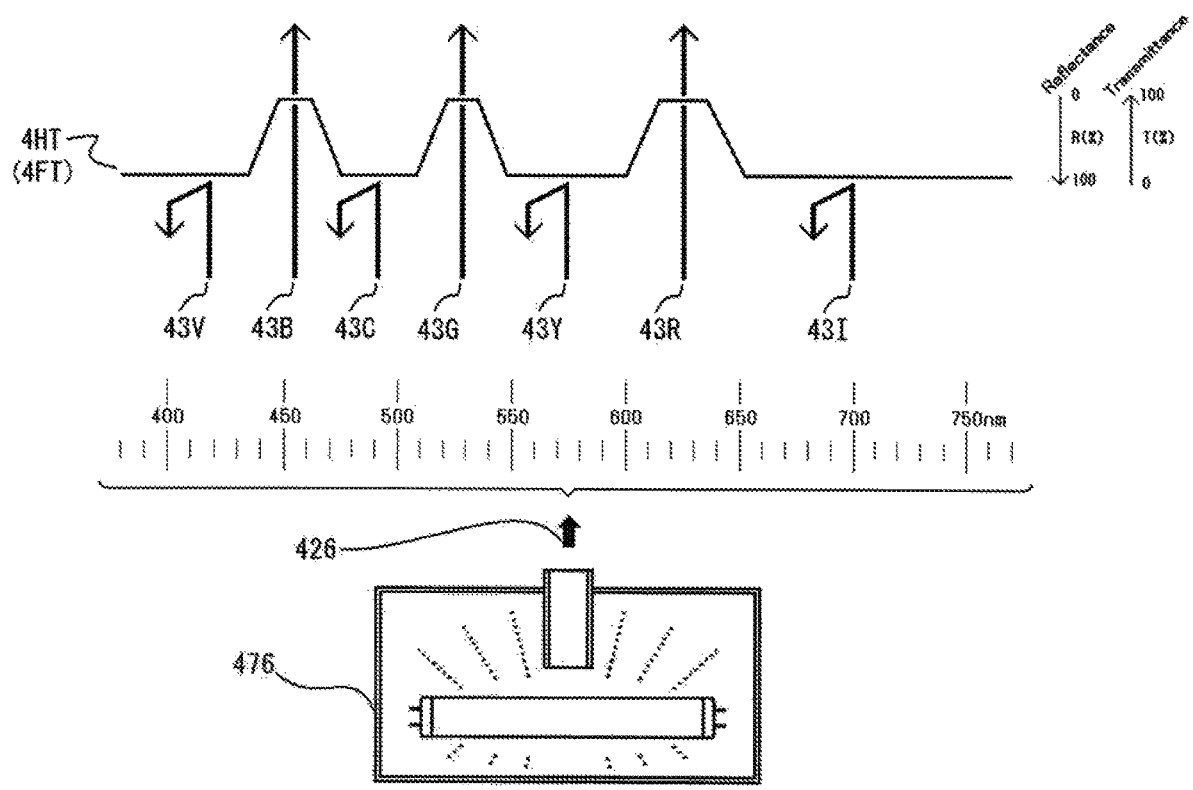
FIG. 36B is another diagram illustrative of the characteristics of the element 4FT itself used in the example 3 of the present invention.

In FIG. 36B, how wavelength region components contained in white parallel light 426 are influenced by the element 4FT when the white parallel light 426 is radiated from below the element 4FT is illustrated in such a manner that optical paths are drawn on the graph 4HT.

The element 4FT separates the white parallel light 426 into light in seven wavelength regions and transmits, among the light in seven wavelength regions, only light in three wavelength regions.

The light in three wavelength regions that the element 4FT transmits upward is light 43B in a wavelength region centered around 455 nm that can be recognized as a blue color, light 43G in a wavelength region centered around 528 nm that can be recognized as a green color, and light 43R in a wavelength region centered around 626 nm that can be recognized as a red color.

The light in wavelength regions that the element 4FT reflects downward is light 43V in a wavelength region that is located between the light 43B and an ultraviolet region and can also be recognized as a blue-violet color, light 43C in a wavelength region that is located between the light 43B and 43G and can also be recognized as a cyan color, light 43Y in a wavelength region that is located between the light 43G and 43R and can also be recognized as a yellow color, and light 43I in a wavelength region that is located between the light 43R and an infrared region and can also be recognized as a deep red color.

Light transmitted upward by the element 4FT, that is, the light in the three wavelength regions extracted by the element 4FT, namely the light 43B, 43G, and 43R, are light in wavelength regions that, subsequently, can be conveniently controlled by the elements 4FB, 4FG, and 4FR, respectively.

Functions Achieved by Combination

In the above description, the element 4FT extracting light in three wavelength regions, namely the light 43B, 43G, and 43R, from the white parallel light 426 was described.

Hereinafter, what influence the three elements, namely the elements 4FB, 4FG, and 4FR, have on the light in the three wavelength regions, the light 43B, 43G, and 43R, will be described.

Elements 4FT and 4FB

Figure 37:
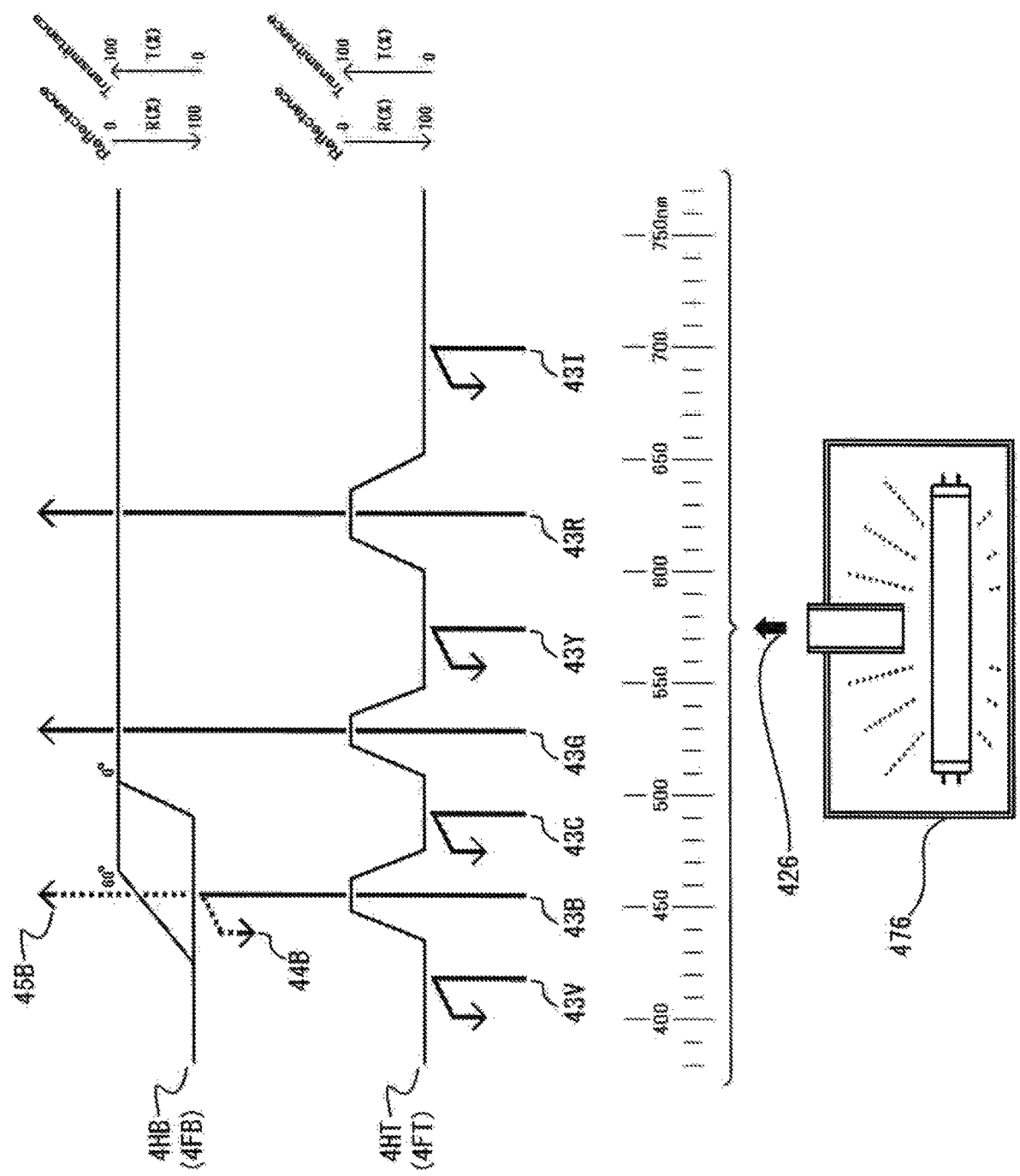
FIG. 37 is a diagram illustrative of characteristics of a combination of the elements 4FT and 4FB used in the example 3 of the present invention.

In FIG. 37, a manner in which the element 4FT extracts the light in the three wavelength regions, the light 43B, 43G, and 43R, and influence that the element 4FB has thereon are illustrated in such a manner that optical paths are drawn on the graphs 4HT and 4HB.

The element 4FB constantly has a high transmittance (T %) for light in two wavelength regions, namely the light 43G and 43R, among the light in the three wavelength regions, the light 43B, 43G, and 43R, that have reached the element 4FB and does nothing but transmit the light 43G and 43R upward without influencing the light 43G and 43R. However, the element 4FB separates the light 43B, which can be recognized as having a blue color, into reflected light 44B and transmitted light 45B.

In a combination of the elements 4FT and 4FB, when the incident angle θ set to the element 4FB is 0°, reflectance (R %) of the element 4FB for the light 43B is highest and most of the light 43B becomes the reflected light 44B. When the incident angle θ is increased from 0° to 60°, transmittance (T %) for the light 43B increases consecutively in the direction from the long wavelength side to the short wavelength side and the transmitted light 45B increases and the reflected light 44B decreases. When the incident angle θ is set at 60°, the transmittance (T %) of the element 4FB for the light 43B becomes highest and a large part of the light 43B becomes the transmitted light 45B. Note that, to avoid a mechanical influence, the incident angle θ can be set at up to 60°.

That is, luminance (Lv) of the light 45B, which can be recognized as having a blue color, can be controlled according to the incident angle θ set to the element 4FB.

<Elements 4FT and 4FG>

Figure 38:
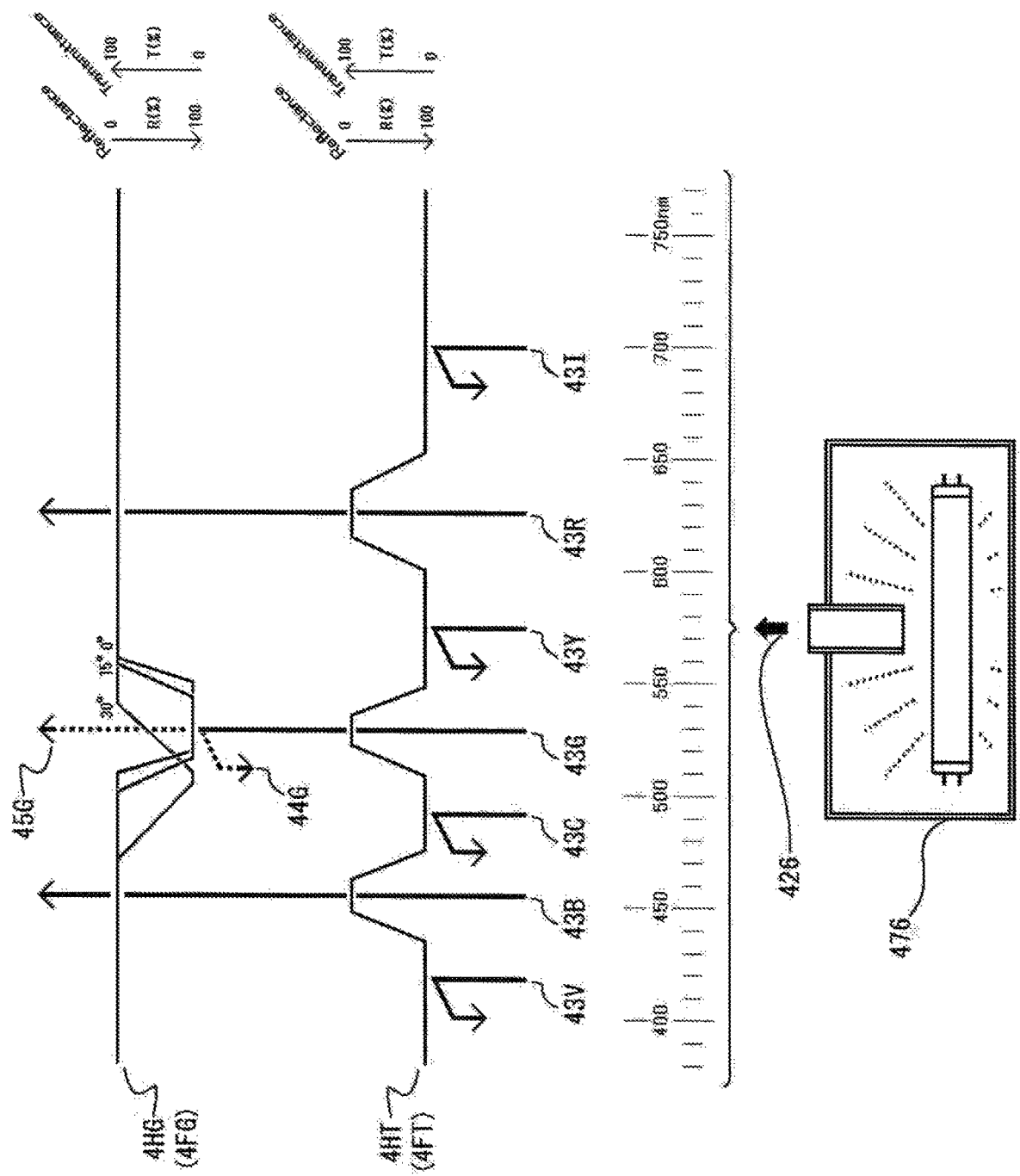
FIG. 38 is a diagram illustrative of characteristics of a combination of the elements 4FT and 4FG used in the example 3 of the present invention.

In FIG. 38, a manner in which the element 4FT extracts the light in the three wavelength regions, the light 43B, 43G, and 43R, and influence that the element 4FG has thereon are illustrated in such a manner that optical paths are drawn on the graphs 4HT and 4HG.

The element 4FG constantly has a high transmittance (T %) for light in two wavelength regions, namely the light 43B and 43R, among the light in the three wavelength regions, the light 43B, 43G, and 43R, that have reached the element 4FG and does nothing but transmit the light 43B and 43R upward without influencing the light 43B and 43R. However, the element 4FG separates the light 43G, which can be recognized as having a green color, into reflected light 44G and transmitted light 45G.

In a combination of the elements 4FT and 4FG, when the incident angle θ set to the element 4FG is approximately 15°, reflectance (R %) of the element 4FG for the light 43G is highest and most of the light 43G becomes the reflected light 44G. When the incident angle θ is increased from 15° to 30°, transmittance (T %) for the light 43G increases consecutively in the direction from the long wavelength side to the short wavelength side and the transmitted light 45G increases and the reflected light 44G decreases. When the incident angle θ is set at 30°, the transmittance (T %) of the element 4FG for the light 43G becomes highest and a large part of the light 43G becomes the transmitted light 45G. Note that, to avoid an influence on the light 43B, the incident angle θ can be set at up to 30°.

That is, luminance (Lv) of the light 45G, which can be recognized as having a green color, can be controlled according to the incident angle θ set to the element 4FG.

Elements 4FT and 4FR

Figure 39:
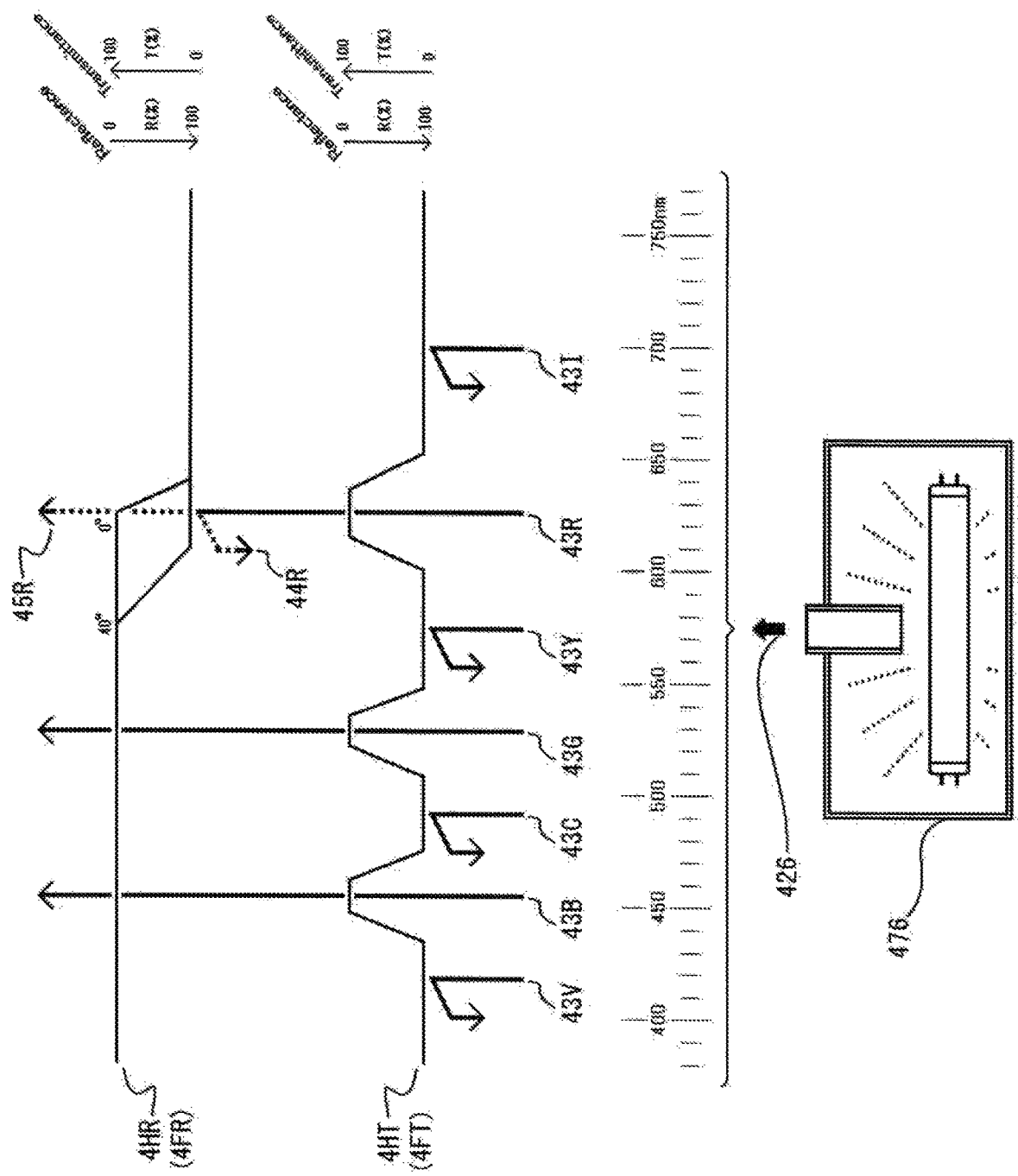
FIG. 39 is a diagram illustrative of characteristics of a combination of the elements 4FT and 4FR used in the example 3 of the present invention.

In FIG. 39, a manner in which the element 4FT extracts the light in the three wavelength regions, the light 43B, 43G, and 43R, and influence that the element 4FR has thereon are illustrated in such a manner that optical paths are drawn on the graphs 4HT and 4HR.

The element 4FR constantly has a high transmittance (T %) for light in two wavelength regions, namely the light 43B and 43G, among the light in the three wavelength regions, the light 43B, 43G, and 43R, that have reached the element 4FR and does nothing but transmit the light 43B and 43G upward without influencing the light 43B and 43G. However, the element 4FR separates the light 43R, which can be recognized as having a red color, into reflected light 44R and transmitted light 45R.

In a combination of the elements 4FT and 4FR, when the incident angle θ set to the element 4FR is approximately 40°, reflectance (R %) of the element 4FR for the light 43R is highest and most of the light 43R becomes the reflected light 44R. When the incident angle θ is decreased from 40° to 0°, transmittance (T %) for the light 43R increases consecutively in the direction from the short wavelength side to the long wavelength side and the transmitted light 45R increases and the reflected light 44R decreases. When the incident angle θ is set at 0°, the transmittance (T %) of the element 4FR for the light 43R becomes highest and a large part of the light 43R becomes the transmitted light 45R. Note that, because an incident angle θ enabling variation in the transmittance to be observed is up to 40°, an effective incident angle θ is required to be set at not more than 40°.

That is, luminance (Lv) of the light 45R, which can be recognized as having a red color, can be controlled according to the incident angle θ set to the element 4FR.

Optical Path

Hereinafter, optical paths in the experimental apparatus 410 will be described.

Figure 40:
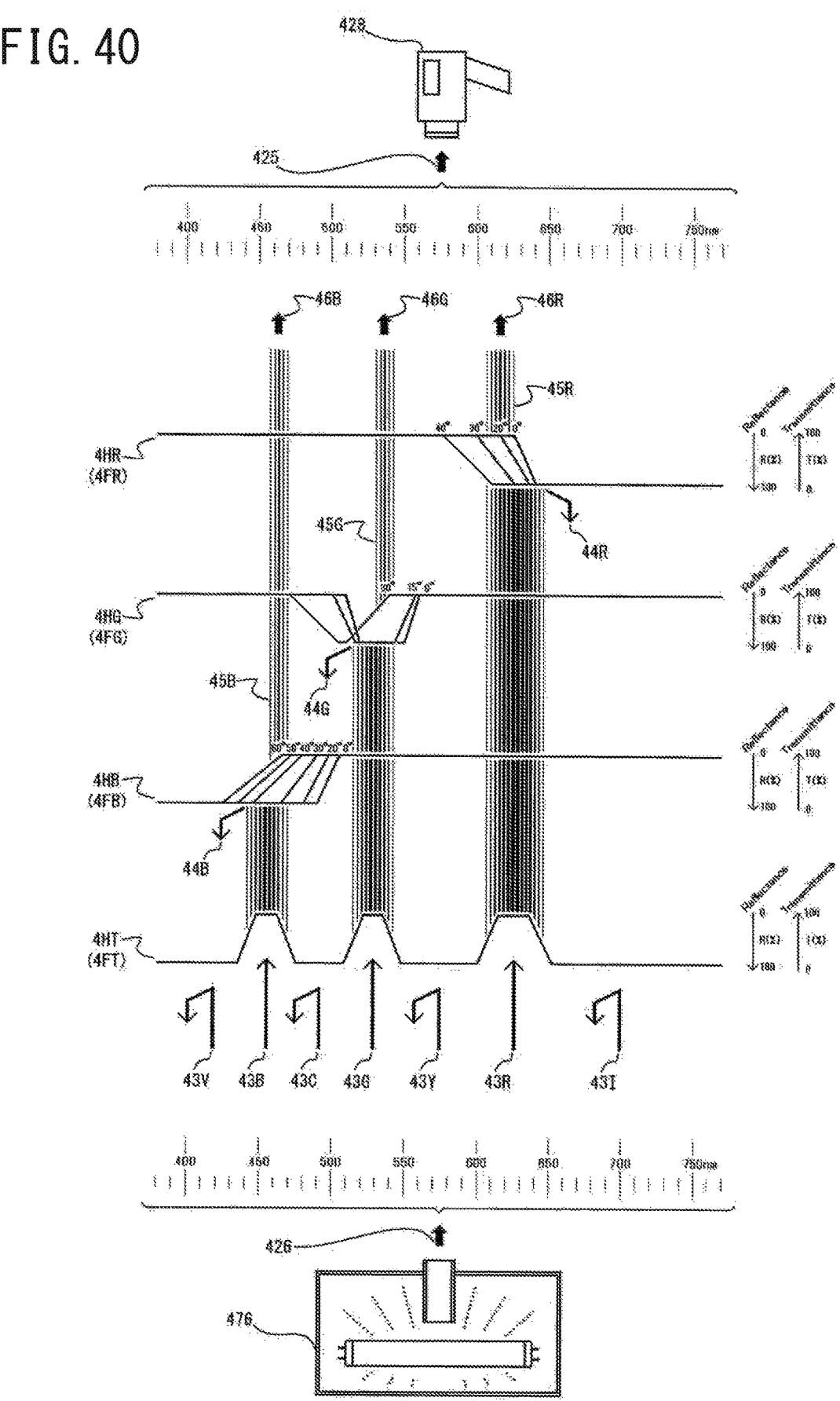
FIG. 40 is a diagram illustrative of actions and optical paths by the four elements (4FT, 4FB, 4FG, and 4FR) used in the example 3 of the present invention.

While FIG. 31 illustrates a configuration of the experimental apparatus 410, FIG. 31 also illustrates principal optical paths at the same time. FIG. 40 illustrates, in particular, actions and optical paths by the elements 4FT, 4FB, 4FG, and 4FR, which are four elements placed inside the color development unit 475, in such a manner that the actions and optical paths are drawn on the graphs 4HT, 4HB, 4HG, and 4HR.

Optical Path: Light Source Unit

Optical paths in the experimental apparatus 410 originate from the fluorescent tube 424, which is placed inside the light source unit 476, and reach the light receiving lens 429 of the chroma meter 428, which is placed at the highest position of the experimental apparatus 410.

Inside the light source unit 476, white light emitted by the fluorescent tube 424, by means of passing through the cylindrical pipe 416, which is placed above the fluorescent tube 424, becomes the white parallel light 426. The white parallel light 426 proceeds toward the color development unit 475, which is placed above the light source unit 476, and reaches the element 4FT, which is arranged on the bottom surface of the color development unit 475.

Optical Path: 4FT

The element 4FT extracts, from the white parallel light 426, light in three wavelength regions, namely the light 43B, which can be recognized as having a blue color, the light 43G, which can be recognized as having a green color, and the light 43R, which can be recognized as having a red color.

The light in the three wavelength regions, the light 43B, 43G, and 43R, are transmitted by the element 4FT and proceed upward. Light in the other four wavelength regions, namely the light 43V, 43C, 43Y, and 43I, are reflected and discarded.

Optical Path: 4FB

The light in the three wavelength regions, the light 43B, 43G, and 43R, reach the element 4FB. The element 4FB separates the light 43B, which can be recognized as having a blue color, into the transmitted light 45B and the reflected light 44B. The light 45B proceeds upward and the light 44B is discarded. Luminance (Lv) of the light 45B is determined according to the incident angle θ to the element 4FB. The light in the other two wavelength regions, the light 43G and 43R, are transmitted by the element 4FB without being influenced thereby and proceed upward.

Optical Path: 4FG

The light in the three wavelength regions, the light 45B, 43G, and 43R, reach the element 4FG. The element 4FG separates the light 43G, which can be recognized as having a green color, into the transmitted light 45G and the reflected light 44G. The light 45G proceeds upward and the light 44G is discarded. Luminance (Lv) of the light 45G is determined according to the incident angle θ to the element 4FG. The light in the other two wavelength regions, the light 45B and 43R, are transmitted by the element 4FG without being influenced thereby and proceed upward.

Optical Path: 4FR

The light in the three wavelength regions, the light 45B, 45G, and 43R, reach the element 4FR. The element 4FR separates the light 43R, which can be recognized as having a red color, into the transmitted light 45R and the reflected light 44R. The light 45R proceeds upward and the light 44R is discarded. Luminance (Lv) of the light 45R is determined according to the incident angle θ to the element 4FR. The light in the other two wavelength regions, the light 45B and 45G, are transmitted by the element 4FR without being influenced thereby and proceed upward.

Optical Path: Chroma Meter

The light emitted upward from the inside of the color development unit 475 is the transmitted light 45B, 45G, and 45R, the light is also the light 46B the luminance of which is controlled and that can be recognized as having a blue color, the light 46G the luminance of which is controlled and that can be recognized as having a green color, and the light 46R the luminance of which is controlled and that can be recognized as having a red color. Light into which the light 46B, 46G, and 46R are combined is light generated in accordance with the principle, that is, the output light 425, and proceeds toward the chroma meter 428, and chromaticity and luminance thereof are measured.

Control of Hue and Brightness/Darkness

Hereinafter, control of hue and control of brightness/darkness in the experimental apparatus 410 will be described.

Control of Development of Seven Colors

While, as described above, the output light 425 is light into which the light 46B, 46G, and 46R are combined, varying combinations of the three rays of light enables hue of the output light 425 to be varied. Colors that can be developed by this control are seven colors including blue, green, and red colors, which are three primary colors, and cyan, yellow, magenta, and white colors, which are composite colors of the three primary colors.

Monochromatic Luminance Control

Brightness/darkness of any of the light 46B, 46G, and 46R can be varied gradually. For ease of observation, any one of the light 46B, 46G, and 46R may be chosen and brightness/darkness thereof may be varied gradually. That is, for light in a specific wavelength region, intensity (luminance) of the light can be controlled gradually between a maximum value and a minimum value thereof.

Control of Hue and Brightness/Darkness

Verifying, in this experiment, that the above-described control of hue and brightness/darkness can be achieved by the experimental apparatus 410 indicates that the present invention is one of the principles enabling light of any color to be emitted.

Experimental Example 3-A

Transmission-type Color Development: Control Experiment on Development of Seven Colors Purpose This experiment is to confirm that, in the transmission-type color development experimental apparatus 410, blue, green, and red colors, which are three primary colors, and cyan, yellow, magenta, and white colors, which are composite colors of the three primary colors, can be developed.

Optical Path in Experiment

This experiment uses all optical paths with which the experimental apparatus 410 is provided. That is, the experiment uses optical paths illustrated in FIG. 40.

Experimental Process

Hereinafter, using FIG. 31, a process of the experiment will be described.

In the experimental apparatus 410, first, the white parallel light 426 is supplied to the color development unit 475 by the light source unit 476. Then, from the inside of the color development unit 475, the output light 425 is emitted upward and reaches the chroma meter 428. The emitted light 425 is measured using the chroma meter 428, and luminance (Lv) and chromaticity (u', v') are displayed.

At this time, in accordance with a procedure to be described below, the observer, turning three angle setting knobs 419, which the color development unit 475 has, and reading luminance (Lv) and chromaticity (u', v') displayed by the chroma meter 428, sets the respective incident angles θ to the three elements, the elements 4FB, 4FG, and 4FR, in such a way that the light 425 comes to have a measurement target color.

When the light 425 has the measurement target color, the observer visually observes the color glowing in the finder of the chroma meter 428 and subsequently records chromaticity values (u', v') that the chroma meter 428 indicates.

The above-described measurement and observation were performed with respect to white, cyan, blue, magenta, red, yellow, and green colors, which are measurement target colors.

Procedures for developing white, cyan, blue, magenta, red, yellow, and green colors, which are measurement target colors, will be described below. Observation results on colors that glow in the finder when the measurement target colors are developed and the observer looks through the finder of the chroma meter 428 will also be described.

White

The observer, watching a display on the chroma meter 428, sets the respective incident angles θ to the three elements 4FB, 4FG, and 4FR, using three angle setting knobs 419 in such a way that the luminance (Lv) and the chromaticity (u', v') come close to a luminance value (Lv=1500) and chromaticity values (u'=0.21, v'=0.49), respectively, as close as possible. This operation causes a white color to be developed. When the procedure was conducted, a glow that could be recognized as a white color was able to be seen in the finder of the chroma meter 428 in the visual observation.

Hereinafter, each of the measurement target colors other than the white color is generated by, using the white color as a base, removing an unnecessary color(s) from the white color.

Cyan

First, a white color is developed in accordance with the above-described procedure for developing a white color. Subsequently, by setting the incident angle θ to the element 4FR at approximately 40° using the angle setting knob 419 thereof, luminance of light having a red color is set at a minimum value. This operation causes a cyan color to be developed. When the procedure was conducted, a glow that can be recognized as a cyan color was able to be seen in the finder of the chroma meter 428 in the visual observation.

Blue

First, a cyan color is developed in accordance with the above-described procedure for developing a cyan color. Subsequently, by setting the incident angle θ to the element 4FG at approximately 15° using the angle setting knob 419 thereof, luminance of light having a green color is set at a minimum value. This operation causes a blue color to be developed. When the procedure was conducted, a glow that can be recognized as a blue color was able to be seen in the finder of the chroma meter 428 in the visual observation.

Magenta

First, a white color is developed in accordance with the above-described procedure for developing a white color. Subsequently, by setting the incident angle θ to the element 4FG at approximately 15° using the angle setting knob 419 thereof, luminance of light having a green color is set at a minimum value. This operation causes a magenta color to be developed. When the procedure was conducted, a glow that can be recognized as a magenta color was able to be seen in the finder of the chroma meter 428 in the visual observation.

Red

First, a magenta color is developed in accordance with the above-described procedure for developing a magenta color. Subsequently, by setting the incident angle θ to the element 4FB at approximately 0° using the angle setting knob 419 thereof, luminance of light having a blue color is set at a minimum value. This operation causes a red color to be developed. When the procedure was conducted, a glow that can be recognized as a red color was able to be seen in the finder of the chroma meter 428 in the visual observation.

Yellow

First, a white color is developed in accordance with the above-described procedure for developing a white color. Subsequently, by setting the incident angle θ to the element 4FB at approximately 0° using the angle setting knob 419 thereof, luminance of light having a blue color is set at a minimum value. This operation causes a yellow color to be developed. When the procedure was conducted, a glow that can be recognized as a yellow color was able to be seen in the finder of the chroma meter 428 in the visual observation.

Green

First, a yellow color is developed in accordance with the above-described procedure for developing a yellow color. Subsequently, by setting the incident angle θ to the element 4FR at approximately 40° using the angle setting knob 419 thereof, luminance of light having a red color is set at a minimum value. This operation causes a green color to be developed. When the procedure was conducted, a glow that can be recognized as a green color was able to be seen in the finder of the chroma meter 428 in the visual observation.

Measurement Result

Hereinafter, a chromaticity table obtained from the measurement and a chromaticity diagram drawn based on the table will be described. Table 3 is a table obtained by measuring chromaticity (u', v') with respect to the light 425, which is emitted from the color development unit 475 set to develop each of white, cyan, blue, magenta, red, yellow, and green colors, which are measurement target colors, and tabulating results from the measurement into a numerical table.

TABLE 3

|  | u' | v' |
|---|---|---|
| White | 0.209 | 0.499 |
| Cyan | 0.078 | 0.495 |
| Blue | 0.184 | 0.095 |
| Magenta | 0.407 | 0.386 |
| Red | 0.512 | 0.523 |
| Yellow | 0.217 | 0.563 |
| Green | 0.051 | 0.586 |

Figure 41:
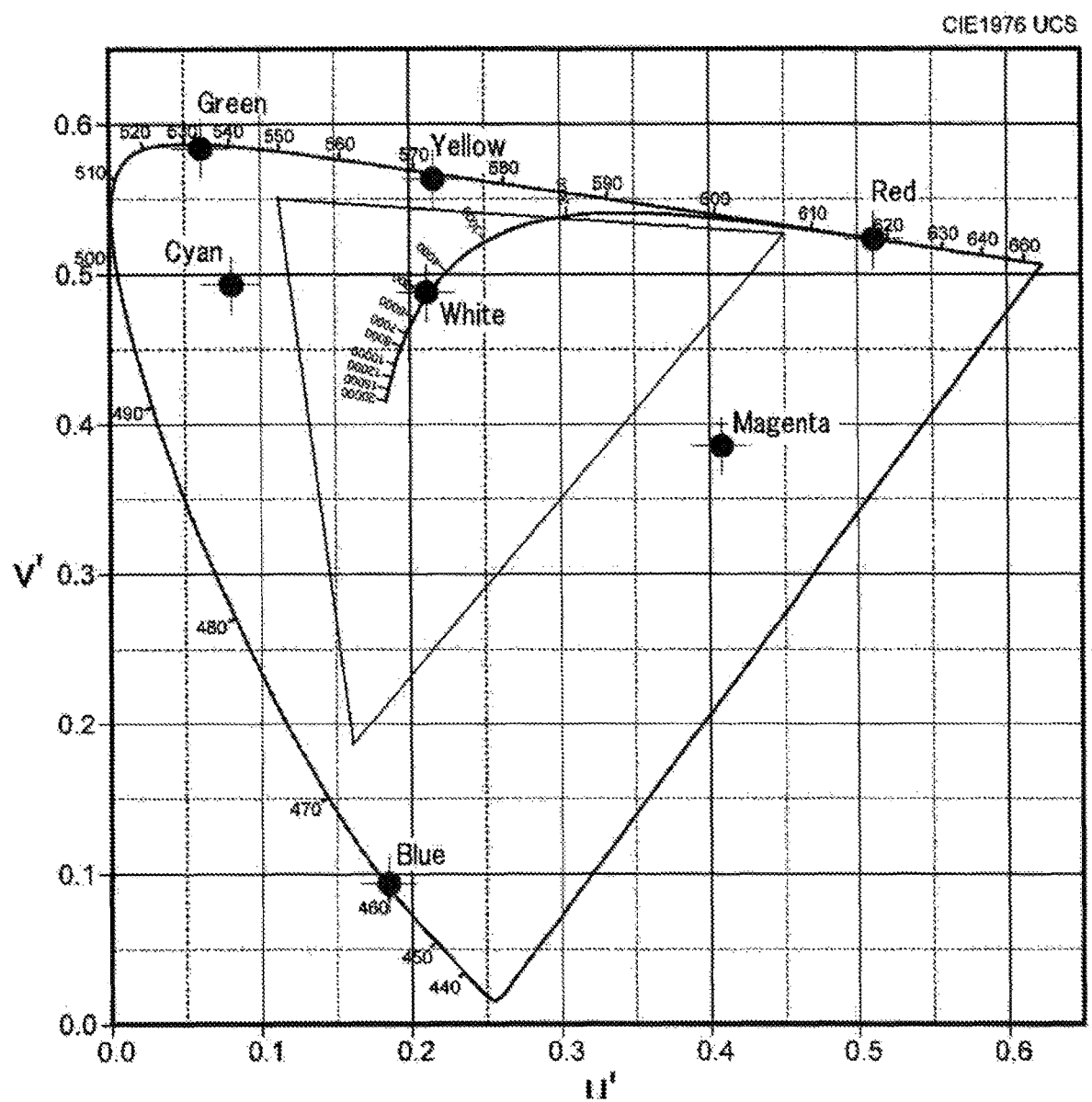
FIG. 41 is a chromaticity diagram illustrative of chromaticity of seven colors developed in the example 3 of the present invention.

FIG. 41 is a chromaticity diagram drawn based on the chromaticity values (u', v') in Table 3. With respect to measured white, cyan, blue, magenta, red, yellow, and green colors, dot marks are drawn at coordinates that the chromaticity values (u', v') of the respective colors indicate. In addition, a triangle indicating a color gamut of a cold cathode fluorescent lamp backlit liquid crystal display is drawn as a reference example.

Chromaticity Observation

The following is an examination on the respective dot marks drawn on the chromaticity diagram in FIG. 41.

A dot mark (• White) indicating the chromaticity of a white color was located in a vicinity of a point of 5000 K on the blackbody locus. That is, light having this chromaticity is light that a person can recognize as having a white color. Note that a white color is a composite color of blue, green, and red colors. Hereinafter, "• White" is also simply referred to as "• W".

A dot mark (• Blue) indicating the chromaticity of a blue color was located, with "• W" as a center, in a direction toward an area where a lot of blue color components are contained in the chromaticity diagram. That is, light having this chromaticity is light that a person can recognize as having a blue color. Hereinafter, "• Blue" is also simply referred to as "• B".

A dot mark (• Green) indicating the chromaticity of a green color was located, with "• W" as a center, in a direction toward an area where a lot of green color components are contained in the chromaticity diagram. That is, light having this chromaticity is light that a person can recognize as having a green color. Hereinafter, "• Green" is also simply referred to as "• G".

A dot mark (• Red) indicating the chromaticity of a red color was located, with "• W" as a center, in a direction toward an area where a lot of red color components are contained in the chromaticity diagram. That is, light having this chromaticity is light that a person can recognize as having a red color. Hereinafter, "• Red" is also simply referred to as "• R".

A dot mark (• Yellow) indicating the chromaticity of a yellow color was located, with "• W" as a center, in the opposite direction to the direction toward "• B" and between "• G" and "• R". That is, light having this chromaticity is light that a person can recognize as having a yellow color. Note that a yellow color is a complementary color of a blue color and a composite color of green and red colors.

A dot mark (• Cyan) indicating the chromaticity of a cyan color was located, with "• W" as a center, in the opposite direction to the direction toward "• R" and between "• B" and "• G". That is, light having this chromaticity is light that a person can recognize as having a cyan color. Note that a cyan color is a complementary color of a red color and a composite color of blue and green colors.

A dot mark (• Magenta) indicating the chromaticity of a magenta color was located, with "• W" as a center, in the opposite direction to the direction toward "• G" and between "• B" and "• R". That is, light having this chromaticity is light that a person can recognize as having a magenta color. Note that a magenta color is a complementary color of a green color and a composite color of blue and red colors.

Evaluation of Experimental Results

As described above, from the visual observation and the measured chromaticity numerical values in the experiment described so far, the observer could confirm that, when the observer set the experimental apparatus 410 to develop a white color, a color that can be recognized as a white color was developed. The observer could also confirm that, when the observer set the experimental apparatus 410 to develop a cyan color, a color that can be recognized as a cyan color was developed. The observer could also confirm that, when the observer set the experimental apparatus 410 to develop a blue color, a color that can be recognized as a blue color was developed. The observer could also confirm that, when the observer set the experimental apparatus 410 to develop a magenta color, a color that can be recognized as a magenta color was developed. The observer could also confirm that, when the observer set the experimental apparatus 410 to develop a red color, a color that can be recognized as a red color was developed. The observer could also confirm that, when the observer set the experimental apparatus 410 to develop a yellow color, a color that can be recognized as a yellow color was developed. The observer could also confirm that, when the observer set the experimental apparatus 410 to develop a green color, a color that can be recognized as a green color was developed.

Evaluation of Control Experiment on Development of Seven Colors

As described above, it could be confirmed that, in the experimental apparatus 410, the three primary colors, blue, green, and red colors, and the composite colors thereof, cyan, yellow, magenta, and white colors, could be developed. That is, it was clearly verified that varying combinations of light having the three primary colors, which could be emitted in accordance with the principle, enabled hue to be varied.

Thus far is the description of the experimental example 3-A, which is a control experiment on development of seven colors using the transmission-type color development experimental apparatus.

Experimental Example 3-B

Transmission-type Color Development: Control Experiment on Monochromatic Luminance Purpose This experiment is to confirm that, in the transmission-type color development experimental apparatus 410, with respect to emitted light in a specific wavelength region (red light), intensity (luminance) of the light can be controlled gradually between a maximum value and a minimum value thereof.

Optical Path in Experiment

Figure 42:
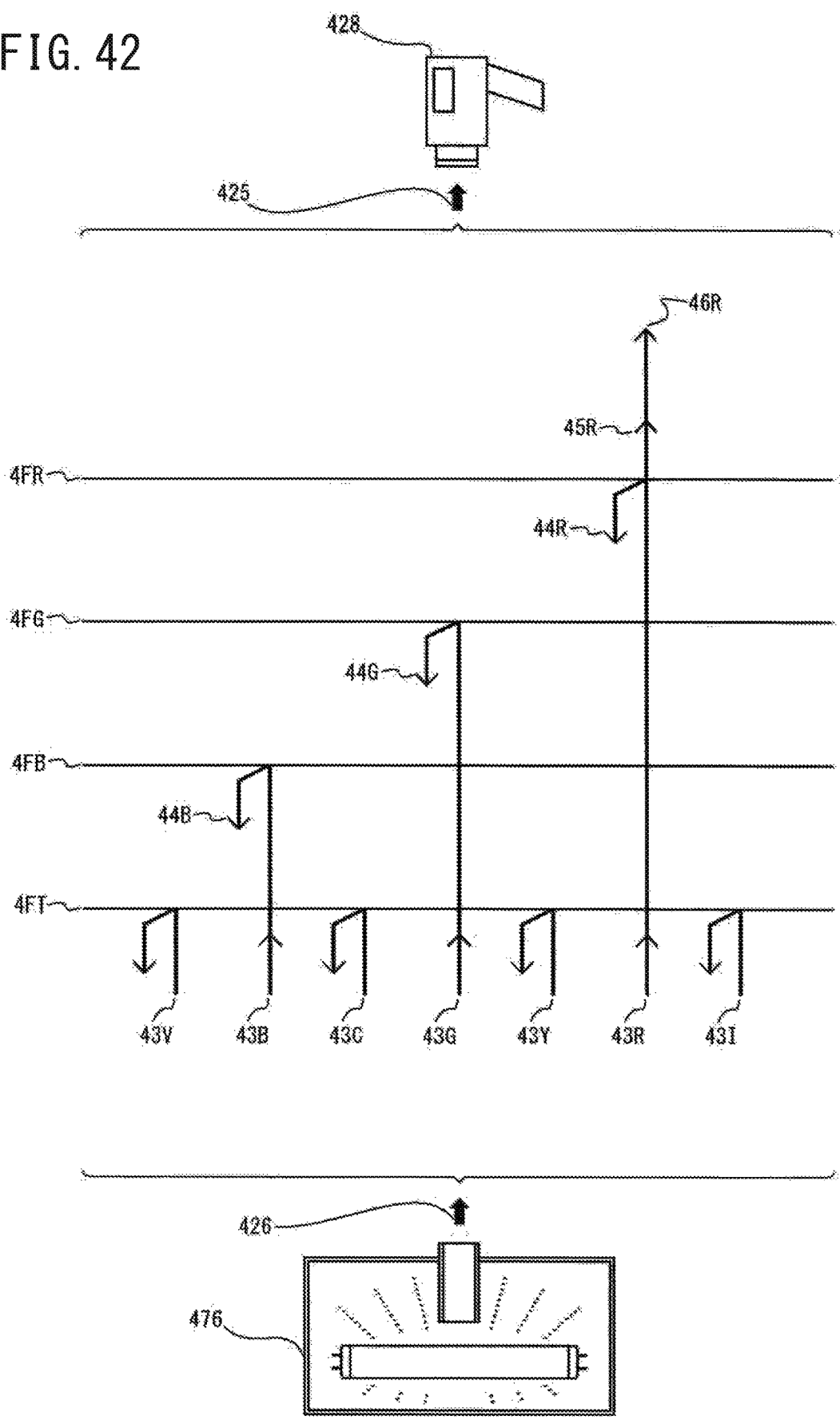
FIG. 42 is a diagram illustrative of optical paths in a control experiment on monochromatic luminance conducted in the example 3 of the present invention.

This experiment particularly uses a range of optical paths of the light 43R, which is light in a wavelength region that can be recognized as a red color, among the optical paths with which the experimental apparatus 410 is provided. The other ranges of optical paths are not used. In FIG. 42, optical paths used in the experiment are illustrated.

Experimental Process

Hereinafter, using FIG. 31, a process of the experiment will be described.

In the experimental apparatus 410, first, the white parallel light 426 is supplied to the color development unit 475 by the light source unit 476. Then, from the inside of the color development unit 475, the output light 425 is emitted upward and reaches the chroma meter 428. The emitted light 425 is measured using the chroma meter 428, and luminance (Lv) and chromaticity (u', v') are displayed.

At this time, first, the observer, turning three angle setting knobs 419, which the color development unit 475 has, and reading luminance (Lv) and chromaticity (u', v') displayed by the chroma meter 428, sets the respective incident angles θ to the three elements, the elements 4FB, 4FG, and 4FR, in such a way that the luminance (Lv) of the light 425 becomes minimum (darkness). As a reference, the respective incident angles θ to the three elements that causes the light 425 to have a minimum luminance value (Lv) are as follows: around approximately 0° to the element 4FB; around approximately 15° to the element 4FG; and around approximately 40° to the element 4FR.

Next, the observer sets the incident angle θ to the element 4FR at 0° by turning the angle setting knob 419 thereof. Then, the output light 425 is emitted upward from the inside of the color development unit 475 and proceeds toward the chroma meter 428.

At this time, a "red glow" can be seen in the finder of the chroma meter 428. The red glow is exactly the light 46R the luminance of which is controlled and that can be recognized as having a red color. The light 425 is measured using the chroma meter 428, and luminance (Lv) and chromaticity (u', v') are displayed and recorded. The observer looks through the finder of the chroma meter 428 and visually observes a state of light glowing therein.

The incident angle θ to the element 4FR was set at angles from 0° to 40° at 5° intervals by turning the angle setting knob 419 thereof and the above-described measurement was performed at the respective incident angles θ.

Measurement Result

Hereinafter, a numerical table obtained from the measurement and a graph and a chromaticity diagram drawn based on the table will be described. Table 4 is a numerical table illustrative of variation in luminance (Lv) and chromaticity (u', v') in association with variation in the incident angle θ to the element 4FR.

TABLE 4

| θ | Lv | u' | v' |
|---|---|---|---|
| 0° | 626.9 | 0.519 | 0.522 |
| 5° | 615.2 | 0.518 | 0.522 |
| 10° | 576.8 | 0.516 | 0.523 |
| 15° | 516.4 | 0.513 | 0.523 |
| 20° | 398.1 | 0.506 | 0.524 |
| 25° | 166.9 | 0.496 | 0.526 |
| 30° | 90.7 | 0.490 | 0.526 |
| 35° | 19.6 | 0.482 | 0.527 |
| 40° | 0.2 | — | — |

Figure 43:
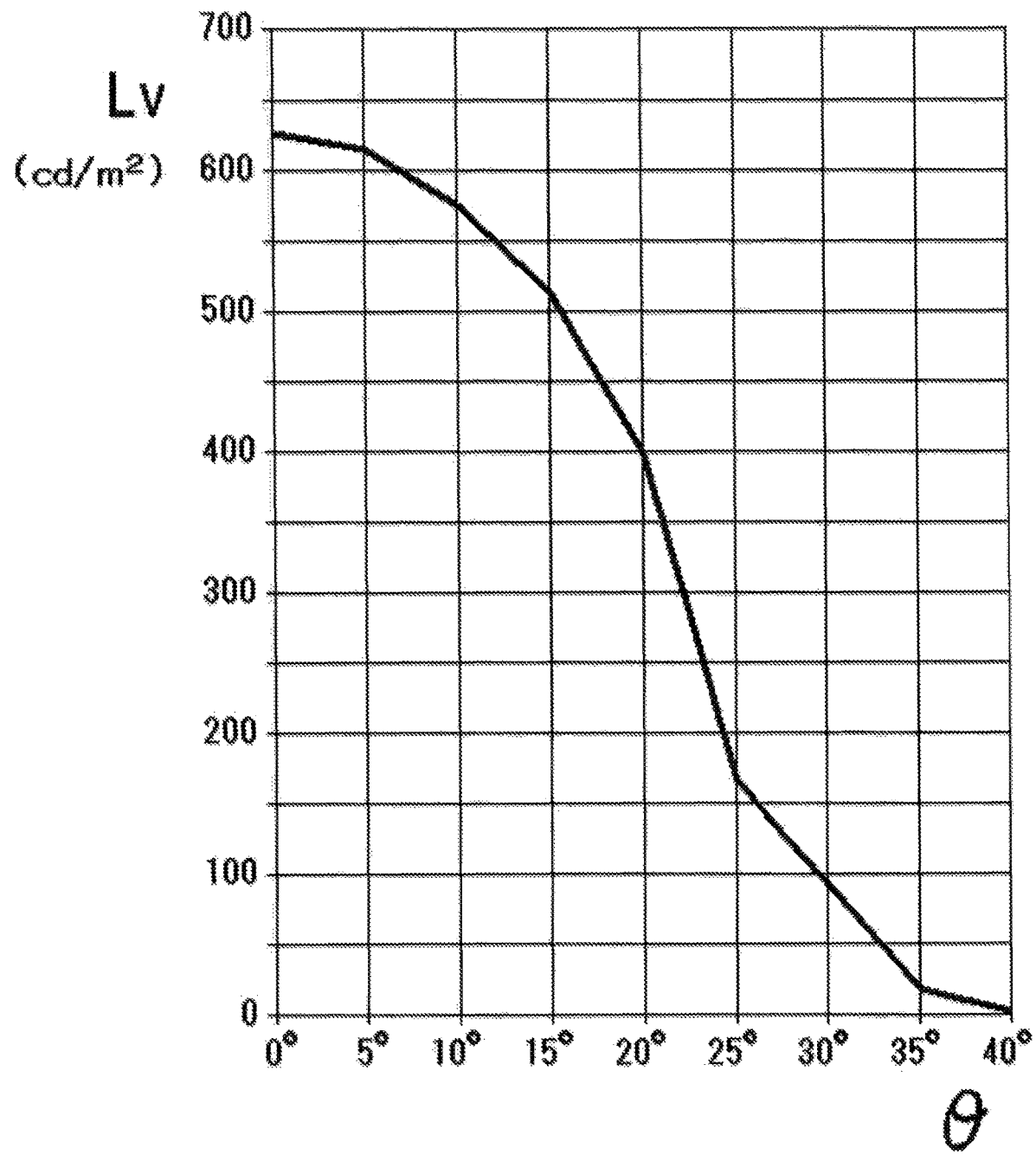
FIG. 43 is a graph illustrative of variation in luminance in association with variation in an incident angle to the element 4FR used in the example 3 of the present invention.
Figure 44:
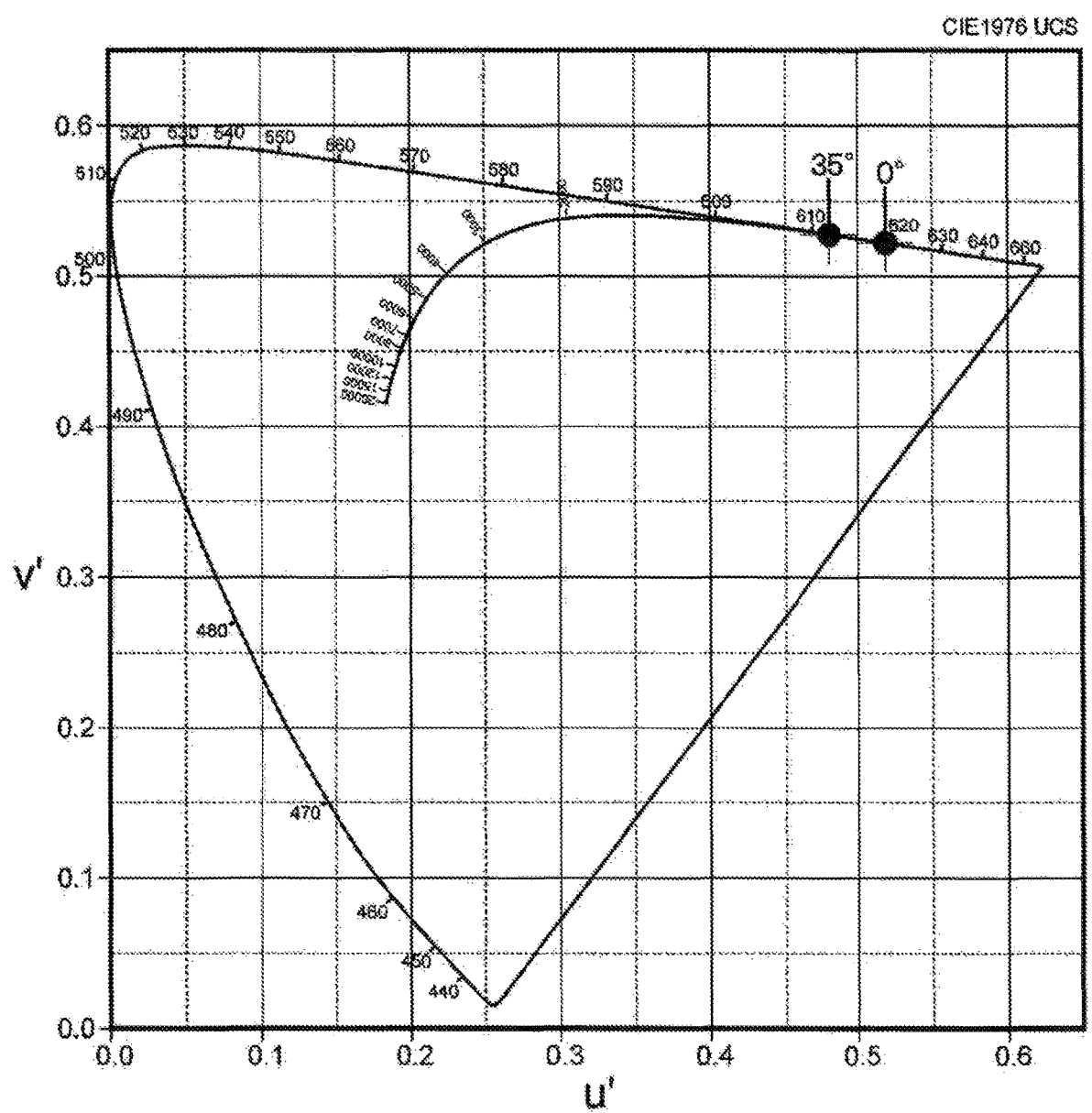
FIG. 44 is a chromaticity diagram illustrative of variation in chromaticity in association with variation in the incident angle to the element 4FR used in the example 3 of the present invention.
Figure 45A:
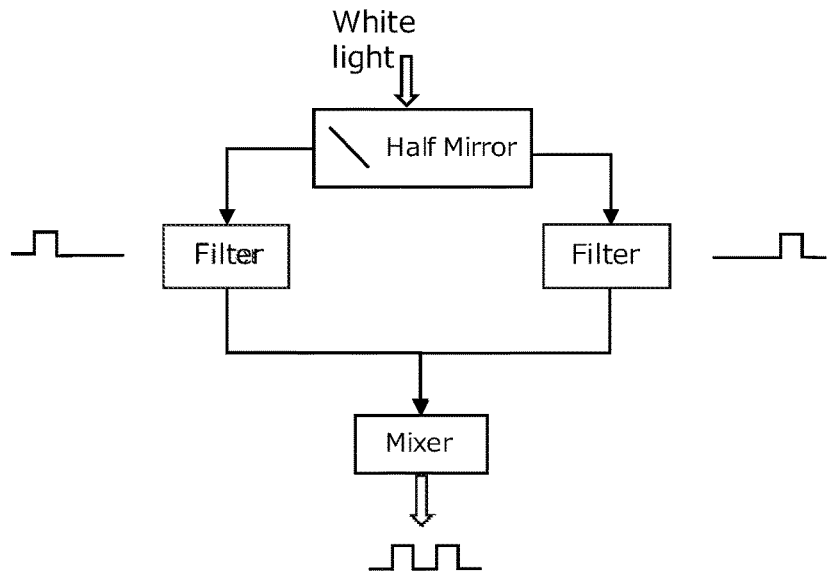
FIGS. 45A and 45B are diagrams descriptive of a difference between (a) a conventional technology and (b) an implementation of the invention.
Figure 45B:
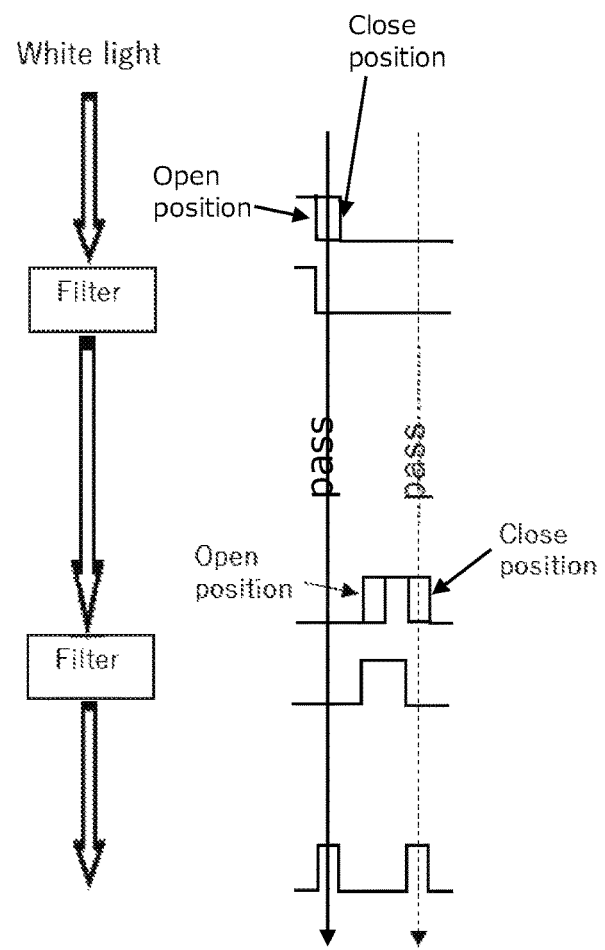

FIG. 43 is a graph illustrative of a locus of variation in luminance (Lv) in association with variation in the incident angle θ to the element 4FR, which is drawn based on numerical values of the luminance (Lv) in Table 4. FIG. 44 is a chromaticity diagram illustrative of a locus of variation in chromaticity (u', v') in association with variation in the incident angle θ to the element 4FR, which is drawn based on numerical values of the chromaticity (u', v') in Table 4.

Evaluation of Luminance and Chromaticity

Hereinafter, an examination on the luminance (Lv) will first be described from a result obtained in the experiment.

In FIG. 43, as the incident angle θ to the element 4FR is increased from 0° to 40°, the luminance (Lv) decreases forming an inverse S curve from the maximum value to the minimum value. However, it can also be observed that, even while forming an inverse S curve, variation in the luminance (Lv) for incident angles θ from 5° to 35° has high linearity, and, thus, it can be said that gradual control of luminance is easily performed.

It can also be said that the output light 425 has a distinct contrast in luminance because the luminance (Lv) at an incident angle θ of 0° has a value not less than 600 and the luminance (Lv) at an incident angle θ of 40° has a value less than one. In addition, the minimum luminance (Lv) at an incident angle θ of 40° can be said to indicate "darkness" to a sufficient extent.

Next, an examination on the chromaticity (u', v') will be described.

FIG. 44 illustrates variation in the chromaticity (u', v'), and, as the incident angle θ is increased from 0° to 40°, the chromaticity (u', v') moves gradually. This observation applies to a section from a dot mark representing chromaticity (u', v') at an incident angle θ of 0° to a dot mark representing chromaticity (u', v') at an incident angle θ of 35°. Because the luminance (Lv) at an incident angle θ of 40° indicates "darkness" to a sufficient extent, the chromaticity (u', v') at the incident angle θ cannot be measured.

Describing the above-described variation in the chromaticity (u', v'), it is difficult to recognize variation in the chromaticity (u', v') in the visual observation while the luminance (Lv) varies substantially, and it can be said that variation in the chromaticity (u', v') is slight.

Evaluation of Experimental Results

As described above, from the visual observation and the measured numerical values of the luminance (Lv) and the chromaticity (u', v') in the experiment described so far, it could be confirmed that, when the observer set the incident angle θ to the element 4FR at 0°, light that could be recognized as having a red color glowed most brightly and was emitted from the color development unit 475. It could also be confirmed that, when the observer successively varied the incident angle θ to the element 4FR from 0° to 40°, light that could be recognized as having a red color dimmed in accordance with the variation. It could also be confirmed that, when the observer set the incident angle θ to the element 4FR at 40°, the inside of the color development unit 475 fell into "darkness".

Evaluation of Control Experiment on Monochromatic Luminance

As described above, it could be confirmed that, in the experimental apparatus 410, with respect to light in a specific wavelength region (red light), intensity (luminance) of the light could be controlled gradually between a maximum value and a minimum value thereof. That is, it was clearly verified that brightness/darkness of light having three primary colors, which could be emitted in accordance with the principle, could be varied gradually.

Evaluation of (Experimental Example 3) "Experiment on Transmission-type Color Development"

The following is a summary of the results of the two verification experiments, which were conducted as the experimental example 3 "experiment on the transmission-type color development".

In the experimental example 3-A "Transmission-type Color Development: Control Experiment on Development of Seven Colors", it was clearly verified that varying combinations of light having the three primary colors, which could be emitted in accordance with the principle, enabled hue to be varied.

In the experimental example 3-B "Transmission-type Color Development: Control Experiment on Monochromatic Luminance", it was clearly verified that brightness/darkness of light having the three primary colors, which could be emitted in accordance with the principle, could be varied gradually.

As described above, from the results of the two verification experiments, which were conducted as the experimental example 3 "experiment on the transmission-type color development", it was clearly verified that the present invention is one of the principles enabling light of any color to be emitted. Note that, although development of seven colors was experimented, all colors can be developed practically.

Although one aspect of the present invention was described above referring to a limited number of embodiments and variations, the scope of the present invention is not limited to the embodiments and variations and modifications of the respective embodiments based on the above disclosure are obvious to those skilled in the art.

The embodiments of the claimed invention include the following examples.

Example 1

An image display device element including: a first optical element configured to have light absorption characteristics or light reflection characteristics in an oblique direction on a long wavelength side and light transmission characteristics on a short wavelength side, wherein a boundary wavelength between the characteristics is variable; and a second optical element configured to have light reflection characteristics on a long wavelength side and light transmission characteristics on a short wavelength side, wherein a boundary wavelength between the characteristics is fixed, wherein light emitted by a light source proceeds toward the first optical element, the first optical element absorbs or reflects in an oblique direction light on the long wavelength side, light transmitted by the first optical element reaches the second optical element, the second optical element reflects light in a specific wavelength region among light having reached the second optical element, and the reflected light proceeds toward the first optical element, is transmitted by the first optical element, and advances toward an observer.

Example 2

An image display device element including: a first optical element configured to have light absorption characteristics or light reflection characteristics in an oblique direction on a short wavelength side and light transmission characteristics on a long wavelength side, wherein a boundary wavelength between the characteristics is fixed; and a second optical element configured to have light reflection characteristics on a short wavelength side and light transmission characteristics on a long wavelength side, wherein a boundary wavelength between the characteristics is variable, wherein light emitted by a light source proceeds toward the first optical element, the first optical element absorbs or reflects in an oblique direction light on the short wavelength side, light transmitted by the first optical element reaches the second optical element, the second optical element reflects light in a specific wavelength region among light having reached the second optical element, and the reflected light proceeds toward the first optical element, is transmitted by the first optical element, and advances toward an observer.

Example 3

An image display device element including: a first optical element configured to have light absorption characteristics or light reflection characteristics in an oblique direction on a long wavelength side and light transmission characteristics on a short wavelength side, wherein a boundary wavelength between the characteristics is fixed; and a second optical element configured to have light reflection characteristics on a long wavelength side and light transmission characteristics on a short wavelength side, wherein a boundary wavelength between the characteristics is variable, wherein light emitted by a light source proceeds toward the first optical element, the first optical element absorbs or reflects in an oblique direction light on the long wavelength side, light transmitted by the first optical element reaches the second optical element, the second optical element reflects light in a specific wavelength region among light having reached the second optical element, and the reflected light proceeds toward the first optical element, is transmitted by the first optical element, and advances toward an observer.

Example 4

An image display device element including: a first optical element configured to have light absorption characteristics or light reflection characteristics in an oblique direction on a short wavelength side and light transmission characteristics on a long wavelength side, wherein a boundary wavelength between the characteristics is variable; and a second optical element configured to have light reflection characteristics on a short wavelength side and light transmission characteristics on a long wavelength side, wherein a boundary wavelength between the characteristics is variable, wherein light emitted by a light source proceeds toward the first optical element, the first optical element absorbs or reflects in an oblique direction light on the short wavelength side, light transmitted by the first optical element reaches the second optical element, the second optical element reflects light in a specific wavelength region among light having reached the second optical element, and the reflected light proceeds toward the first optical element, is transmitted by the first optical element, and advances toward an observer.

Example 5

An image display device element including: a first optical element configured to have light absorption characteristics or light reflection characteristics in an oblique direction on a long wavelength side and light transmission characteristics on a short wavelength side, wherein a boundary wavelength between the characteristics is variable; and a second optical element configured to have light reflection characteristics on a long wavelength side and light transmission characteristics on a short wavelength side, wherein a boundary wavelength between the characteristics is variable, wherein light emitted by a light source proceeds toward the first optical element, the first optical element absorbs or reflects in an oblique direction light on the long wavelength side, light transmitted by the first optical element reaches the second optical element, the second optical element reflects light in a specific wavelength region among light having reached the second optical element, and the reflected light proceeds toward the first optical element, is transmitted by the first optical element, and advances toward an observer.

Example 6

The image display device element according to Example 1 further including: a third optical element configured to have light absorption characteristics or light reflection characteristics in an oblique direction on a short wavelength side and light transmission characteristics on a long wavelength side, wherein a boundary wavelength between the characteristics is variable; and a fourth optical element configured to have light reflection characteristics on a short wavelength side and light transmission characteristics on a long wavelength side, wherein a boundary wavelength between the characteristics is fixed, wherein light emitted by a light source and transmitted by the first and second optical elements proceeds toward the third optical element, the third optical element absorbs or reflects in an oblique direction light on the short wavelength side, light transmitted by the third optical element reaches the fourth optical element, the fourth optical element reflects light in a specific wavelength region among light having reached the fourth optical element, and the reflected light proceeds toward the third optical element, is transmitted by the third, second, and first optical elements, and advances toward the observer.

Example 7

The image display device element according to Example 1 further including: a third optical element configured to have light absorption characteristics or light reflection characteristics in an oblique direction on a long wavelength side and light transmission characteristics on a short wavelength side, wherein a boundary wavelength between the characteristics is variable; and a fourth optical element configured to have light reflection characteristics on a long wavelength side and light transmission characteristics on a short wavelength side, wherein a boundary wavelength between the characteristics is fixed, wherein light emitted by a light source and transmitted by the first and second optical elements proceeds toward the third optical element, the third optical element absorbs or reflects in an oblique direction light on the long wavelength side, light transmitted by the third optical element reaches the fourth optical element, the fourth optical element reflects light in a specific wavelength region among light having reached the fourth optical element, and the reflected light proceeds toward the third optical element, is transmitted by the third, second, and first optical elements, and advances toward the observer.

Example 8

The image display device element according to Example 2 further including: a third optical element configured to have light absorption characteristics or light reflection characteristics in an oblique direction on a short wavelength side and light transmission characteristics on a long wavelength side, wherein a boundary wavelength between the characteristics is fixed; and a fourth optical element configured to have light reflection characteristics on a short wavelength side and light transmission characteristics on a long wavelength side, wherein a boundary wavelength between the characteristics is variable, wherein light emitted by a light source and transmitted by the first and second optical elements proceeds toward the third optical element, the third optical element absorbs or reflects in an oblique direction light on the short wavelength side, light transmitted by the third optical element reaches the fourth optical element, the fourth optical element reflects light in a specific wavelength region among light having reached the fourth optical element, and the reflected light proceeds toward the third optical element, is transmitted by the third, second, and first optical elements, and advances toward the observer.

Example 9

The image display device element according to Example 3 further including: a third optical element configured to have light absorption characteristics or light reflection characteristics in an oblique direction on a long wavelength side and light transmission characteristics on a short wavelength side, wherein a boundary wavelength between the characteristics is fixed; and a fourth optical element configured to have light reflection characteristics on a long wavelength side and light transmission characteristics on a short wavelength side, wherein a boundary wavelength between the characteristics is variable, wherein light emitted by a light source and transmitted by the first and second optical elements proceeds toward the third optical element, the third optical element absorbs or reflects in an oblique direction light on the long wavelength side, light transmitted by the third optical element reaches the fourth optical element, the fourth optical element reflects light in a specific wavelength region among light having reached the fourth optical element, and the reflected light proceeds toward the third optical element, is transmitted by the third, second, and first optical elements, and advances toward the observer.

Example 10

The image display device element according to Example 4 further including: a third optical element configured to have light absorption characteristics or light reflection characteristics in an oblique direction on a short wavelength side and light transmission characteristics on a long wavelength side, wherein a boundary wavelength between the characteristics is variable; and a fourth optical element configured to have light reflection characteristics on a short wavelength side and light transmission characteristics on a long wavelength side, wherein a boundary wavelength between the characteristics is variable, wherein light emitted by a light source and transmitted by the first and second optical elements proceeds toward the third optical element, the third optical element absorbs or reflects in an oblique direction light on the short wavelength side, light transmitted by the third optical element reaches the fourth optical element, the fourth optical element reflects light in a specific wavelength region among light having reached the fourth optical element, and the reflected light proceeds toward the third optical element, is transmitted by the third, second, and first optical elements, and advances toward the observer.

Example 11

The image display device element according to Example 5 further including: a third optical element configured to have light absorption characteristics or light reflection characteristics in an oblique direction on a long wavelength side and light transmission characteristics on a short wavelength side, wherein a boundary wavelength between the characteristics is variable; and a fourth optical element configured to have light reflection characteristics on a long wavelength side and light transmission characteristics on a short wavelength side, wherein a boundary wavelength between the characteristics is variable, wherein light emitted by a light source and transmitted by the first and second optical elements proceeds toward the third optical element, the third optical element absorbs or reflects in an oblique direction light on the long wavelength side, light transmitted by the third optical element reaches the fourth optical element, the fourth optical element reflects light in a specific wavelength region among light having reached the fourth optical element, and the reflected light proceeds toward the third optical element, is transmitted by the third, second, and first optical elements, and advances toward the observer.

Example 12

The image display device element according to Example 6 further including: a fifth optical element configured to have light absorption characteristics or light reflection characteristics in an oblique direction on a short wavelength side and light transmission characteristics on a long wavelength side, wherein a boundary wavelength between the characteristics is variable; and a sixth optical element configured to have light reflection characteristics on a short wavelength side and light transmission characteristics on a long wavelength side, wherein a boundary wavelength between the characteristics is fixed, wherein light emitted by a light source and transmitted by the first, second, third, and fourth optical elements proceeds toward the fifth optical element, the fifth optical element absorbs or reflects in an oblique direction light on the short wavelength side, light transmitted by the fifth optical element reaches the sixth optical element, the sixth optical element reflects light in a specific wavelength region among light having reached the sixth optical element, and the reflected light proceeds toward the fifth optical element, is transmitted by the fifth, fourth, third, second, and first optical elements, and advances toward the observer.

Example 13

The image display device element according to Example 7 further including: a fifth optical element configured to have light absorption characteristics or light reflection characteristics in an oblique direction on a long wavelength side and light transmission characteristics on a short wavelength side, wherein a boundary wavelength between the characteristics is variable; and a sixth optical element configured to have light reflection characteristics on a long wavelength side and light transmission characteristics on a short wavelength side, wherein a boundary wavelength between the characteristics is fixed, wherein light emitted by a light source and transmitted by the first, second, third, and fourth optical elements proceeds toward the fifth optical element, the fifth optical element absorbs or reflects in an oblique direction light on the long wavelength side, light transmitted by the fifth optical element reaches the sixth optical element, the sixth optical element reflects light in a specific wavelength region among light having reached the sixth optical element, and the reflected light proceeds toward the fifth optical element, is transmitted by the fifth, fourth, third, second, and first optical elements, and advances toward the observer.

Example 14

The image display device element according to Example 8 further including: a fifth optical element configured to have light absorption characteristics or light reflection characteristics in an oblique direction on a short wavelength side and light transmission characteristics on a long wavelength side, wherein a boundary wavelength between the characteristics is fixed; and a sixth optical element configured to have light reflection characteristics on a short wavelength side and light transmission characteristics on a long wavelength side, wherein a boundary wavelength between the characteristics is variable, wherein light emitted by a light source and transmitted by the first, second, third, and fourth optical elements proceeds toward the fifth optical element, the fifth optical element absorbs or reflects in an oblique direction light on the short wavelength side, light transmitted by the fifth optical element reaches the sixth optical element, the sixth optical element reflects light in a specific wavelength region among light having reached the sixth optical element, and the reflected light proceeds toward the fifth optical element, is transmitted by the fifth, fourth, third, second, and first optical elements, and advances toward the observer.

Example 15

The image display device element according to Example 9 further including: a fifth optical element configured to have light absorption characteristics or light reflection characteristics in an oblique direction on a long wavelength side and light transmission characteristics on a short wavelength side, wherein a boundary wavelength between the characteristics is fixed; and a sixth optical element configured to have light reflection characteristics on a long wavelength side and light transmission characteristics on a short wavelength side, wherein a boundary wavelength between the characteristics is variable, wherein light emitted by a light source and transmitted by the first, second, third, and fourth optical elements proceeds toward the fifth optical element, the fifth optical element absorbs or reflects in an oblique direction light on the long wavelength side, light transmitted by the fifth optical element reaches the sixth optical element, the sixth optical element reflects light in a specific wavelength region among light having reached the sixth optical element, and the reflected light proceeds toward the fifth optical element, is transmitted by the fifth, fourth, third, second, and first optical elements, and advances toward the observer.

Example 16

The image display device element according to Example 10 further including: a fifth optical element configured to have light absorption characteristics or light reflection characteristics in an oblique direction on a short wavelength side and light transmission characteristics on a long wavelength side, wherein a boundary wavelength between the characteristics is variable; and a sixth optical element configured to have light reflection characteristics on a short wavelength side and light transmission characteristics on a long wavelength side, wherein a boundary wavelength between the characteristics is variable, wherein light emitted by a light source and transmitted by the first, second, third, and fourth optical elements proceeds toward the fifth optical element, the fifth optical element absorbs or reflects in an oblique direction light on the short wavelength side, light transmitted by the fifth optical element reaches the sixth optical element, the sixth optical element reflects light in a specific wavelength region among light having reached the sixth optical element, and the reflected light proceeds toward the fifth optical element, is transmitted by the fifth, fourth, third, second, and first optical elements, and advances toward the observer.

Example 17

The image display device element according to Example 11 further including: a fifth optical element configured to have light absorption characteristics or light reflection characteristics in an oblique direction on a long wavelength side and light transmission characteristics on a short wavelength side, wherein a boundary wavelength between the characteristics is variable; and a sixth optical element configured to have light reflection characteristics on a long wavelength side and light transmission characteristics on a short wavelength side, wherein a boundary wavelength between the characteristics is variable, wherein light emitted by a light source and transmitted by the first, second, third, and fourth optical elements proceeds toward the fifth optical element, the fifth optical element absorbs or reflects in an oblique direction light on the long wavelength side, light transmitted by the fifth optical element reaches the sixth optical element, the sixth optical element reflects light in a specific wavelength region among light having reached the sixth optical element, and the reflected light proceeds toward the fifth optical element, is transmitted by the fifth, fourth, third, second, and first optical elements, and advances toward the observer.

Example 18

The image display device element according to any one of Examples 1, 4, and 5 comprising, by varying the amount of overlap between a light transmission band of the first optical element and a light reflection band of the second optical element through varying the boundary wavelength of the first optical element, varying a band of the reflected light and the amount of the light and, by eliminating the overlap between the light transmission band of the first optical element and the light reflection band of the second optical element, reducing and cutting off light advancing in the direction toward the observer.

Example 19

The image display device element according to any one of Examples 2 to 5 comprising, by varying the amount of overlap between a light transmission band of the first optical element and a light reflection band of the second optical element through varying the boundary wavelength of the second optical element, varying a band of the reflected light and the amount of the light and, by eliminating the overlap between the light transmission band of the first optical element and the light reflection band of the second optical element, reducing and cutting off light advancing in the direction toward the observer.

Example 20

The image display device element according to any one of Examples 1 to 19, wherein the first optical element and the second optical element are arranged on an optical axis of light emitted from a light source.

Example 21

The image display device element according to any one of Examples 1, 4 to 7, 10 to 14, 17, and 18 comprising varying the boundary wavelength of the first optical element by varying an incident angle through inclining the first optical element with respect to an optical axis of light emitted from a light source.

Example 22

The image display device element according to any one of Examples 1, 4 to 7, 10 to 14, 17, and 18 comprising varying the boundary wavelength of the first optical element by varying thickness of a portion of the first optical element where light emitted from a light source is transmitted.

Example 23

The image display device element according to Example 22 comprising varying the thickness of the first optical element by applying voltage to the first optical element.

Example 24

The image display device element according to Example 22 comprising varying the thickness of the first optical element by pressing or stretching the first optical element in a direction of the thickness.

Example 25

The image display device element according to Example 11 comprising varying the thickness of the first optical element by pressing or stretching the first optical element in a direction crossing with the direction of the thickness.

Example 26

The image display device element according to any one of Examples 1 and 12 to 17, wherein light in a wavelength region reflected by the second optical element is blue light, light in a wavelength region reflected by the fourth optical element is green light, and light in a wavelength region reflected by the sixth optical element is red light.

Example 27

The image display device element according to any one of Examples 1 and 12 to 17, wherein light in a wavelength region reflected by the second optical element is red light, light in a wavelength region reflected by the fourth optical element is green light, and light in a wavelength region reflected by the sixth optical element is blue light.

Example 28

The image display device element according to any one of Examples 1 and 12 to 17, wherein light in a wavelength region reflected by the second optical element is light in a wavelength range of 380 nm or longer and 500 nm or shorter, light in a wavelength region reflected by the fourth optical element is light in a wavelength range of 500 nm or longer and 600 nm or shorter, and light in a wavelength region reflected by the sixth optical element is light in a wavelength range of 600 nm or longer and 780 nm or shorter.

Example 29

The image display device element according to any one of Examples 1 and 12 to 17, wherein light in a wavelength region reflected by the second optical element is light in a wavelength range of 600 nm or longer and 780 nm or shorter, light in a wavelength region reflected by the fourth optical element is light in a wavelength range of 500 nm or longer and 600 nm or shorter, and light in a wavelength region reflected by the sixth optical element is light in a wavelength range of 380 nm or longer and 500 nm or shorter.

Example 30

The image display device element according to any one of Examples 1, 12 to 17, and 26 to 29 further including a housing container the inner wall of which is colored in black, wherein in the housing container, the first, second, third, fourth, fifth, and sixth optical elements are included in this sequence.

The following is a list of reference signs using in the drawings.
1 to 6 Element
10, 20, 30 Image display device element
AB1 Transmitted-light absorbing member
AB2 Reflected-light absorbing member
LS Light source
L Incident light
OB Observer
T1 First transmitted light
T2 Second transmitted light
T3 Third transmitted light
T4 Fourth transmitted light
T5 Fifth transmitted light
T6 Sixth transmitted light
R1 First reflected light
R2 Second reflected light
R3 Third reflected light
R4 Fourth reflected light
R5 Fifth reflected light
R6 Sixth reflected light
U1 First optical unit
U2 Second optical unit
U3 Third optical unit
410 Experimental apparatus (transmission-type color development experimental apparatus)
411 Reference line
412 Central line 414 Support platform
416 Cylindrical pipe
417 Folder
418 Movable shaft
419 Angle setting knob
421 Folder
422 Circular window
423 Circular window
424 Fluorescent tube
425 Output light (light generated in accordance with the principle)
426 White parallel light
428 Chroma meter
429 Light receiving lens
43B Light
43G Light
43R Light
43V Light
43C Light
43Y Light
43I Light
44B Light
44G Light
44R Light
45B Light
45G Light
45R Light
46B Light
46G Light
46R Light
472 Circular window
473 Container
474 Container
475 Color development unit
476 Light source unit
47R Chamber
47G Chamber
47B Chamber
48B Light
48V Light
48CGYRI Light
48G Light
48VBC Light
48YRI Light
48R Light
48VBCGY Light
481 Light
4FR Optical element
4FG Optical element
4FB Optical element
4FT Optical element
4AB0 Center of boundary wavelength region
4AB60 Center of boundary wavelength region
4AG0 Center of high reflectance wavelength region
4AG30 Center of high reflectance wavelength region
4AR0 Center of boundary wavelength region
4AR40 Center of boundary wavelength region
4HB Graph
4HG Graph
4HR Graph
4HT Graph
510 Experimental apparatus
511 Reference line
512 Central line
θ Incident angle
514 Support platform
515 Container
516 Cylindrical pipe
517 Folder
518 Movable shaft
519 Angle setting knob
521 Folder
523 Container
524 Light source device
525 Mirror
526 White parallel light
527 Light
528 Chroma meter
529 Light receiving lens
52X Element
52Y Element
542 Boundary wavelength region
562 Specific wavelength region
613 Light
614 Light
616 Light
622 Light
659 Black coat
59A Chart
59B Chart
585 Wavelength region
586 Wavelength region
587 Wavelength region
710 Experimental apparatus
711 Reference line
712 Central line
714 Support platform
715 Container
716 Cylindrical pipe
717 Folder
718 Movable shaft
719 Angle setting knob
721 Folder
723 Container
724 Light source device
725 Mirror
726 White parallel light
727 Composite light
728 Chroma meter
729 Light receiving lens
72X Element
72Y Element
735 Optical unit group
73B Optical unit
73G Optical unit
73R Optical unit
742B Boundary wavelength region
742G Boundary wavelength region
742R Boundary wavelength region
762B Boundary wavelength region
762G Specific wavelength region
762R Boundary wavelength region
79A Chart
79B Chart
785 Wavelength region
786 Wavelength region
787 Wavelength region
791 Transmittance
792 Reflectance
813 Light
814 Light
816 Light
822 Light
823 Light 824 Light
826 Light
832 Light
833 Light
834 Light
836 Light
842 Light
859 Black coat
86B Light
86G Light
86R Light

The invention claimed is:

1. An image display device element comprising:
a first optical element in which a boundary wavelength between light absorption and light transmission or a boundary wavelength between reflection in an oblique direction and light transmission is variable or the boundary wavelength is fixed; and
a second optical element in which a wavelength region of light to be reflected is variable or the wavelength region is fixed, wherein
the first optical element and the second optical element are arranged in a combination in which at least either the boundary wavelength of the first optical element or the wavelength region of the second optical element is variable and in a positional relationship in which light transmitted by the first optical element is incident on the second optical element,
an amount of overlap between a light transmission band of the first optical element and a light reflection band of the second optical element through depends on the boundary wavelength of the first optical element and the wavelength region of the second optical element, and
a band and an amount of light is reflected by the second optical element and then transmitted by the first optical element, the band and the amount of light dependent upon the amount of overlap.

2. The image display device element according to claim 1, wherein
the second optical element has a band in which the second optical element transmits the light transmitted by the first optical element,
the light transmitted by the first and second optical elements is sent to a third optical element, and
the third optical element is configured in such a way that a boundary wavelength between light absorption and light transmission or a boundary wavelength between reflection in an oblique direction and light transmission is variable or the boundary wavelength is fixed.

3. The image display device element according to claim 1, comprising a plurality of optical modules, each of which is a combination of the first optical element and the second optical element,
wherein, the plurality of the optical modules are arranged in a stacked manner along a path of light in such a way that light transmitted by a first one of the optical modules is incident on another one of the optical modules.

4. The image display device element according to claim 1, wherein
the first optical element reflects the light incident on the first optical element by means of Bragg reflection.

5. The image display device element according to claim 1, wherein
the second optical element reflects the light transmitted by the first optical element and incident on the second optical element by means of Bragg reflection.

6. The image display device element according to claim 1 further comprising:
a third optical element in which a boundary wavelength between light absorption and light transmission or a boundary wavelength between reflection in an oblique direction and light transmission is variable or fixed, wherein the third optical element is arranged to receive light reflected from the second optical element; and
a fourth optical element in which a wavelength region of light to be reflected is variable or fixed, wherein
the third optical element and the fourth optical element are arranged in a combination in which at least either the boundary wavelength of the third optical element or the wavelength region of the fourth optical element is variable and in a positional relationship in which light transmitted by the third optical element is incident on the fourth optical element,
the boundary wavelength of the third optical element is different from the boundary wavelength of the first optical element,
the wavelength region of the fourth optical element is different from the wavelength region of the second optical element, and
by controlling overlap between a light transmission band of the third optical element and a light reflection band of the fourth optical element through varying at least one of the boundary wavelength of the third optical element and the wavelength region of the fourth optical element, a band of light reflected by the fourth optical element and an amount of the light are varied.

7. An image display device element comprising:
a first optical element configured to have light absorption characteristics or light reflection characteristics in an oblique direction on a short wavelength side and light transmission characteristics on a long wavelength side, wherein a boundary wavelength between the characteristics is dynamically variable; and
a second optical element configured to have light reflection characteristics on a short wavelength side and light transmission characteristics on a long wavelength side, wherein a boundary wavelength between the characteristics is fixed, wherein
light emitted by a light source proceeds toward the first optical element, the first optical element absorbs or reflects in an oblique direction light on the short wavelength side, light transmitted by the first optical element reaches the second optical element, the second optical element reflects light in a specific wavelength region among light having reached the second optical element, and the reflected light proceeds toward the first optical element, is transmitted by the first optical element, and advances toward an observer.

8. A reflective element comprising:
a first element in which a boundary wavelength between electromagnetic wave absorption and electromagnetic wave transmission or a boundary wavelength between electromagnetic wave reflection in an oblique direction and electromagnetic wave transmission is variable or the boundary wavelength is fixed; and
a second element in which a wavelength region of an electromagnetic wave to be reflected is variable or the wavelength region is fixed, wherein
the first element and the second element are arranged in a combination in which at least either the boundary wavelength of the first element or the wavelength region of the second element is variable and in a positional relationship in which electromagnetic waves transmitted by the first element are incident on the second element, an amount of overlap between an electromagnetic wave transmission band of the first element and an electromagnetic wave reflection band of the second element depends on the boundary wavelength of the first element and the wavelength region of the second element, and a band and an amount of electromagnetic waves are reflected by the second element and then transmitted by the first element, the band and the amount of electromagnetic waves dependent upon the amount of overlap.

9. A reflective element comprising:

a first element in which a boundary wavelength between X ray absorption and X ray transmission or a boundary wavelength between X ray reflection in an oblique direction and X ray transmission is variable or the boundary wavelength is fixed; and a second element in which a wavelength region of an X ray to be reflected is variable or the wavelength region is fixed, wherein the first element and the second element are arranged in a combination in which at least either the boundary wavelength of the first element or the wavelength region of the second element is variable and in a positional relationship in which X rays transmitted by the first element are incident on the second element and, by controlling overlap between an X ray transmission band of the first element and an X ray reflection band of the second element through varying at least one of the boundary wavelength of the first element and the wavelength region of the second element, a band of X rays reflected by the second element and an amount of the X rays are varied.

10. A reflective element comprising:

a first element in which a boundary wavelength between radio wave absorption and radio wave transmission or a boundary wavelength between radio wave reflection in an oblique direction and radio wave transmission is variable or the boundary wavelength is fixed; and a second element in which a wavelength region of a radio wave to be reflected is variable or the wavelength region is fixed, wherein the first element and the second element are arranged in a combination in which at least either the boundary wavelength of the first element or the wavelength region of the second element is variable and in a positional relationship in which radio waves transmitted by the first element are incident on the second element and, by controlling overlap between a radio wave transmission band of the first element and a radio wave reflection band of the second element through varying at least one of the boundary wavelength of the first element and the wavelength region of the second element, a band of radio waves reflected by the second element and an amount of the radio waves are varied.

11. A filter element comprising:

a first optical element in which a boundary wavelength between light absorption and light transmission or a boundary wavelength between reflection in an oblique direction and light transmission is variable or the boundary wavelength is fixed; and a second optical element in which a wavelength region of light to be transmitted is variable or the wavelength region is fixed, wherein the first optical element and the second optical element are arranged in a combination in which at least either the boundary wavelength of the first optical element or the wavelength region of the second optical element is variable and in a positional relationship in which light transmitted by the first optical element is incident on the second optical element, the filter element includes a plurality of optical modules, each of which is a combination of the first optical element and the second optical element, the plurality of the optical modules are arranged in a stacked manner along a path of light in such a way that light transmitted by a first one of the optical modules is incident on another one of the optical modules, an amount of overlap between a light transmission band of the first optical element and a light transmission band of the second optical element depends on the boundary wavelength of the first optical element and the wavelength region of the second optical element, and a band of light transmitted by the second optical element and an amount of the light are dependent upon the amount of overlap.

12. A filter element comprising:

a first optical element in which a boundary wavelength between light absorption and light transmission or a boundary wavelength between reflection in an oblique direction and light transmission is variable or the boundary wavelength is fixed; and a second optical element in which a wavelength region of light to be transmitted is variable or the wavelength region is fixed, wherein the first optical element and the second optical element are arranged in a combination in which at least either the boundary wavelength of the first optical element or the wavelength region of the second optical element is variable and in a positional relationship in which light transmitted by the first optical element is incident on the second optical element, by controlling overlap between a light transmission band of the first optical element and a light transmission band of the second optical element through varying at least one of the boundary wavelength of the first optical element and the wavelength region of the second optical element, a band of light transmitted by the second optical element and an amount of the light are varied, the second optical element has a band in which the second optical element transmits the light transmitted by the first optical element, the light transmitted by the first and second optical elements is sent to a third optical element, and the third optical element is configured in such a way that a boundary wavelength between light absorption and light transmission or a boundary wavelength between reflection in an oblique direction and light transmission is variable or the boundary wavelength is fixed.

13. The filter element according to claim 12, comprising a plurality of optical modules, each of which is a combination of the first optical element and the second optical element, wherein, the plurality of the optical modules are arranged in a stacked manner along a path of light in such a way that light transmitted by a first one of the optical modules is incident on another one of the optical modules.

14. The filter element according to claim 12, wherein, the first optical element reflects the light incident on the first optical element by means of Bragg reflection.

15. The filter element according to claim 12, wherein, the second optical element reflects the light transmitted by the first optical element and incident on the second optical element by means of Bragg reflection.

16. The filter element according to claim 12, wherein, further comprising:
a third optical element in which a boundary wavelength between light absorption and light transmission or a boundary wavelength between reflection in an oblique direction and light transmission is variable or fixed; and
a fourth optical element in which a wavelength region of light to be reflected is variable or fixed, wherein
the third optical element and the fourth optical element are arranged in a combination in which at least either the boundary wavelength of the third optical element or the wavelength region of the fourth optical element is variable and in a positional relationship in which light transmitted by the third optical element is incident on the fourth optical element,
the boundary wavelength of the third optical element is different from the boundary wavelength of the first optical element,
the wavelength region of the fourth optical element is different from the wavelength region of the second optical element, and
by controlling overlap between a light transmission band of the third optical element and a light reflection band of the fourth optical element through varying at least one of the boundary wavelength of the third optical element and the wavelength region of the fourth optical element, a band of light reflected by the fourth optical element and an amount of the light are varied.

17. A filter element comprising:
a first element in which a boundary wavelength between electromagnetic wave absorption and electromagnetic wave transmission or a boundary wavelength between electromagnetic wave reflection in an oblique direction and electromagnetic wave transmission is variable or the boundary wavelength is fixed and
a second element in which a wavelength region of an electromagnetic wave to be transmitted is variable or the wavelength region is fixed, wherein
the first element and the second element are arranged in a combination in which at least either the boundary wavelength of the first element or the wavelength region of the second element is variable and in a positional relationship in which electromagnetic waves transmitted by the first element are incident on the second element and,
by controlling overlap between an electromagnetic wave transmission band of the first element and an electromagnetic wave transmission band of the second element through varying at least one of the boundary wavelength of the first element and the wavelength region of the second element, a band of electromagnetic waves transmitted by the second element and an amount of the electromagnetic waves are varied,
the second element has a band in which the second element transmits the electromagnetic waves transmitted by the first element,
the electromagnetic waves transmitted by the first and second elements are sent to a third element, and
the third element is configured in such a way that a boundary wavelength between electromagnetic wave absorption and electromagnetic wave transmission or a boundary wavelength between electromagnetic wave reflection in an oblique direction and electromagnetic wave transmission is variable or the boundary wavelength is fixed.

18. The filter element according to claim 17, comprising a plurality of modules, each of which is a combination of the first element and the second element,
wherein the plurality of modules are arranged in a stacked manner along a path of electromagnetic waves in such a way that electromagnetic waves transmitted by a first one of the modules are incident on another one of the modules.

19. A filter element comprising:
a first element in which a boundary wavelength between X ray absorption and X ray transmission or a boundary wavelength between X ray reflection in an oblique direction and X ray transmission is variable or the boundary wavelength is fixed; and
a second element in which a wavelength region of an X ray to be transmitted is variable or the wavelength region is fixed, wherein
the first element and the second element are arranged in a combination in which at least either the boundary wavelength of the first element or the wavelength region of the second element is variable and in a positional relationship in which X rays transmitted by the first element are incident on the second element,
by controlling overlap between an X ray transmission band of the first element and an X ray transmission band of the second element through varying at least one of the boundary wavelength of the first element and the wavelength region of the second element, a band of X rays transmitted by the second element and an amount of the X rays are varied,
the second element has a band in which the second element transmits the X rays transmitted by the first element,
the X rays transmitted by the first and second elements are sent to a third element, and
the third element is configured in such a way that a boundary wavelength between X ray absorption and X ray transmission or a boundary wavelength between X ray reflection in an oblique direction and X ray transmission is variable or the boundary wavelength is fixed.

20. The filter element according to claim 19, comprising a plurality of modules, each of which is a combination of the first element and the second element,
wherein the plurality of modules are arranged in a stacked manner along a path of X rays in such a way that X rays transmitted by a first one of the modules are incident on another one of the modules.

21. A filter element comprising:
a first element in which a boundary wavelength between radio wave absorption and radio wave transmission or a boundary wavelength between radio wave reflection in an oblique direction and radio wave transmission is variable or the boundary wavelength is fixed; and
a second element in which a wavelength region of a radio wave to be transmitted is variable or the wavelength region is fixed, wherein
the first element and the second element are arranged in a combination in which at least either the boundary wavelength of the first element or the wavelength region of the second element is variable and in a positional relationship in which radio waves transmitted by the first element are incident on the second element, by controlling overlap between a radio wave transmission band of the first element and a radio wave transmission band of the second element through varying at least one of the boundary wavelength of the first element and the wavelength region of the second element, a band of radio waves transmitted by the second element and an amount of the radio waves are varied, the second element has a band in which the second element transmits the radio waves transmitted by the first element, the radio waves transmitted by the first and second elements are sent to a third element, and the third element is configured in such a way that a boundary wavelength between radio wave absorption and radio wave transmission or a boundary wavelength between radio wave reflection in an oblique direction and radio wave transmission is variable or the boundary wavelength is fixed.

22. The filter element according to claim 21, comprising a plurality of modules, each of which is a combination of the first element and the second element, wherein the plurality of modules are arranged in a stacked manner along a path of radio waves in such a way that radio waves transmitted by one of the modules are incident on another one of the modules.

* * * * *